US005815286A

United States Patent [19]

Matsuba et al.

[11] Patent Number: 5,815,286

[45] Date of Patent: Sep. 29, 1998

[54] METHOD AND APPARATUS FOR PRODUCING HALFTONE IMAGE WITH THRESHOLD MATRIX

[75] Inventors: Masayoshi Matsuba; Tadashi Fukuda; Yoshio Ono, all of Kyoto, Japan

[73] Assignee: Dainippon Screen Mfg. Co., Ltd., Kyoto, Japan

[21] Appl. No.: 382,101

[22] Filed: Feb. 1, 1995

[30] Foreign Application Priority Data

| | | | |
|---|---|---|---|
| Feb. 1, 1994 | [JP] | Japan | 6-030936 |
| Nov. 2, 1994 | [JP] | Japan | 6-293809 |
| Dec. 2, 1994 | [JP] | Japan | 6-329410 |
| Dec. 2, 1994 | [JP] | Japan | 6-329411 |

[51] Int. Cl.[6] ...... H04N 1/40

[52] U.S. Cl. ...... 358/457; 358/455; 358/456; 358/465; 382/237

[58] Field of Search ...... 358/429, 448, 358/452, 455, 456, 457, 460, 465; 382/169, 237, 270, 271, 272

[56] References Cited

U.S. PATENT DOCUMENTS

| | | | |
|---|---|---|---|
| 4,736,254 | 4/1988 | Kotera et al. | 358/283 |
| 5,107,349 | 4/1992 | Ng | 358/457 |
| 5,150,428 | 9/1992 | Leone et al. | 382/50 |
| 5,315,405 | 5/1994 | Okuwaki | 358/445 |
| 5,477,305 | 12/1995 | Parker | 358/456 |
| 5,530,559 | 6/1996 | Sato | 358/447 |

FOREIGN PATENT DOCUMENTS

| | | | |
|---|---|---|---|
| 0 239 936 | 7/1987 | European Pat. Off. | H04N 1/417 |
| 0 642 259 A2 | 8/1995 | European Pat. Off. | H04N 1/405 |
| 44 11 614 | 10/1994 | Germany | G03F 5/22 |
| 58-80639 | 5/1983 | Japan . | |
| 61-186077 | 8/1986 | Japan . | |
| 2-244047 | 9/1990 | Japan . | |
| 6-70144 | 3/1994 | Japan . | |

OTHER PUBLICATIONS

Optical Engineering, Jul. 1985, vol. 24, No. 4, M. F. Carlsohn et al., pp. 655–662.

*Primary Examiner*—Thomas D. Lee
*Assistant Examiner*—Jerome Grant, II
*Attorney, Agent, or Firm*—Lowe, Price, LeBlanc & Becker

[57] ABSTRACT

A threshold matrix is divided into a plurality of sub-matrices Tij of an equal size. The difference between a plurality of threshold data included in each sub-matrix Tij is set to a specific value while the plurality of threshold data are arranged at random in each sub-matrix Tij. In case that each sub-matrix is a 2×2 arrangement, there are eight diagonal patterns where two relatively small threshold data are arranged diagonally while two relatively large threshold data are also arranged diagonally. A threshold matrix having the sufficiently high spatial frequency and allowing smooth tone reproduction can be prepared by selecting one of the eight diagonal patterns at random. A plurality of threshold matrices for respective color separations thus prepared will reduce the graininess and muddiness of colors in a reproduced color image. A plurality of threshold matrices can be produced from one original threshold matrix by extracting part of the threshold matrix.

67 Claims, 54 Drawing Sheets

Fig. 1(a) 2x2 BASIC MATRIX $BM_{2\times 2}$

| | |
|---|---|
| 0 | 2 |
| 3 | 1 |

Fig. 1(b) 4x4 BASIC MATRIX $BM_{4\times 4}$

| | | | |
|---|---|---|---|
| 0 | 8 | 2 | 10 |
| 12 | 4 | 14 | 6 |
| 3 | 11 | 1 | 9 |
| 15 | 17 | 13 | 5 |

Fig. 1(c) 8x8 BASIC MATRIX $BM_{8\times 8}$

| | | | | | | | |
|---|---|---|---|---|---|---|---|
| 0 | 32 | 8 | 40 | 2 | 34 | 10 | 42 |
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |

2x2 MATRICES Tij CONSTITUTING 4x4 BASIC MATRIX $BM_{4\times 4}$

2x2 MATRICES Tij CONSTITUTING 8x8 BASIC MATRIX $BM_{8\times 8}$

PREFERABLE PATTERNS OF COEFFICIENT MATRIX CM
Fig. 3
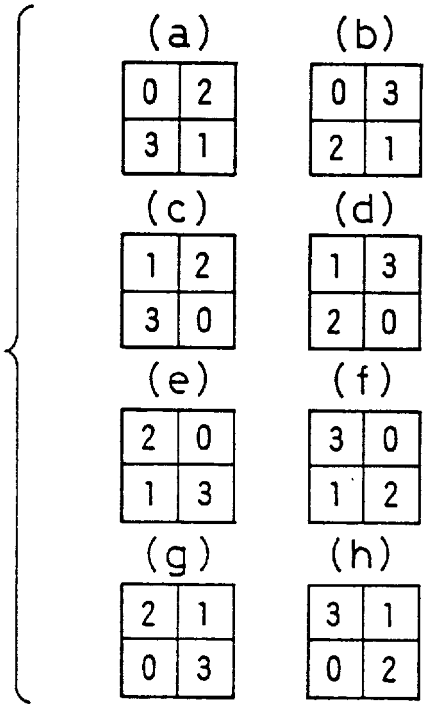
Fig. 4 PREFERABLE PATTERNS OF 2x2 MATRIX T11
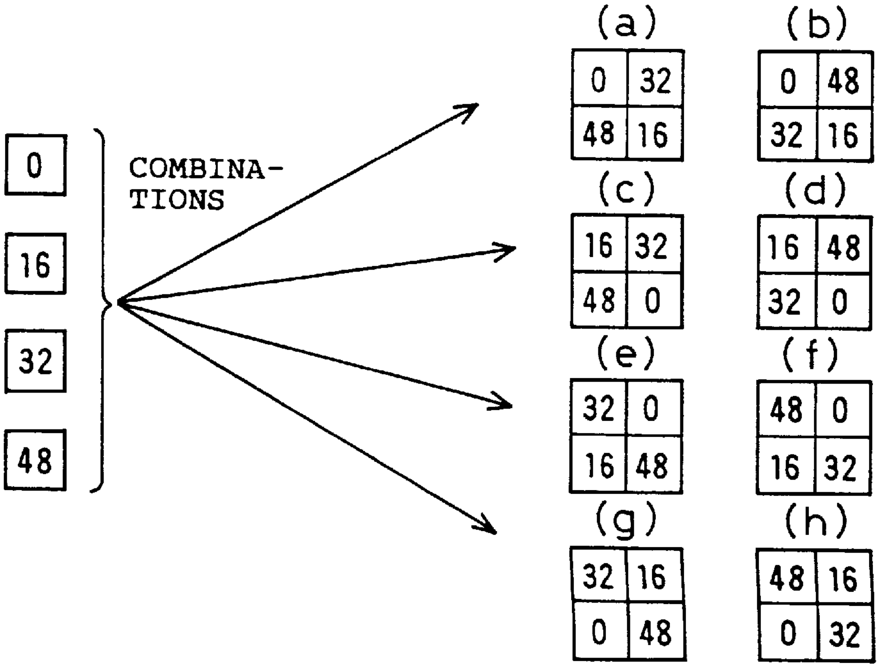

2x2 MATRICES Tij OBTAINED BY RANDOM COEFFICIENT MATRICES

8x8 THRESHOLD MATRIX $TM_{8\times 8}$

| | | | | | | | |
|---|---|---|---|---|---|---|---|
| 16 | 48 | 24 | 56 | 2 | 34 | 42 | 26 |
| 32 | 0 | 40 | 8 | 50 | 18 | 10 | 58 |
| 44 | 28 | 4 | 52 | 46 | 14 | 38 | 22 |
| 12 | 60 | 36 | 20 | 30 | 62 | 6 | 54 |
| 3 | 35 | 43 | 11 | 1 | 49 | 25 | 41 |
| 51 | 19 | 27 | 59 | 33 | 17 | 57 | 9 |
| 63 | 31 | 7 | 55 | 13 | 45 | 5 | 53 |
| 15 | 47 | 39 | 23 | 61 | 29 | 37 | 21 |

2x2 MATRICES Tij OBTAINED BY RANDOM COEFFICIENT MATRICES

Fig. 8(a)
BASIC MATRIX BM (FIG. 1)
| | | | | | | | |
|---|---|---|---|---|---|---|---|
| 0 | 32 | 8 | 40 | 2 | 34 | 10 | 42 |
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |
Fig. 8(b)
8x8 THRESHOLD MATRIX TM (FIG. 6)
| | | | | | | | |
|---|---|---|---|---|---|---|---|
| 16 | 48 | 24 | 56 | 2 | 34 | 42 | 26 |
| 32 | 0 | 40 | 8 | 50 | 18 | 10 | 58 |
| 44 | 28 | 4 | 52 | 46 | 14 | 38 | 22 |
| 12 | 60 | 36 | 20 | 30 | 62 | 6 | 54 |
| 3 | 35 | 43 | 11 | 1 | 49 | 25 | 41 |
| 51 | 19 | 27 | 59 | 33 | 17 | 57 | 9 |
| 63 | 31 | 7 | 55 | 13 | 45 | 5 | 53 |
| 15 | 47 | 39 | 23 | 61 | 29 | 37 | 21 |
Fig. 8(c)
COMPLETELY RANDOM MATRIX
| | | | | | | | |
|---|---|---|---|---|---|---|---|
| 0 | 14 | 51 | 15 | 36 | 22 | 58 | 37 |
| 61 | 13 | 52 | 23 | 43 | 7 | 38 | 56 |
| 62 | 42 | 12 | 1 | 3 | 21 | 57 | 48 |
| 24 | 53 | 2 | 20 | 8 | 32 | 25 | 30 |
| 54 | 41 | 33 | 16 | 39 | 29 | 4 | 31 |
| 34 | 6 | 55 | 40 | 49 | 10 | 9 | 44 |
| 63 | 18 | 19 | 5 | 59 | 11 | 26 | 45 |
| 17 | 60 | 35 | 50 | 28 | 46 | 27 | 47 |
BLACKEN SPOTS OF LESS THAN 32
Fig. 8(d)
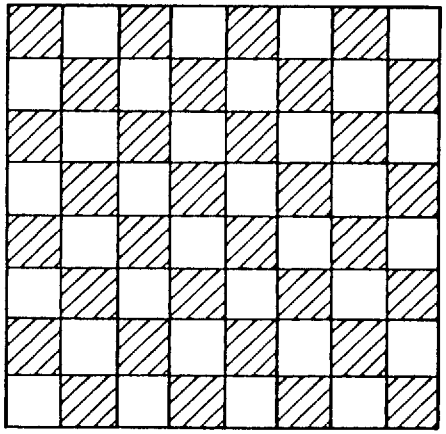
Fig. 8(e)
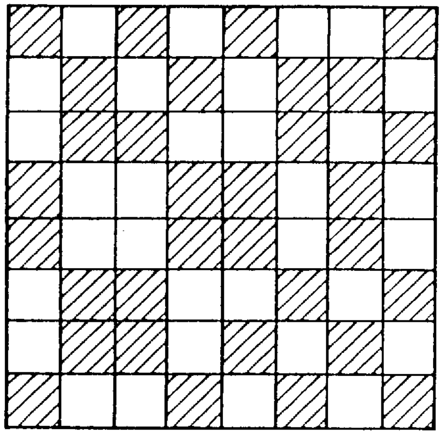
Fig. 8(f)
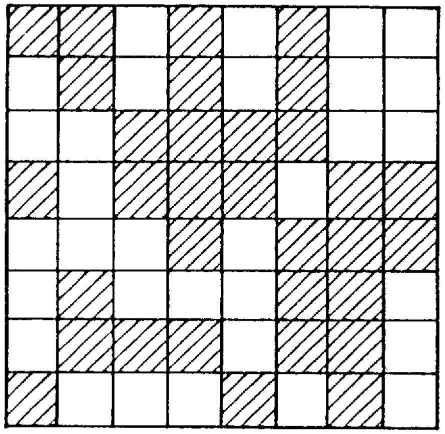

Fig. 9

16x16 THRESHOLD MATRIX $TM_{16\times16}$ (IN HEXADECIMAL NOTATION)

| | | | | | | | | | | | | | | | |
|---|---|---|---|---|---|---|---|---|---|---|---|---|---|---|---|
| 8a | a | 7a | fa | c6 | 46 | f6 | 76 | 40 | 80 | 70 | b0 | 8c | 4c | bc | 3c |
| 4a | ca | ba | 3a | 6 | 86 | 36 | b6 | c0 | 0 | f0 | 30 | c | cc | 7c | fc |
| 6a | aa | 9a | 5a | 26 | a6 | d6 | 16 | 60 | a0 | 90 | 50 | ac | 2c | 9c | 5c |
| ea | 2a | 1a | da | e6 | 66 | 56 | 96 | e0 | 20 | 10 | d0 | 6c | ec | 1c | dc |
| c2 | 42 | b2 | 32 | 4e | ce | 7e | be | 48 | 88 | 78 | f8 | 84 | 4 | 74 | b4 |
| 2 | 82 | 72 | f2 | 8e | e | fe | 3e | c8 | 8 | b8 | 38 | 44 | c4 | f4 | 34 |
| a2 | 62 | 52 | 92 | ae | 6e | de | 1e | 28 | a8 | d8 | 18 | a4 | 24 | 14 | d4 |
| 22 | e2 | d2 | 12 | 2e | ee | 5e | 9e | e8 | 68 | 58 | 98 | 64 | e4 | 94 | 54 |
| 83 | 3 | 33 | b3 | f | cf | ff | 3f | 41 | c1 | 71 | f1 | 8d | 4d | 7d | bd |
| 43 | c3 | f3 | 73 | 8f | 4f | 7f | bf | 81 | 1 | b1 | 31 | d | cd | fd | 3d |
| 23 | e3 | 13 | d3 | 6f | af | 1f | df | e1 | 61 | 51 | 91 | ad | 6d | dd | 5d |
| a3 | 63 | 93 | 53 | ef | 2f | 9f | 5f | 21 | a1 | d1 | 11 | 2d | ed | 1d | 9d |
| b | cb | 3b | fb | 87 | 7 | f7 | 77 | 89 | 9 | 39 | f9 | 5 | c5 | f5 | 35 |
| 8b | 4b | bb | 7b | 47 | c7 | 37 | b7 | 49 | c9 | b9 | 79 | 85 | 45 | 75 | b5 |
| eb | 2b | db | 1b | 27 | a7 | 57 | d7 | 29 | e9 | d9 | 19 | e5 | 25 | 95 | 55 |
| 6b | ab | 5b | 9b | e7 | 67 | 97 | 17 | a9 | 69 | 59 | 99 | 65 | a5 | 15 | d5 |

Fig. 10

16x16 THRESHOLD MATRIX $TM_{16\times16}$ (IN QUATERNARY NOTATION)

| | | | | | | | | | | | | | | | |
|---|---|---|---|---|---|---|---|---|---|---|---|---|---|---|---|
| 2022 | 0022 | 1322 | 3322 | 3012 | 1012 | 3312 | 1312 | 1000 | 2000 | 1300 | 2300 | 2030 | 1030 | 2330 | 0330 |
| 1022 | 3022 | 2322 | 0322 | 0012 | 2012 | 0312 | 2312 | 3000 | 0000 | 3300 | 0300 | 0030 | 3030 | 1330 | 3330 |
| 1222 | 2222 | 2122 | 1122 | 0212 | 2212 | 3112 | 0112 | 1200 | 2200 | 2100 | 1100 | 2230 | 0230 | 2130 | 1130 |
| 3222 | 0222 | 0122 | 3122 | 3212 | 1212 | 1112 | 2112 | 3200 | 0200 | 0100 | 3100 | 1230 | 3230 | 0130 | 3130 |
| 3002 | 1002 | 2302 | 0302 | 1032 | 3032 | 1332 | 2332 | 1020 | 2020 | 1320 | 3320 | 2010 | 0010 | 1310 | 2310 |
| 0002 | 2002 | 1302 | 3302 | 2032 | 0032 | 3332 | 0332 | 3020 | 0020 | 2320 | 0320 | 1010 | 3010 | 3310 | 0310 |
| 3202 | 1202 | 1102 | 2102 | 2232 | 1232 | 3132 | 0132 | 0220 | 2220 | 3120 | 0120 | 2210 | 0210 | 0110 | 3110 |
| 0202 | 2202 | 3102 | 0102 | 0232 | 3232 | 1132 | 2132 | 3220 | 1220 | 1120 | 2120 | 1210 | 3210 | 2110 | 1110 |
| 2003 | 0003 | 0303 | 2303 | 0033 | 3033 | 3333 | 0333 | 1001 | 3001 | 1301 | 3301 | 2031 | 1031 | 1331 | 2331 |
| 1003 | 3003 | 3303 | 1303 | 2033 | 1033 | 1333 | 2333 | 2001 | 0001 | 2301 | 0301 | 0031 | 3031 | 3331 | 0331 |
| 0203 | 3203 | 0103 | 3103 | 1233 | 2233 | 0133 | 3133 | 3201 | 1201 | 1101 | 2101 | 2231 | 1231 | 3131 | 1131 |
| 2203 | 1203 | 2103 | 1103 | 3233 | 0233 | 2133 | 1133 | 0201 | 2201 | 3101 | 0101 | 0231 | 3231 | 0131 | 2131 |
| 0023 | 3023 | 0323 | 3323 | 2013 | 0013 | 3313 | 1313 | 2021 | 0021 | 0321 | 3321 | 0011 | 3011 | 3311 | 0311 |
| 2023 | 1023 | 2323 | 1323 | 1013 | 3013 | 0313 | 2313 | 1021 | 3021 | 2321 | 1321 | 2011 | 1011 | 1311 | 2311 |
| 3223 | 0223 | 3123 | 0123 | 0213 | 2213 | 1113 | 3113 | 0221 | 3221 | 3121 | 0121 | 3211 | 0211 | 2111 | 1111 |
| 1223 | 2223 | 1123 | 2123 | 3213 | 1213 | 2113 | 0113 | 2221 | 1221 | 1121 | 2121 | 1211 | 2211 | 0111 | 3111 |

2331 (QUATERNARY NUMBER)

10111101 (BINARY NUMBER)

BITS 1&2: DETERMINED BY $E(a)^3 - E(d)^3$

BITS 3&4: DETERMINED BY $E(a)^2 - E(d)^2$

BITS 5&6: DETERMINED BY $E(a)^1 - E(d)^1$

BITS 7&8: DETERMINED BY $E(a)^0 - E(d)^0$

Fig. 12(a)

8x8 THRESHOLD MATRIX
(IN DECIMAL NOTATION)

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

(IN QUATERNARY NOTATION)

| | | | | | | | |
|---|---|---|---|---|---|---|---|
| 010 | 310 | 120 | 320 | 002 | 202 | 232 | 032 |
| 210 | 110 | 220 | 020 | 302 | 102 | 132 | 332 |
| 230 | 130 | 100 | 300 | 222 | 122 | 212 | 112 |
| 030 | 330 | 200 | 000 | 022 | 322 | 012 | 312 |
| 003 | 203 | 223 | 023 | 031 | 231 | 001 | 301 |
| 303 | 103 | 123 | 323 | 331 | 131 | 201 | 101 |
| 333 | 133 | 013 | 313 | 011 | 311 | 121 | 221 |
| 033 | 233 | 213 | 113 | 211 | 111 | 321 | 021 |

Fig. 12(b) DISTRIBUTION OF LOWEST TWO BITS $$2^0\begin{bmatrix} E(0)^2 & E(2)^2 \\ E(3)^2 & E(1)^2 \end{bmatrix} = 2^0\begin{bmatrix} 0&0&0&0&2&2&2&2 \\ 0&0&0&0&2&2&2&2 \\ 0&0&0&0&2&2&2&2 \\ 0&0&0&0&2&2&2&2 \\ 3&3&3&3&1&1&1&1 \\ 3&3&3&3&1&1&1&1 \\ 3&3&3&3&1&1&1&1 \\ 3&3&3&3&1&1&1&1 \end{bmatrix}$$

Fig. 12(c) DISTRIBUTION OF MEDIUM TWO BITS $$2^2\left[\begin{array}{cc|cc} E(1)^1 & E(2)^1 & E(0)^1 & E(3)^1 \\ E(3)^1 & E(0)^1 & E(2)^1 & E(1)^1 \\ \hline E(0)^1 & E(2)^1 & E(3)^1 & E(0)^1 \\ E(3)^1 & E(1)^1 & E(1)^1 & E(2)^1 \end{array}\right] = 2^2\left[\begin{array}{cccc|cccc} 1&1&2&2&0&0&3&3 \\ 1&1&2&2&0&0&3&3 \\ 3&3&0&0&2&2&1&1 \\ 3&3&0&0&2&2&1&1 \\ \hline 0&0&2&2&3&3&0&0 \\ 0&0&2&2&3&3&0&0 \\ 3&3&1&1&1&1&2&2 \\ 3&3&1&1&1&1&2&2 \end{array}\right]$$

Fig. 12(d) DISTRIBUTION OF UPPERMOST TWO BITS $E(0)^0 - E(3)^0$ $$2^4\left[\begin{array}{cc|cc|cc|cc} 0&3&1&3&0&2&2&0 \\ 2&1&2&0&3&1&1&3 \\ \hline 2&1&1&3&2&1&2&1 \\ 0&3&2&0&0&3&0&3 \\ \hline 0&2&2&0&0&2&0&3 \\ 3&1&1&3&3&1&2&1 \\ \hline 3&1&0&3&0&3&1&2 \\ 0&2&2&1&2&1&3&0 \end{array}\right]$$

Fig. 13(a) Y SEPARATION (BASE MATRIX)

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

Fig. 13(e) LOWEST TWO BITS IN Y SEPARATION $$2^0\begin{bmatrix}0&0&0&0&2&2&2&2\\0&0&0&0&2&2&2&2\\0&0&0&0&2&2&2&2\\0&0&0&0&2&2&2&2\\3&3&3&3&1&1&1&1\\3&3&3&3&1&1&1&1\\3&3&3&3&1&1&1&1\\3&3&3&3&1&1&1&1\end{bmatrix}$$

Fig. 13(b) M SEPARATION

| | | | | | | | |
|---|---|---|---|---|---|---|---|
| 5 | 53 | 25 | 57 | 3 | 35 | 47 | 15 |
| 37 | 21 | 41 | 9 | 51 | 19 | 31 | 63 |
| 45 | 29 | 17 | 49 | 43 | 27 | 39 | 23 |
| 13 | 61 | 33 | 1 | 11 | 59 | 7 | 55 |
| 2 | 34 | 42 | 10 | 12 | 44 | 0 | 48 |
| 50 | 18 | 26 | 58 | 60 | 28 | 32 | 16 |
| 62 | 30 | 6 | 54 | 4 | 52 | 24 | 40 |
| 14 | 46 | 38 | 22 | 36 | 20 | 56 | 8 |

Fig. 13(f) LOWEST TWO BITS IN M SEPARATION $$2^0\begin{bmatrix}1&1&1&1&3&3&3&3\\1&1&1&1&3&3&3&3\\1&1&1&1&3&3&3&3\\1&1&1&1&3&3&3&3\\2&2&2&2&0&0&0&0\\2&2&2&2&0&0&0&0\\2&2&2&2&0&0&0&0\\2&2&2&2&0&0&0&0\end{bmatrix}$$

Fig. 13(c) C SEPARATION

| | | | | | | | |
|---|---|---|---|---|---|---|---|
| 6 | 54 | 26 | 58 | 0 | 32 | 44 | 12 |
| 38 | 22 | 42 | 10 | 48 | 16 | 28 | 60 |
| 46 | 28 | 18 | 50 | 40 | 24 | 36 | 20 |
| 14 | 62 | 34 | 2 | 8 | 54 | 4 | 52 |
| 1 | 33 | 41 | 9 | 15 | 47 | 3 | 51 |
| 49 | 17 | 25 | 57 | 63 | 31 | 35 | 19 |
| 61 | 29 | 5 | 53 | 7 | 55 | 27 | 43 |
| 13 | 45 | 37 | 21 | 39 | 23 | 59 | 11 |

Fig. 13(g) LOWEST TWO BITS IN C SEPARATION $$2^0\begin{bmatrix}2&2&2&2&0&0&0&0\\2&2&2&2&0&0&0&0\\2&2&2&2&0&0&0&0\\2&2&2&2&0&0&0&0\\1&1&1&1&3&3&3&3\\1&1&1&1&3&3&3&3\\1&1&1&1&3&3&3&3\\1&1&1&1&3&3&3&3\end{bmatrix}$$

Fig. 13(d) K SEPARATION

| | | | | | | | |
|---|---|---|---|---|---|---|---|
| 7 | 55 | 27 | 59 | 1 | 33 | 45 | 13 |
| 39 | 23 | 43 | 11 | 49 | 17 | 29 | 61 |
| 47 | 29 | 19 | 51 | 41 | 25 | 37 | 21 |
| 15 | 63 | 35 | 3 | 9 | 59 | 5 | 55 |
| 0 | 34 | 40 | 8 | 14 | 46 | 2 | 50 |
| 48 | 16 | 24 | 56 | 62 | 30 | 34 | 18 |
| 60 | 28 | 4 | 52 | 6 | 54 | 26 | 42 |
| 12 | 44 | 36 | 20 | 38 | 22 | 58 | 10 |

Fig. 13(h) LOWEST TWO BITS IN K SEPARATION $$2^0\begin{bmatrix}3&3&3&3&1&1&1&1\\3&3&3&3&1&1&1&1\\3&3&3&3&1&1&1&1\\3&3&3&3&1&1&1&1\\0&0&0&0&2&2&2&2\\0&0&0&0&2&2&2&2\\0&0&0&0&2&2&2&2\\0&0&0&0&2&2&2&2\end{bmatrix}$$

Fig. 14(A)
INK SPOTS ACCORDING TO THRESHOLD MATRICES OF FIGS. 13(a)-13(d)
WHEN IMAGE DATA ID=1
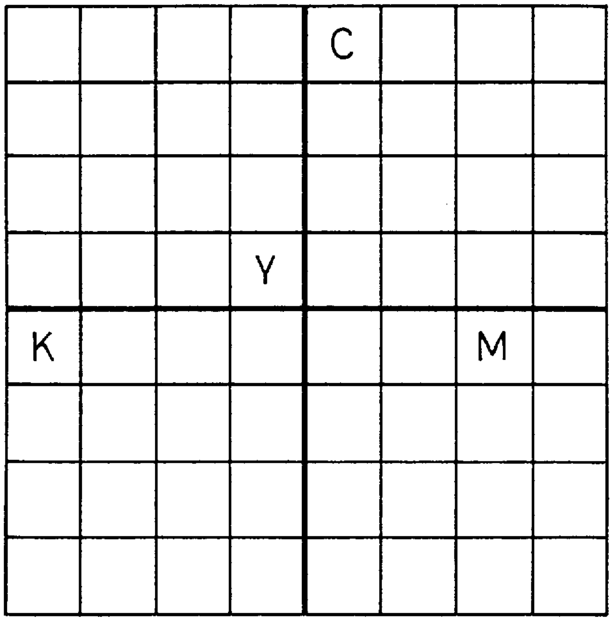
Fig. 14(B) WHEN IMAGE DATA ID=16
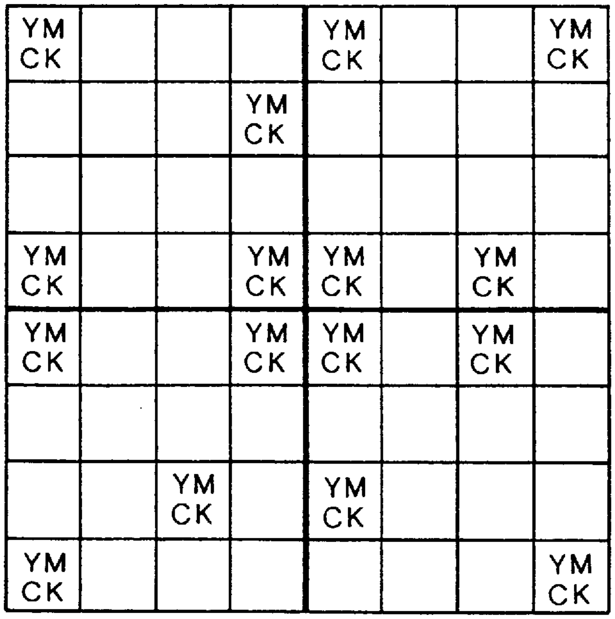

Fig. 15(a) Y SEPARATION (BASE MATRIX)

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

Fig. 15(b) M SEPARATION

| | | | | | | | |
|---|---|---|---|---|---|---|---|
| 36 | 20 | 56 | 24 | 34 | 2 | 14 | 46 |
| 4 | 52 | 8 | 40 | 18 | 50 | 62 | 30 |
| 12 | 60 | 48 | 16 | 10 | 58 | 6 | 54 |
| 44 | 28 | 0 | 32 | 42 | 26 | 38 | 22 |
| 35 | 3 | 11 | 43 | 45 | 13 | 33 | 17 |
| 19 | 51 | 59 | 27 | 29 | 61 | 1 | 49 |
| 31 | 63 | 39 | 23 | 37 | 21 | 57 | 9 |
| 47 | 15 | 7 | 55 | 5 | 53 | 25 | 41 |

Fig. 15(c) C SEPARATION

| | | | | | | | |
|---|---|---|---|---|---|---|---|
| 20 | 36 | 8 | 40 | 18 | 50 | 62 | 30 |
| 52 | 4 | 56 | 24 | 34 | 2 | 14 | 46 |
| 60 | 12 | 0 | 32 | 58 | 10 | 54 | 6 |
| 28 | 44 | 48 | 16 | 26 | 42 | 22 | 38 |
| 19 | 51 | 59 | 27 | 29 | 61 | 17 | 33 |
| 35 | 3 | 11 | 43 | 45 | 13 | 49 | 1 |
| 47 | 15 | 23 | 39 | 21 | 37 | 9 | 57 |
| 31 | 63 | 55 | 7 | 53 | 5 | 41 | 25 |

Fig. 15(d) K SEPARATION

| | | | | | | | |
|---|---|---|---|---|---|---|---|
| 52 | 4 | 40 | 8 | 50 | 18 | 30 | 62 |
| 20 | 36 | 24 | 56 | 2 | 34 | 46 | 14 |
| 28 | 44 | 32 | 0 | 26 | 42 | 22 | 38 |
| 60 | 12 | 16 | 48 | 58 | 10 | 54 | 6 |
| 51 | 19 | 27 | 59 | 61 | 29 | 49 | 1 |
| 3 | 35 | 43 | 11 | 13 | 45 | 17 | 33 |
| 15 | 47 | 55 | 7 | 53 | 5 | 41 | 25 |
| 63 | 31 | 23 | 39 | 21 | 37 | 9 | 57 |

Fig. 15(e) UPPERMOST TWO BITS IN Y SEPARATION $2^4$

| | | | | | | | |
|---|---|---|---|---|---|---|---|
| 0 | 3 | 1 | 3 | 0 | 2 | 2 | 0 |
| 2 | 1 | 2 | 0 | 3 | 1 | 1 | 3 |
| 2 | 1 | 1 | 3 | 2 | 1 | 2 | 1 |
| 0 | 3 | 2 | 0 | 0 | 3 | 0 | 3 |
| 0 | 2 | 2 | 0 | 0 | 2 | 0 | 3 |
| 3 | 1 | 1 | 3 | 3 | 1 | 2 | 1 |
| 3 | 1 | 0 | 3 | 0 | 3 | 1 | 2 |
| 0 | 2 | 2 | 1 | 2 | 1 | 3 | 0 |

Fig. 15(f) UPPERMOST TWO BITS IN M SEPARATION $2^4$

| | | | | | | | |
|---|---|---|---|---|---|---|---|
| 2 | 1 | 3 | 1 | 2 | 0 | 0 | 2 |
| 0 | 3 | 0 | 2 | 1 | 3 | 3 | 1 |
| 0 | 3 | 3 | 1 | 0 | 3 | 0 | 3 |
| 2 | 1 | 0 | 2 | 2 | 1 | 2 | 1 |
| 2 | 0 | 0 | 2 | 2 | 0 | 2 | 1 |
| 1 | 3 | 3 | 1 | 1 | 3 | 0 | 3 |
| 1 | 3 | 2 | 1 | 2 | 1 | 3 | 0 |
| 2 | 0 | 0 | 3 | 0 | 3 | 1 | 2 |

Fig. 15(g) UPPERMOST TWO BITS IN C SEPARATION $2^4$

| | | | | | | | |
|---|---|---|---|---|---|---|---|
| 1 | 2 | 0 | 2 | 1 | 3 | 3 | 1 |
| 3 | 0 | 3 | 1 | 2 | 0 | 0 | 2 |
| 3 | 0 | 0 | 2 | 3 | 0 | 3 | 0 |
| 1 | 2 | 3 | 1 | 1 | 2 | 1 | 2 |
| 1 | 3 | 3 | 1 | 1 | 3 | 1 | 2 |
| 2 | 0 | 0 | 2 | 2 | 0 | 3 | 0 |
| 2 | 0 | 1 | 2 | 1 | 2 | 0 | 3 |
| 1 | 3 | 3 | 0 | 3 | 0 | 2 | 1 |

Fig. 15(h) UPPERMOST TWO BITS IN K SEPARATION $2^4$

| | | | | | | | |
|---|---|---|---|---|---|---|---|
| 3 | 0 | 2 | 0 | 3 | 1 | 1 | 3 |
| 1 | 2 | 1 | 3 | 0 | 2 | 2 | 0 |
| 1 | 2 | 2 | 0 | 1 | 2 | 1 | 2 |
| 3 | 0 | 1 | 3 | 3 | 0 | 3 | 0 |
| 3 | 1 | 1 | 3 | 3 | 1 | 3 | 0 |
| 0 | 2 | 2 | 0 | 0 | 2 | 1 | 2 |
| 0 | 2 | 3 | 0 | 3 | 0 | 2 | 1 |
| 3 | 1 | 1 | 2 | 1 | 2 | 0 | 3 |

Fig. 16(A)

INK SPOTS ACCORDING TO THRESHOLD MATRICES OF FIGS. 15(a)-15(d)

WHEN IMAGE DATA ID=1

| | | | | | | | |
|---|---|---|---|---|---|---|---|
| | | | | | | | |
| | | | | | | | |
| | | C | K | | | | |
| | | M | Y | | | | |
| | | | | | | | |
| | | | | | | | |
| | | | | | | | |
| | | | | | | | |

Fig. 16(B) WHEN IMAGE DATA ID=16

| | | | | | | | |
|---|---|---|---|---|---|---|---|
| Y | K | C | K | Y | M | M | Y |
| M | C | M | Y | K | C | C | K |
| M | C | C | K | M | C | M | C |
| Y | K | M | Y | Y | K | K | K |
| Y | M | M | Y | Y | M | Y | K |
| K | C | C | K | K | C | M | C |
| K | C | Y | K | Y | K | C | M |
| Y | M | M | C | M | C | K | Y |

Fig. 17(a) Y SEPARATION (BASE MATRIX)

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

Fig. 17(b) M SEPARATION

| | | | | | | | |
|---|---|---|---|---|---|---|---|
| 37 | 21 | 57 | 25 | 35 | 3 | 15 | 47 |
| 5 | 53 | 9 | 41 | 19 | 51 | 63 | 31 |
| 13 | 61 | 49 | 17 | 11 | 59 | 7 | 55 |
| 45 | 29 | 1 | 33 | 43 | 27 | 39 | 23 |
| 34 | 2 | 10 | 42 | 44 | 12 | 32 | 16 |
| 18 | 50 | 58 | 26 | 28 | 60 | 0 | 48 |
| 30 | 62 | 38 | 22 | 36 | 20 | 56 | 8 |
| 46 | 14 | 6 | 54 | 4 | 52 | 24 | 40 |

Fig. 17(c) C SEPARATION

| | | | | | | | |
|---|---|---|---|---|---|---|---|
| 22 | 38 | 10 | 42 | 16 | 49 | 60 | 28 |
| 54 | 6 | 58 | 26 | 32 | 0 | 12 | 44 |
| 62 | 14 | 2 | 34 | 56 | 8 | 52 | 4 |
| 30 | 46 | 50 | 18 | 24 | 40 | 20 | 36 |
| 17 | 49 | 57 | 25 | 31 | 63 | 19 | 35 |
| 33 | 1 | 9 | 41 | 47 | 15 | 51 | 3 |
| 45 | 13 | 21 | 37 | 23 | 39 | 19 | 59 |
| 29 | 61 | 53 | 5 | 55 | 7 | 43 | 27 |

Fig. 17(d) K SEPARATION

| | | | | | | | |
|---|---|---|---|---|---|---|---|
| 55 | 7 | 43 | 11 | 49 | 17 | 29 | 61 |
| 23 | 39 | 27 | 59 | 1 | 33 | 45 | 13 |
| 31 | 47 | 35 | 3 | 25 | 41 | 21 | 37 |
| 63 | 15 | 19 | 51 | 57 | 9 | 53 | 5 |
| 48 | 16 | 24 | 56 | 62 | 30 | 50 | 2 |
| 0 | 32 | 40 | 8 | 14 | 46 | 18 | 34 |
| 12 | 44 | 52 | 4 | 54 | 6 | 43 | 26 |
| 60 | 28 | 20 | 36 | 22 | 38 | 10 | 59 |

Fig. 18(A)

INK SPOTS ACCORDING TO THRESHOLD MATRICES OF FIGS. 17(a)-17(d)

WHEN IMAGE DATA ID=1

| | | | | | | | |
|---|---|---|---|---|---|---|---|
| | | | | | | | |
| | | | | | C | | |
| | | | | | | | |
| | | | Y | | | | |
| | | | | | | | |
| K | | | | | | M | |
| | | | | | | | |
| | | | | | | | |

Fig. 18(B) WHEN IMAGE DATA ID=16

| | | | | | | | |
|---|---|---|---|---|---|---|---|
| Y | K | C | K | Y | M | M | Y |
| M | C | M | Y | K | C | C | K |
| M | C | C | K | M | C | M | C |
| Y | K | M | Y | Y | K | Y | K |
| Y | M | M | Y | Y | M | Y | K |
| K | C | C | K | K | C | M | C |
| K | C | Y | K | Y | K | C | M |
| Y | M | M | C | M | C | K | Y |

Fig. 19(A)

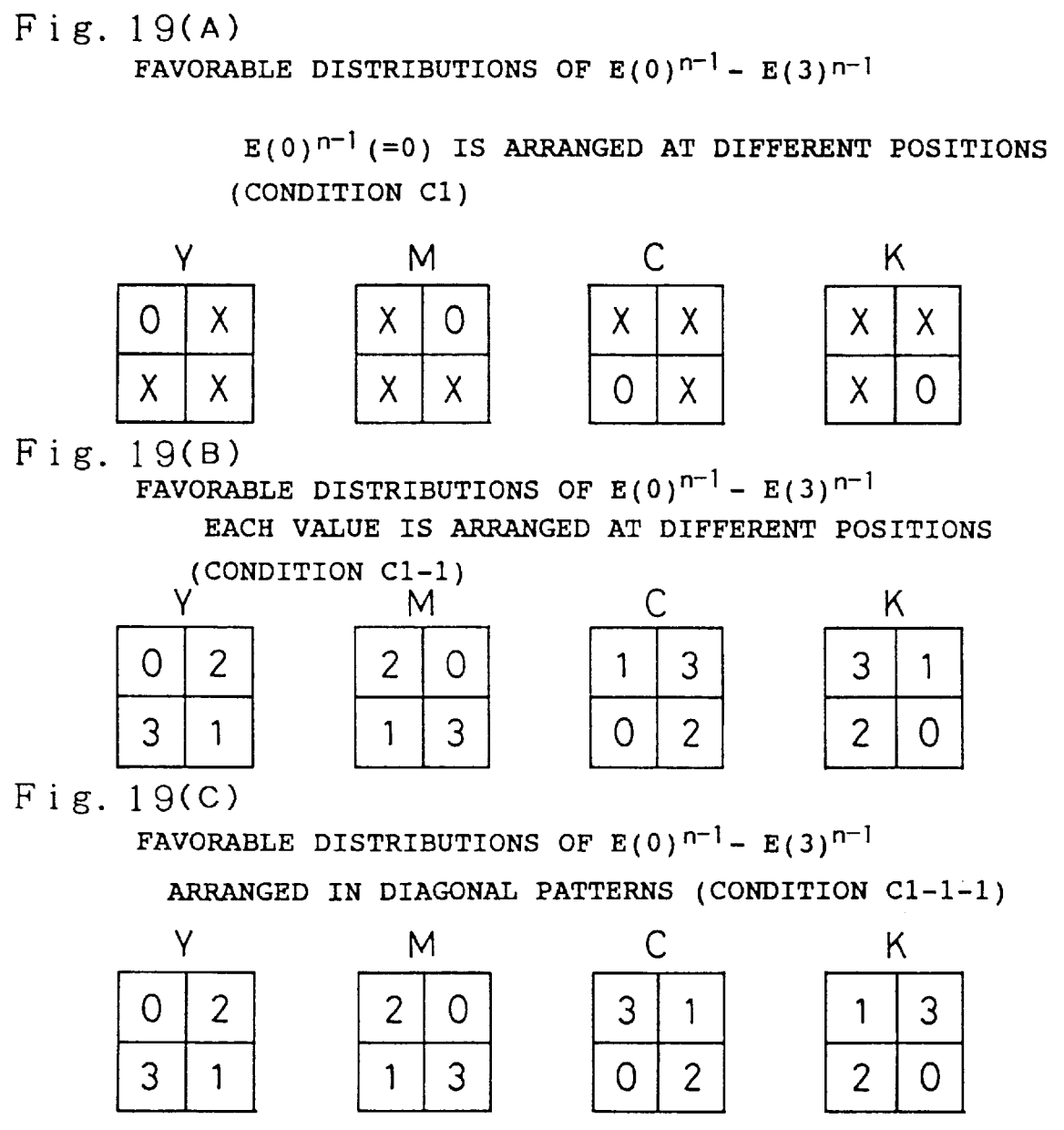

FAVORABLE DISTRIBUTIONS OF $E(0)^{n-1}$ - $E(3)^{n-1}$ $E(0)^{n-1}$ (=0) IS ARRANGED AT DIFFERENT POSITIONS (CONDITION C1)

Y

| | |
|---|---|
| 0 | X |
| X | X |

M

| | |
|---|---|
| X | 0 |
| X | X |

C

| | |
|---|---|
| X | X |
| 0 | X |

K

| | |
|---|---|
| X | X |
| X | 0 |

Fig. 19(B)

FAVORABLE DISTRIBUTIONS OF $E(0)^{n-1}$ - $E(3)^{n-1}$

EACH VALUE IS ARRANGED AT DIFFERENT POSITIONS (CONDITION C1-1)

Y

| | |
|---|---|
| 0 | 2 |
| 3 | 1 |

M

| | |
|---|---|
| 2 | 0 |
| 1 | 3 |

C

| | |
|---|---|
| 1 | 3 |
| 0 | 2 |

K

| | |
|---|---|
| 3 | 1 |
| 2 | 0 |

Fig. 19(C)

FAVORABLE DISTRIBUTIONS OF $E(0)^{n-1}$ - $E(3)^{n-1}$

ARRANGED IN DIAGONAL PATTERNS (CONDITION C1-1-1)

Y

| | |
|---|---|
| 0 | 2 |
| 3 | 1 |

M

| | |
|---|---|
| 2 | 0 |
| 1 | 3 |

C

| | |
|---|---|
| 3 | 1 |
| 0 | 2 |

K

| | |
|---|---|
| 1 | 3 |
| 2 | 0 |

Fig. 20(A)
VARIOUS BIT OPERATIONS
IN BINARY NOTATION
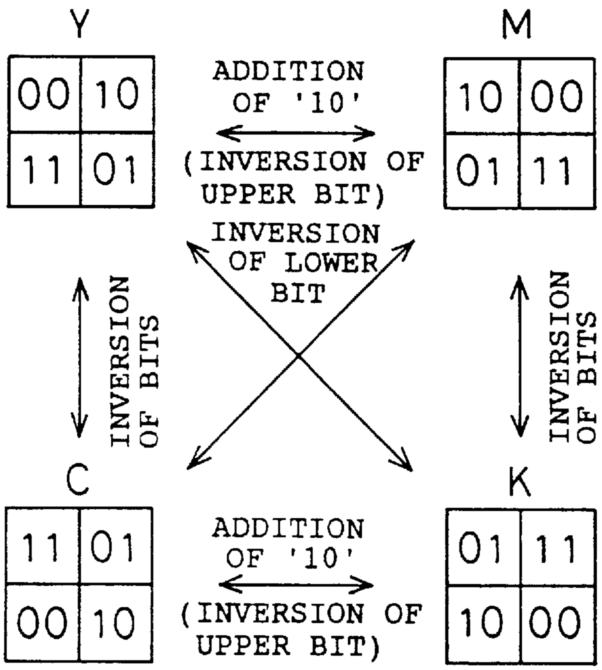
Fig. 20(B) IN QUATERNARY NOTATION
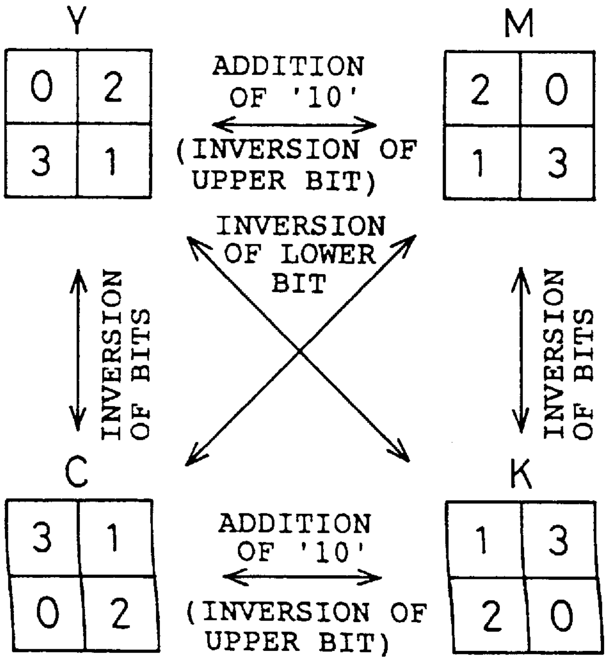

THRESHOLD MATRICES SATISFYING CONDITION C3-1-1

Fig. 21(a) Y SEPARATION

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

Fig. 21(b) M SEPARATION

| | | | | | | | |
|---|---|---|---|---|---|---|---|
| 17 | 33 | 13 | 45 | 23 | 55 | 59 | 27 |
| 49 | 1 | 61 | 29 | 39 | 7 | 11 | 43 |
| 57 | 9 | 5 | 37 | 63 | 15 | 51 | 3 |
| 25 | 41 | 53 | 21 | 31 | 47 | 19 | 35 |
| 22 | 54 | 62 | 30 | 24 | 56 | 20 | 36 |
| 38 | 6 | 14 | 46 | 40 | 8 | 52 | 4 |
| 42 | 10 | 18 | 34 | 16 | 32 | 12 | 60 |
| 26 | 58 | 50 | 2 | 48 | 0 | 44 | 28 |

Fig. 21(c) C SEPARATION

| | | | | | | | |
|---|---|---|---|---|---|---|---|
| 58 | 10 | 54 | 22 | 44 | 12 | 0 | 32 |
| 26 | 42 | 6 | 38 | 28 | 60 | 48 | 16 |
| 18 | 34 | 62 | 30 | 20 | 36 | 24 | 40 |
| 50 | 2 | 14 | 46 | 52 | 4 | 56 | 8 |
| 41 | 9 | 1 | 33 | 35 | 3 | 63 | 15 |
| 25 | 57 | 49 | 17 | 19 | 51 | 31 | 47 |
| 21 | 53 | 61 | 13 | 59 | 11 | 39 | 23 |
| 37 | 5 | 29 | 45 | 27 | 43 | 7 | 55 |

Fig. 21(d) K SEPARATION

| | | | | | | | |
|---|---|---|---|---|---|---|---|
| 47 | 31 | 35 | 3 | 57 | 25 | 21 | 53 |
| 15 | 63 | 19 | 51 | 9 | 41 | 37 | 5 |
| 7 | 55 | 43 | 11 | 1 | 49 | 13 | 61 |
| 39 | 23 | 27 | 59 | 33 | 17 | 45 | 29 |
| 60 | 28 | 20 | 52 | 54 | 22 | 42 | 26 |
| 12 | 44 | 36 | 4 | 6 | 38 | 10 | 58 |
| 0 | 32 | 40 | 24 | 46 | 30 | 50 | 2 |
| 48 | 16 | 8 | 56 | 14 | 62 | 18 | 34 |

DISTRIBUTION OF LOWEST TWO BITS $E(0)^2$ - $E(3)^2$ IN THRESHOLD MATRICES OF FIGS. 21(a)-21(d)

Fig. 22(a) Y SEPARATION $$2^0\begin{bmatrix} 0&0&0&0&2&2&2&2\\ 0&0&0&0&2&2&2&2\\ 0&0&0&0&2&2&2&2\\ 0&0&0&0&2&2&2&2\\ 3&3&3&3&1&1&1&1\\ 3&3&3&3&1&1&1&1\\ 3&3&3&3&1&1&1&1\\ 3&3&3&3&1&1&1&1 \end{bmatrix}$$

Fig. 22(b) M SEPARATION $$2^0\begin{bmatrix} 1&1&1&1&3&3&3&3\\ 1&1&1&1&3&3&3&3\\ 1&1&1&1&3&3&3&3\\ 1&1&1&1&3&3&3&3\\ 2&2&2&2&0&0&0&0\\ 2&2&2&2&0&0&0&0\\ 2&2&2&2&0&0&0&0\\ 2&2&2&2&0&0&0&0 \end{bmatrix}$$

Fig. 22(c) C SEPARATION $$2^0\begin{bmatrix} 2&2&2&2&0&0&0&0\\ 2&2&2&2&0&0&0&0\\ 2&2&2&2&0&0&0&0\\ 2&2&2&2&0&0&0&0\\ 1&1&1&1&3&3&3&3\\ 1&1&1&1&3&3&3&3\\ 1&1&1&1&3&3&3&3\\ 1&1&1&1&3&3&3&3 \end{bmatrix}$$

Fig. 22(d) K SEPARATION $$2^0\begin{bmatrix} 3&3&3&3&1&1&1&1\\ 3&3&3&3&1&1&1&1\\ 3&3&3&3&1&1&1&1\\ 3&3&3&3&1&1&1&1\\ 0&0&0&0&2&2&2&2\\ 0&0&0&0&2&2&2&2\\ 0&0&0&0&2&2&2&2\\ 0&0&0&0&2&2&2&2 \end{bmatrix}$$

DISTRIBUTION OF MEDIUM TWO BITS $E(0)^1$ - $E(3)^1$ IN THRESHOLD MATRICES OF FIGS. 21(a)-21(d)

Fig. 23(a) Y SEPARATION $2^2$

| | | | | | | | |
|---|---|---|---|---|---|---|---|
| 1 | 1 | 2 | 2 | 0 | 0 | 3 | 3 |
| 1 | 1 | 2 | 2 | 0 | 0 | 3 | 3 |
| 3 | 3 | 0 | 0 | 2 | 2 | 1 | 1 |
| 3 | 3 | 0 | 0 | 2 | 2 | 1 | 1 |
| 0 | 0 | 2 | 2 | 3 | 3 | 0 | 0 |
| 0 | 0 | 2 | 2 | 3 | 3 | 0 | 0 |
| 3 | 3 | 1 | 1 | 1 | 1 | 2 | 2 |
| 3 | 3 | 1 | 1 | 1 | 1 | 2 | 2 |

Fig. 23(b) M SEPARATION $2^2$

| | | | | | | | |
|---|---|---|---|---|---|---|---|
| 0 | 0 | 3 | 3 | 1 | 1 | 2 | 2 |
| 0 | 0 | 3 | 3 | 1 | 1 | 2 | 2 |
| 2 | 2 | 1 | 1 | 3 | 3 | 0 | 0 |
| 2 | 2 | 1 | 1 | 3 | 3 | 0 | 0 |
| 1 | 1 | 3 | 3 | 2 | 2 | 1 | 1 |
| 1 | 1 | 3 | 3 | 2 | 2 | 1 | 1 |
| 2 | 2 | 0 | 0 | 0 | 0 | 3 | 3 |
| 2 | 2 | 0 | 0 | 0 | 0 | 3 | 3 |

Fig. 23(c) C SEPARATION $2^2$

| | | | | | | | |
|---|---|---|---|---|---|---|---|
| 2 | 2 | 1 | 1 | 3 | 3 | 0 | 0 |
| 2 | 2 | 1 | 1 | 3 | 3 | 0 | 0 |
| 0 | 0 | 3 | 3 | 1 | 1 | 2 | 2 |
| 0 | 0 | 3 | 3 | 1 | 1 | 2 | 2 |
| 2 | 2 | 0 | 0 | 0 | 0 | 3 | 3 |
| 2 | 2 | 0 | 0 | 0 | 0 | 3 | 3 |
| 1 | 1 | 3 | 3 | 2 | 2 | 1 | 1 |
| 1 | 1 | 3 | 3 | 2 | 2 | 1 | 1 |

Fig. 23(d) K SEPARATION $2^2$

| | | | | | | | |
|---|---|---|---|---|---|---|---|
| 3 | 3 | 0 | 0 | 2 | 2 | 1 | 1 |
| 3 | 3 | 0 | 0 | 2 | 2 | 1 | 1 |
| 1 | 1 | 2 | 2 | 0 | 0 | 3 | 3 |
| 1 | 1 | 2 | 2 | 0 | 0 | 3 | 3 |
| 3 | 3 | 1 | 1 | 1 | 1 | 2 | 2 |
| 3 | 3 | 1 | 1 | 1 | 1 | 2 | 2 |
| 0 | 0 | 2 | 2 | 3 | 3 | 0 | 0 |
| 0 | 0 | 2 | 2 | 3 | 3 | 0 | 0 |

DISTRIBUTION OF UPPERMOST TWO BITS $E(0)^0$ - $E(3)^0$ IN THRESHOLD MATRICES OF FIGS. 21(a)-21(d)

Fig. 24(a) Y SEPARATION $2^4$

| | | | | | | | |
|---|---|---|---|---|---|---|---|
| 0 | 3 | 1 | 3 | 0 | 2 | 2 | 0 |
| 2 | 1 | 2 | 0 | 3 | 1 | 1 | 3 |
| 2 | 1 | 1 | 3 | 2 | 1 | 2 | 1 |
| 0 | 3 | 2 | 0 | 0 | 3 | 0 | 3 |
| 0 | 2 | 2 | 0 | 0 | 2 | 0 | 3 |
| 3 | 1 | 1 | 3 | 3 | 1 | 2 | 1 |
| 3 | 1 | 0 | 3 | 0 | 3 | 1 | 2 |
| 0 | 2 | 2 | 1 | 2 | 1 | 3 | 0 |

Fig. 24(b) M SEPARATION $2^4$

| | | | | | | | |
|---|---|---|---|---|---|---|---|
| 1 | 2 | 0 | 2 | 1 | 3 | 3 | 1 |
| 3 | 0 | 3 | 1 | 2 | 0 | 0 | 2 |
| 3 | 0 | 0 | 2 | 3 | 0 | 3 | 0 |
| 1 | 2 | 3 | 1 | 1 | 2 | 1 | 2 |
| 1 | 3 | 3 | 1 | 1 | 3 | 1 | 2 |
| 2 | 0 | 0 | 2 | 2 | 0 | 3 | 0 |
| 2 | 0 | 1 | 2 | 1 | 2 | 0 | 3 |
| 1 | 3 | 3 | 0 | 3 | 0 | 2 | 1 |

Fig. 24(c) C SEPARATION $2^4$

| | | | | | | | |
|---|---|---|---|---|---|---|---|
| 3 | 0 | 3 | 1 | 2 | 0 | 0 | 2 |
| 1 | 2 | 0 | 2 | 1 | 3 | 3 | 1 |
| 1 | 2 | 3 | 1 | 1 | 2 | 1 | 2 |
| 3 | 0 | 0 | 2 | 3 | 0 | 3 | 0 |
| 2 | 0 | 0 | 2 | 2 | 0 | 3 | 0 |
| 1 | 3 | 3 | 1 | 1 | 3 | 1 | 2 |
| 1 | 3 | 3 | 0 | 3 | 0 | 2 | 1 |
| 2 | 0 | 1 | 2 | 1 | 2 | 0 | 3 |

Fig. 24(d) K SEPARATION $2^4$

| | | | | | | | |
|---|---|---|---|---|---|---|---|
| 2 | 1 | 2 | 0 | 3 | 1 | 1 | 3 |
| 0 | 3 | 1 | 3 | 0 | 2 | 2 | 0 |
| 0 | 3 | 2 | 0 | 0 | 3 | 0 | 3 |
| 2 | 1 | 1 | 3 | 2 | 1 | 2 | 1 |
| 3 | 1 | 1 | 3 | 3 | 1 | 2 | 1 |
| 0 | 2 | 2 | 0 | 0 | 2 | 0 | 3 |
| 0 | 2 | 2 | 1 | 2 | 1 | 3 | 0 |
| 3 | 1 | 0 | 3 | 0 | 3 | 1 | 2 |

Fig. 25(A)

INK SPOTS ACCORDING TO THRESHOLD MATRICES OF FIGS. 21(a)-21(d)

WHEN IMAGE DATA ID=16

| | | | | | | | |
|---|---|---|---|---|---|---|---|
| Y | C | M | K | Y | C | C | Y |
| K | M | C | Y | K | M | M | K |
| K | M | M | K | K | M | K | M |
| Y | C | C | Y | Y | C | Y | C |
| Y | C | C | Y | Y | C | Y | C |
| K | M | M | K | K | M | K | M |
| K | M | Y | C | Y | C | M | K |
| Y | C | K | M | K | M | C | Y |

Fig. 25(B) WHEN IMAGE DATA ID=32

| | | | | | | | |
|---|---|---|---|---|---|---|---|
| YM | CK | YM | CK | YM | CK | CK | YM |
| CK | YM | CK | YM | CK | YM | YM | CK |
| CK | YM | YM | CK | CK | YM | CK | YM |
| YM | CK | CK | YM | YM | CK | YM | CK |
| YM | CK | CK | YM | YM | CK | YM | CK |
| CK | YM | YM | CK | CK | YM | CK | YM |
| CK | YM | YM | CK | YM | CK | YM | CK |
| YM | CK | CK | YM | CK | YM | CK | YM |

THRESHOLD MATRICES OBTAINED BY INVERTING EACH BIT OF M AND C SEPARATIONS

Fig. 26(a) Y SEPARATION

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

Fig. 26(b) M SEPARATION

| | | | | | | | |
|---|---|---|---|---|---|---|---|
| 17 | 33 | 13 | 45 | 23 | 55 | 59 | 27 |
| 49 | 1 | 61 | 29 | 39 | 7 | 11 | 43 |
| 57 | 9 | 5 | 37 | 63 | 15 | 51 | 3 |
| 25 | 41 | 53 | 21 | 31 | 47 | 19 | 35 |
| 22 | 54 | 62 | 30 | 24 | 56 | 20 | 36 |
| 38 | 6 | 14 | 46 | 40 | 8 | 52 | 4 |
| 42 | 10 | 18 | 34 | 16 | 32 | 12 | 60 |
| 26 | 58 | 50 | 2 | 48 | 0 | 44 | 28 |

Fig. 26(c) C SEPARATION

| | | | | | | | |
|---|---|---|---|---|---|---|---|
| 46 | 30 | 50 | 18 | 40 | 8 | 4 | 36 |
| 14 | 62 | 2 | 34 | 24 | 56 | 52 | 20 |
| 6 | 54 | 58 | 26 | 0 | 48 | 12 | 60 |
| 38 | 22 | 10 | 42 | 32 | 16 | 44 | 28 |
| 41 | 9 | 1 | 33 | 39 | 7 | 43 | 27 |
| 25 | 57 | 49 | 17 | 23 | 55 | 11 | 59 |
| 21 | 53 | 45 | 29 | 47 | 31 | 51 | 3 |
| 37 | 5 | 13 | 61 | 15 | 63 | 19 | 35 |

Fig. 26(d) K SEPARATION

| | | | | | | | |
|---|---|---|---|---|---|---|---|
| 59 | 11 | 39 | 7 | 61 | 29 | 17 | 49 |
| 27 | 43 | 23 | 55 | 13 | 45 | 33 | 1 |
| 19 | 35 | 47 | 15 | 21 | 37 | 25 | 41 |
| 51 | 3 | 31 | 63 | 53 | 5 | 57 | 9 |
| 60 | 28 | 20 | 52 | 50 | 18 | 62 | 14 |
| 12 | 44 | 36 | 4 | 2 | 34 | 30 | 46 |
| 0 | 32 | 56 | 8 | 58 | 10 | 38 | 22 |
| 48 | 16 | 24 | 40 | 26 | 42 | 6 | 54 |

DISTRIBUTION OF LOWEST TWO BITS $E(0)^2$ - $E(3)^2$ IN THRESHOLD MATRICES OF FIGS. 26(a)-26(d)

Fig. 27(a) Y SEPARATION $$2^0\begin{bmatrix} 0&0&0&0&2&2&2&2\\ 0&0&0&0&2&2&2&2\\ 0&0&0&0&2&2&2&2\\ 0&0&0&0&2&2&2&2\\ 3&3&3&3&1&1&1&1\\ 3&3&3&3&1&1&1&1\\ 3&3&3&3&1&1&1&1\\ 3&3&3&3&1&1&1&1 \end{bmatrix}$$

Fig. 27(b) M SEPARATION $$2^0\begin{bmatrix} 1&1&1&1&3&3&3&3\\ 1&1&1&1&3&3&3&3\\ 1&1&1&1&3&3&3&3\\ 1&1&1&1&3&3&3&3\\ 2&2&2&2&0&0&0&0\\ 2&2&2&2&0&0&0&0\\ 2&2&2&2&0&0&0&0\\ 2&2&2&2&0&0&0&0 \end{bmatrix}$$

INVERSION OF BITS

Fig. 27(c) C SEPARATION $$2^0\begin{bmatrix} 2&2&2&2&0&0&0&0\\ 2&2&2&2&0&0&0&0\\ 2&2&2&2&0&0&0&0\\ 2&2&2&2&0&0&0&0\\ 1&1&1&1&3&3&3&3\\ 1&1&1&1&3&3&3&3\\ 1&1&1&1&3&3&3&3\\ 1&1&1&1&3&3&3&3 \end{bmatrix}$$

Fig. 27(d) K SEPARATION $$2^0\begin{bmatrix} 3&3&3&3&1&1&1&1\\ 3&3&3&3&1&1&1&1\\ 3&3&3&3&1&1&1&1\\ 3&3&3&3&1&1&1&1\\ 0&0&0&0&2&2&2&2\\ 0&0&0&0&2&2&2&2\\ 0&0&0&0&2&2&2&2\\ 0&0&0&0&2&2&2&2 \end{bmatrix}$$

DISTRIBUTION OF MEDIUM TWO BITS $E(0)^1$ - $E(3)^1$ IN THRESHOLD MATRICES OF FIGS. 26(a)-26(d)

Fig. 28(a) Y SEPARATION $2^2$

| | | | | | | | |
|---|---|---|---|---|---|---|---|
| 1 | 1 | 2 | 2 | 0 | 0 | 3 | 3 |
| 1 | 1 | 2 | 2 | 0 | 0 | 3 | 3 |
| 3 | 3 | 0 | 0 | 2 | 2 | 1 | 1 |
| 3 | 3 | 0 | 0 | 2 | 2 | 1 | 1 |
| 0 | 0 | 2 | 2 | 3 | 3 | 0 | 0 |
| 0 | 0 | 2 | 2 | 3 | 3 | 0 | 0 |
| 3 | 3 | 1 | 1 | 1 | 1 | 2 | 2 |
| 3 | 3 | 1 | 1 | 1 | 1 | 2 | 2 |

Fig. 28(b) M SEPARATION $2^2$

| | | | | | | | |
|---|---|---|---|---|---|---|---|
| 0 | 0 | 3 | 3 | 1 | 1 | 2 | 2 |
| 0 | 0 | 3 | 3 | 1 | 1 | 2 | 2 |
| 2 | 2 | 1 | 1 | 3 | 3 | 0 | 0 |
| 2 | 2 | 1 | 1 | 3 | 3 | 0 | 0 |
| 1 | 1 | 3 | 3 | 2 | 2 | 1 | 1 |
| 1 | 1 | 3 | 3 | 2 | 2 | 1 | 1 |
| 2 | 2 | 0 | 0 | 0 | 0 | 3 | 3 |
| 2 | 2 | 0 | 0 | 0 | 0 | 3 | 3 |

INVERSION OF BITS

Fig. 28(c) C SEPARATION $2^2$

| | | | | | | | |
|---|---|---|---|---|---|---|---|
| 3 | 3 | 0 | 0 | 2 | 2 | 1 | 1 |
| 3 | 3 | 0 | 0 | 2 | 2 | 1 | 1 |
| 1 | 1 | 2 | 2 | 0 | 0 | 3 | 3 |
| 1 | 1 | 2 | 2 | 0 | 0 | 3 | 3 |
| 2 | 2 | 0 | 0 | 1 | 1 | 2 | 2 |
| 2 | 2 | 0 | 0 | 1 | 1 | 2 | 2 |
| 1 | 1 | 3 | 3 | 3 | 3 | 0 | 0 |
| 1 | 1 | 3 | 3 | 3 | 3 | 0 | 0 |

Fig. 28(d) K SEPARATION $2^2$

| | | | | | | | |
|---|---|---|---|---|---|---|---|
| 2 | 2 | 1 | 1 | 3 | 3 | 0 | 0 |
| 2 | 2 | 1 | 1 | 3 | 3 | 0 | 0 |
| 0 | 0 | 3 | 3 | 1 | 1 | 2 | 2 |
| 0 | 0 | 3 | 3 | 1 | 1 | 2 | 2 |
| 3 | 3 | 1 | 1 | 0 | 0 | 3 | 3 |
| 3 | 3 | 1 | 1 | 0 | 0 | 3 | 3 |
| 0 | 0 | 2 | 2 | 2 | 2 | 1 | 1 |
| 0 | 0 | 2 | 2 | 2 | 2 | 1 | 1 |

DISTRIBUTION OF UPPERMOST TWO BITS $E(0)^0$ - $E(3)^0$ IN THRESHOLD MATRICES OF FIGS. 26(a)-26(d)

Fig. 29(a) Y SEPARATION $2^4$

| | | | | | | | |
|---|---|---|---|---|---|---|---|
| 0 | 3 | 1 | 3 | 0 | 2 | 2 | 0 |
| 2 | 1 | 2 | 0 | 3 | 1 | 1 | 3 |
| 2 | 1 | 1 | 3 | 2 | 1 | 2 | 1 |
| 0 | 3 | 2 | 0 | 0 | 3 | 0 | 3 |
| 0 | 2 | 2 | 0 | 0 | 2 | 0 | 3 |
| 3 | 1 | 1 | 3 | 3 | 1 | 2 | 1 |
| 3 | 1 | 0 | 3 | 0 | 3 | 1 | 2 |
| 0 | 2 | 2 | 1 | 2 | 1 | 3 | 0 |

Fig. 29(b) M SEPARATION $2^4$

| | | | | | | | |
|---|---|---|---|---|---|---|---|
| 1 | 2 | 0 | 2 | 1 | 3 | 3 | 1 |
| 3 | 0 | 3 | 1 | 2 | 0 | 0 | 2 |
| 3 | 0 | 0 | 2 | 3 | 0 | 3 | 0 |
| 1 | 2 | 3 | 1 | 1 | 2 | 1 | 2 |
| 1 | 3 | 3 | 1 | 1 | 3 | 1 | 2 |
| 2 | 0 | 0 | 2 | 2 | 0 | 3 | 0 |
| 2 | 0 | 1 | 2 | 1 | 2 | 0 | 3 |
| 1 | 3 | 3 | 0 | 3 | 0 | 2 | 1 |

INVERSION OF BITS

Fig. 29(c) C SEPARATION $2^4$

| | | | | | | | |
|---|---|---|---|---|---|---|---|
| 2 | 1 | 3 | 1 | 2 | 0 | 0 | 2 |
| 0 | 3 | 0 | 2 | 1 | 3 | 3 | 1 |
| 0 | 3 | 3 | 1 | 0 | 3 | 0 | 3 |
| 2 | 1 | 0 | 2 | 2 | 1 | 2 | 1 |
| 2 | 0 | 0 | 2 | 2 | 0 | 2 | 1 |
| 1 | 3 | 3 | 1 | 1 | 3 | 0 | 3 |
| 1 | 3 | 2 | 1 | 2 | 1 | 3 | 0 |
| 2 | 0 | 0 | 3 | 0 | 3 | 1 | 2 |

Fig. 29(d) K SEPARATION $2^4$

| | | | | | | | |
|---|---|---|---|---|---|---|---|
| 3 | 0 | 2 | 0 | 3 | 1 | 1 | 3 |
| 1 | 2 | 1 | 3 | 0 | 2 | 2 | 0 |
| 1 | 2 | 2 | 0 | 1 | 2 | 1 | 2 |
| 3 | 0 | 1 | 3 | 3 | 0 | 3 | 0 |
| 3 | 1 | 1 | 3 | 3 | 1 | 3 | 0 |
| 0 | 2 | 2 | 0 | 0 | 2 | 1 | 2 |
| 0 | 2 | 3 | 0 | 3 | 0 | 2 | 1 |
| 3 | 1 | 1 | 2 | 1 | 2 | 0 | 3 |

THRESHOLD MATRICES OBTAINED BY ARRANGING UPPERMOST TWO BITS AT RANDOM

Fig. 30(a) Y SEPARATION

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

Fig. 30(b) M SEPARATION

| | | | | | | | |
|---|---|---|---|---|---|---|---|
| 33 | 1 | 45 | 29 | 55 | 23 | 43 | 11 |
| 17 | 49 | 13 | 61 | 7 | 39 | 27 | 59 |
| 25 | 57 | 37 | 21 | 31 | 63 | 51 | 3 |
| 41 | 9 | 5 | 53 | 47 | 15 | 19 | 35 |
| 54 | 6 | 14 | 46 | 40 | 24 | 20 | 36 |
| 22 | 38 | 62 | 30 | 8 | 56 | 52 | 4 |
| 10 | 42 | 34 | 18 | 0 | 48 | 12 | 60 |
| 58 | 26 | 2 | 50 | 32 | 16 | 44 | 28 |

Fig. 30(c) C SEPARATION

| | | | | | | | |
|---|---|---|---|---|---|---|---|
| 10 | 58 | 6 | 38 | 44 | 12 | 16 | 32 |
| 42 | 26 | 54 | 22 | 28 | 60 | 48 | 0 |
| 50 | 18 | 62 | 30 | 4 | 52 | 40 | 8 |
| 2 | 34 | 14 | 46 | 36 | 20 | 24 | 56 |
| 41 | 9 | 33 | 17 | 51 | 3 | 47 | 31 |
| 25 | 57 | 1 | 49 | 19 | 35 | 15 | 63 |
| 53 | 21 | 61 | 29 | 27 | 59 | 23 | 39 |
| 5 | 37 | 13 | 45 | 43 | 11 | 55 | 7 |

Fig. 30(d) K SEPARATION

| | | | | | | | |
|---|---|---|---|---|---|---|---|
| 31 | 47 | 19 | 35 | 57 | 25 | 5 | 37 |
| 63 | 15 | 51 | 3 | 9 | 41 | 53 | 21 |
| 7 | 55 | 59 | 27 | 1 | 49 | 61 | 29 |
| 39 | 23 | 11 | 43 | 33 | 17 | 13 | 45 |
| 44 | 12 | 52 | 20 | 38 | 6 | 58 | 10 |
| 28 | 60 | 4 | 36 | 22 | 54 | 26 | 42 |
| 32 | 0 | 8 | 40 | 14 | 46 | 2 | 50 |
| 16 | 48 | 56 | 24 | 62 | 30 | 34 | 18 |

DISTRIBUTION OF UPPERMOST TWO BITS $E(0)^0 - E(3)^0$ IN THRESHOLD MATRICES OF FIGS. 30(a)-30(d)
(WITH RANDOM DISTRIBUTIONS OF DIAGONAL PATTERN)

Fig. 31(a) Y SEPARATION $$2^4\begin{bmatrix} 0&3&1&3&0&2&2&0\\ 2&1&2&0&3&1&1&3\\ 2&1&1&3&2&1&2&1\\ 0&3&2&0&0&3&0&3\\ 0&2&2&0&0&2&0&3\\ 3&1&1&3&3&1&2&1\\ 3&1&0&3&0&3&1&2\\ 0&2&2&1&2&1&3&0 \end{bmatrix}$$

Fig. 31(b) M SEPARATION $$2^4\begin{bmatrix} 2&0&2&1&3&1&2&0\\ 1&3&0&3&0&2&1&3\\ 1&3&2&1&1&3&3&0\\ 2&0&0&2&2&0&1&2\\ 3&0&0&2&2&1&1&2\\ 1&2&3&1&0&3&3&0\\ 0&2&2&1&0&3&0&3\\ 3&1&0&3&2&1&2&1 \end{bmatrix}$$

Fig. 31(c) C SEPARATION $$2^4\begin{bmatrix} 0&3&0&2&2&0&1&2\\ 2&1&3&1&1&3&3&0\\ 3&1&3&1&0&3&2&0\\ 0&2&0&2&2&1&1&3\\ 2&0&2&1&3&0&2&1\\ 1&3&0&3&1&2&0&3\\ 3&1&3&1&1&3&1&2\\ 0&2&0&2&2&0&3&0 \end{bmatrix}$$

Fig. 31(d) K SEPARATION $$2^4\begin{bmatrix} 1&2&1&2&3&1&0&2\\ 3&0&3&0&0&2&3&1\\ 0&3&3&1&0&3&3&1\\ 2&1&0&2&2&1&0&2\\ 2&0&3&1&2&0&3&0\\ 1&3&0&2&1&3&1&2\\ 2&0&0&2&0&2&0&3\\ 1&3&3&1&3&1&2&1 \end{bmatrix}$$

DISTRIBUTIONS OF $E(0)^2 - E(3)^2$ AND $E(0)^1 - E(3)^1$ ARE IDENTICAL WITH FIGS. 22(a)-22(d) AND 23(a)-23(d).

Fig. 32(A)

INK SPOTS ACCORDING TO THRESHOLD MATRICES OF FIGS. 30(a)-30(d)

WHEN IMAGE DATA ID=16

| | | | | | | | |
|---|---|---|---|---|---|---|---|
| Y C | M | C | | Y | C | K | YM |
| | K | M | Y K | M K | | | C |
| K | | | | CK | | | M C |
| Y C | M | M CK | Y | Y | M | Y K | |
| Y | M CK | M | Y | Y | CK | Y | K |
| | | CK | | | M | C | M |
| M | K | Y K | | YM K | | M K | |
| Y C | | M C | | | C | | Y C |

Fig. 32(B) WHEN IMAGE DATA ID=32

| | | | | | | | |
|---|---|---|---|---|---|---|---|
| Y CK | M | Y CK | M | Y | M CK | CK | YM |
| M | Y CK | M | Y CK | M CK | Y | YM | CK |
| M K | Y C | Y | M CK | M CK | Y K | | YM CK |
| Y C | M K | M CK | Y | Y | M CK | YM CK | |
| Y | M CK | M | Y CK | Y | M CK | YM | CK |
| M CK | Y | Y CK | M | M CK | Y | CK | YM |
| M | Y CK | Y K | M C | YM CK | | YM CK | |
| Y CK | M | M C | Y K | | YM CK | | YM CK |

Fig. 33 APPARATUS FOR APPLYING DIFFERENT OFFSET TO RESPECTIVE COLOR SEPARATIONS
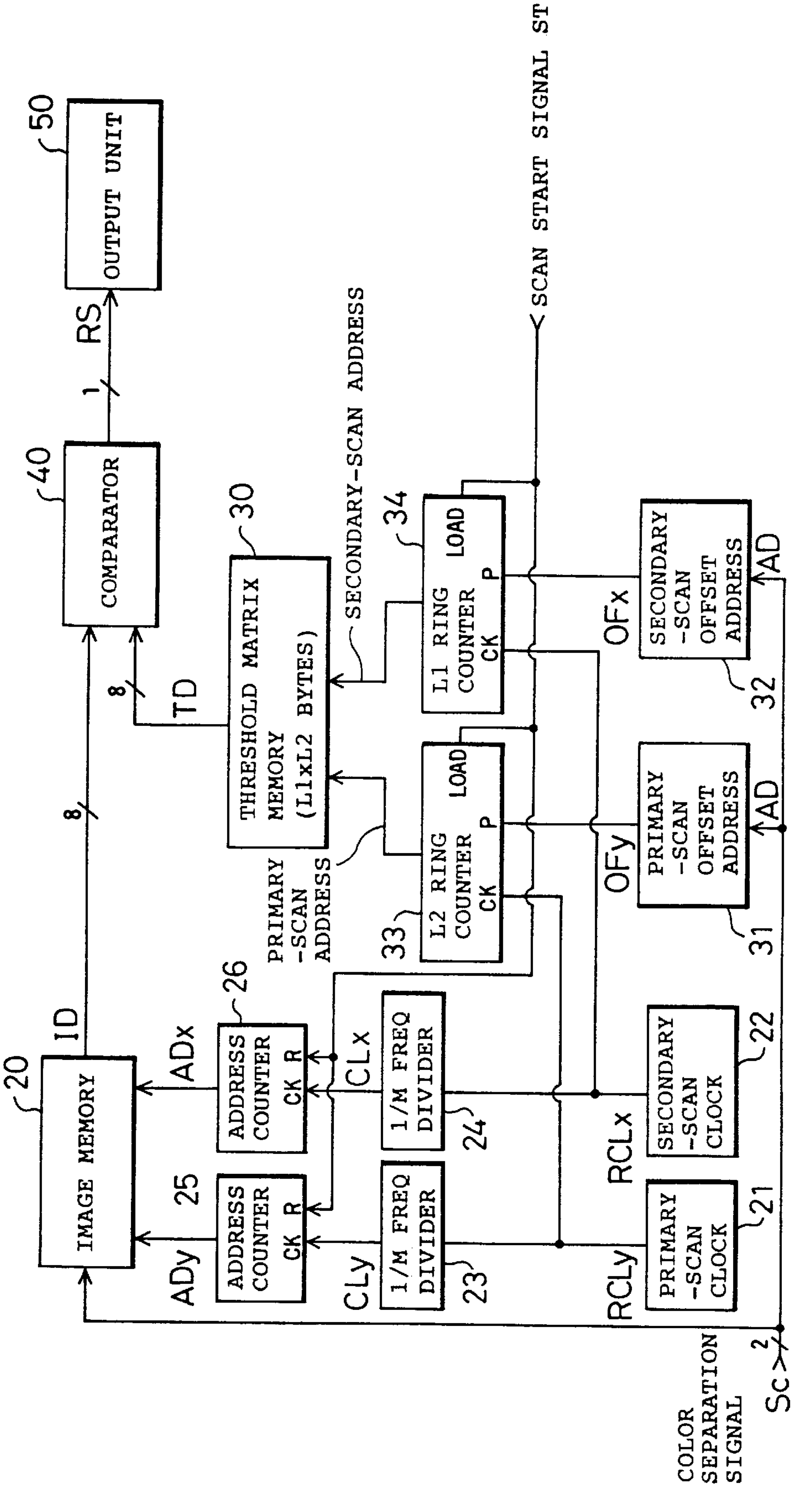

Fig. 34 APPARATUS FOR SELECTING A THRESHOLD MATRIX FOR RESPECTIVE COLOR SEPARATIONS
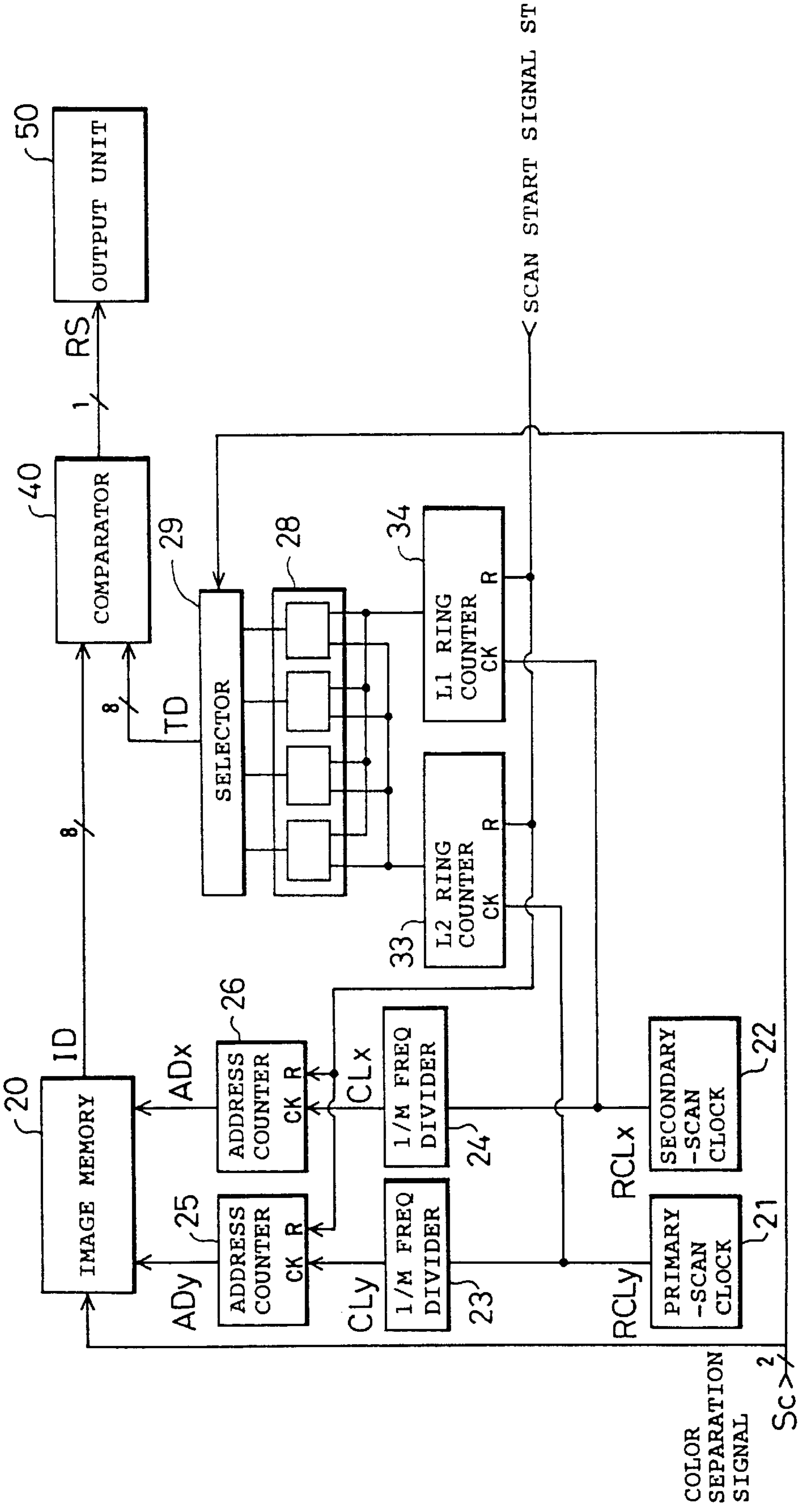

APPARATUS FOR ADDING DIFFERENT VALUES FOR RESPECTIVE COLOR SEPARATIONS TO THRESHOLD DATA

RESULTS OF OPERATION BY ADDER 70 (EXAMPLE OF 4x4 MATRIX)

FIG. 36(A)

| | | | |
|---|---|---|---|
| 0 | 8 | 14 | 2 |
| 12 | 4 | 6 | 10 |
| 7 | 10 | 9 | 5 |
| 11 | 3 | 1 | 13 |

ADDITION OF VALUE '5'

FIG. 36(B)

| | | | |
|---|---|---|---|
| ⑤ | ⑬ | 3 | ⑦ |
| 1 | ⑨ | ⑪ | ⑮ |
| ⑫ | ⑮ | ⑭ | ⑩ |
| 0 | ⑧ | ⑥ | 2 |

FIG. 36(C)

| | | | |
|---|---|---|---|
| 4 | 12 | 3 | 6 |
| 1 | 8 | 10 | 14 |
| 11 | 14 | 13 | 9 |
| 0 | 7 | 5 | 2 |

○ : 4-BIT BINARY NUMBERS WITHOUT CARRY

APPARATUS FOR INVERTING SPECIFIC BITS OF THRESHOLD DATA FOR RESPECTIVE COLOR SEPARATIONS

FIG. 38(a) UPPERMOST TWO BITS OF BASE MATRIX (IN QUATERNARY NOTATION)

$$2^4 \begin{bmatrix} 0 & 3 & 1 & 3 & 0 & 2 & 2 & 0 \\ 2 & 1 & 2 & 0 & 3 & 1 & 1 & 3 \\ 2 & 1 & 1 & 3 & 2 & 1 & 2 & 1 \\ 0 & 3 & 2 & 0 & 0 & 3 & 0 & 3 \\ 0 & 2 & 2 & 0 & 0 & 2 & 0 & 3 \\ 3 & 1 & 1 & 3 & 3 & 1 & 2 & 1 \\ 3 & 1 & 0 & 3 & 0 & 3 & 1 & 2 \\ 0 & 2 & 2 & 1 & 2 & 1 & 3 & 0 \end{bmatrix}$$

(IN BINARY NOTATION)

$$2^4 \begin{bmatrix} 00 & 11 & 01 & 11 & 00 & 10 & 10 & 00 \\ 10 & 01 & 10 & 00 & 11 & 01 & 01 & 11 \\ 10 & 01 & 01 & 11 & 10 & 01 & 10 & 01 \\ 00 & 11 & 10 & 00 & 00 & 11 & 00 & 11 \\ 00 & 10 & 10 & 00 & 00 & 10 & 00 & 11 \\ 11 & 01 & 01 & 11 & 11 & 01 & 10 & 01 \\ 11 & 01 & 00 & 11 & 00 & 11 & 01 & 10 \\ 00 & 10 & 10 & 01 & 10 & 01 & 11 & 00 \end{bmatrix}$$

FIG. 38(b) UPPERMOST BIT INVERTED (IN QUATERNARY NOTATION)

$$2^4 \begin{bmatrix} 2 & 1 & 3 & 1 & 2 & 0 & 0 & 2 \\ 0 & 3 & 0 & 2 & 1 & 3 & 3 & 1 \\ 0 & 3 & 3 & 1 & 0 & 3 & 0 & 3 \\ 2 & 1 & 0 & 2 & 2 & 1 & 2 & 1 \\ 2 & 0 & 0 & 2 & 2 & 0 & 2 & 1 \\ 1 & 3 & 3 & 1 & 1 & 3 & 0 & 3 \\ 1 & 3 & 2 & 1 & 2 & 1 & 3 & 0 \\ 2 & 0 & 0 & 3 & 0 & 3 & 1 & 2 \end{bmatrix}$$

(IN BINARY NOTATION)

$$2^4 \begin{bmatrix} 10 & 01 & 11 & 01 & 10 & 00 & 00 & 10 \\ 00 & 11 & 00 & 10 & 01 & 11 & 11 & 01 \\ 00 & 11 & 11 & 01 & 00 & 11 & 00 & 11 \\ 10 & 01 & 00 & 10 & 10 & 01 & 10 & 01 \\ 10 & 00 & 00 & 10 & 10 & 00 & 10 & 01 \\ 01 & 11 & 11 & 01 & 01 & 11 & 00 & 11 \\ 01 & 11 & 10 & 01 & 10 & 01 & 10 & 00 \\ 10 & 00 & 00 & 11 & 00 & 11 & 01 & 10 \end{bmatrix}$$

FIG. 38(c) SECOND UPPERMOST BIT INVERTED (IN QUATERNARY NOTATION)

$$2^4 \begin{bmatrix} 1 & 2 & 0 & 2 & 1 & 3 & 3 & 1 \\ 3 & 0 & 3 & 1 & 2 & 0 & 0 & 2 \\ 3 & 0 & 0 & 2 & 3 & 0 & 3 & 0 \\ 1 & 2 & 3 & 1 & 1 & 2 & 1 & 2 \\ 1 & 3 & 3 & 1 & 1 & 3 & 1 & 2 \\ 2 & 0 & 0 & 2 & 2 & 0 & 3 & 0 \\ 2 & 0 & 1 & 2 & 1 & 2 & 0 & 3 \\ 1 & 3 & 3 & 0 & 3 & 0 & 2 & 1 \end{bmatrix}$$

(IN BINARY NOTATION)

$$2^4 \begin{bmatrix} 01 & 10 & 00 & 10 & 01 & 11 & 11 & 01 \\ 11 & 00 & 11 & 01 & 10 & 00 & 00 & 10 \\ 11 & 00 & 00 & 10 & 11 & 00 & 11 & 00 \\ 01 & 10 & 11 & 01 & 01 & 10 & 01 & 10 \\ 01 & 11 & 11 & 01 & 01 & 11 & 01 & 10 \\ 10 & 00 & 00 & 10 & 10 & 00 & 11 & 00 \\ 10 & 00 & 01 & 10 & 01 & 10 & 00 & 11 \\ 01 & 11 & 11 & 00 & 11 & 00 & 10 & 01 \end{bmatrix}$$

FIG. 38(d) UPPERMOST TWO BITS INVERTED (IN QUATERNARY NOTATION)

$$2^4 \begin{bmatrix} 3 & 0 & 2 & 0 & 3 & 1 & 1 & 3 \\ 1 & 2 & 1 & 3 & 0 & 2 & 2 & 0 \\ 1 & 2 & 2 & 0 & 1 & 2 & 1 & 2 \\ 3 & 0 & 1 & 3 & 3 & 0 & 3 & 0 \\ 3 & 1 & 1 & 3 & 3 & 1 & 3 & 0 \\ 0 & 2 & 2 & 0 & 0 & 2 & 1 & 2 \\ 0 & 2 & 3 & 0 & 3 & 0 & 2 & 1 \\ 3 & 1 & 1 & 2 & 1 & 2 & 0 & 3 \end{bmatrix}$$

(IN BINARY NOTATION)

$$2^4 \begin{bmatrix} 11 & 00 & 10 & 00 & 11 & 01 & 01 & 11 \\ 01 & 10 & 01 & 11 & 00 & 10 & 10 & 00 \\ 01 & 10 & 10 & 00 & 01 & 10 & 01 & 10 \\ 11 & 00 & 01 & 11 & 11 & 00 & 11 & 00 \\ 11 & 01 & 01 & 11 & 11 & 01 & 11 & 00 \\ 00 & 10 & 10 & 00 & 00 & 10 & 01 & 10 \\ 00 & 10 & 11 & 00 & 11 & 00 & 10 & 01 \\ 11 & 01 & 01 & 10 & 01 & 10 & 00 & 11 \end{bmatrix}$$

Fig. 39(a) 16x256 THRESHOLD MATRIX
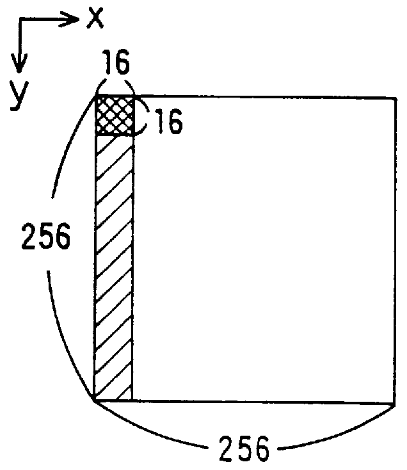
Fig. 39(b) DISTRIBUTION OF OFFSET ADDRESSES
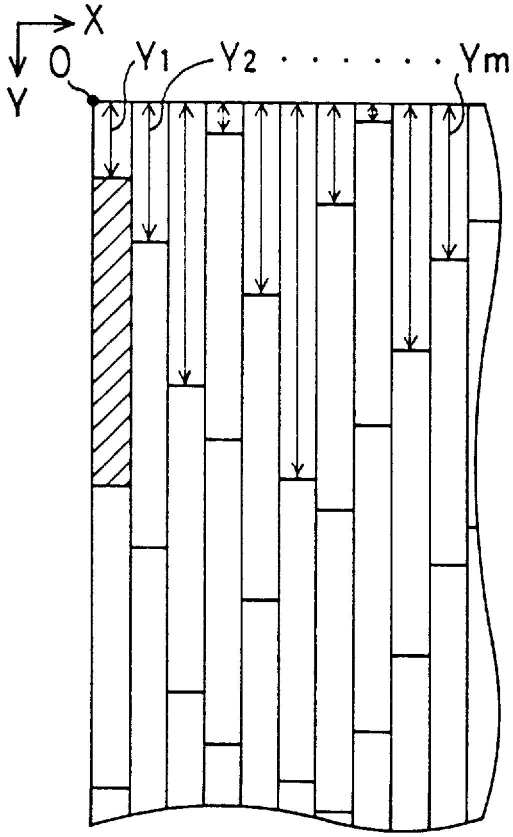

APPARATUS FOR VARYING OFFSET ACCORDING TO IMAGE POSITION (1)

APPARATUS FOR ADDING TO THRESHOLD DATA A VALUE ACCORDING TO IMAGE POSITION

APPARATUS HAVING A CIRCUIT FOR INVERTING BITS OF THRESHOLD DATA ACCORDING TO IMAGE POSITION

INVERSION OF SPECIFIC BITS OF THRESHOLD DATA

FIG. 44(A) BASE MATRIX

| | | | | | | | |
|---|---|---|---|---|---|---|---|
| 4 | 52 | 24 | 56 | 2 | 34 | 46 | 14 |
| 36 | 20 | 40 | 8 | 50 | 18 | 30 | 62 |
| 44 | 28 | 16 | 48 | 42 | 26 | 38 | 22 |
| 12 | 60 | 32 | 0 | 10 | 58 | 6 | 54 |
| 3 | 35 | 43 | 11 | 13 | 45 | 1 | 49 |
| 51 | 19 | 27 | 59 | 61 | 29 | 33 | 17 |
| 63 | 31 | 7 | 55 | 5 | 53 | 25 | 41 |
| 15 | 47 | 39 | 23 | 37 | 21 | 57 | 9 |

FIG. 44(B)

FIRST LOWEST BIT INVERTED

| | | | | | | | |
|---|---|---|---|---|---|---|---|
| 5 | 53 | 25 | 57 | 3 | 35 | 47 | 15 |
| 37 | 21 | 41 | 9 | 51 | 19 | 31 | 63 |
| 45 | 29 | 17 | 49 | 43 | 27 | 39 | 23 |
| 13 | 61 | 33 | 1 | 11 | 59 | 7 | 55 |
| 2 | 34 | 42 | 10 | 12 | 44 | 0 | 48 |
| 50 | 18 | 26 | 58 | 60 | 28 | 32 | 16 |
| 62 | 30 | 6 | 54 | 4 | 52 | 24 | 40 |
| 14 | 46 | 38 | 22 | 36 | 20 | 56 | 8 |

FIG. 44(C)

SECOND LOWEST BIT INVERTED

| | | | | | | | |
|---|---|---|---|---|---|---|---|
| 6 | 54 | 26 | 58 | 0 | 32 | 44 | 12 |
| 38 | 22 | 42 | 10 | 48 | 16 | 28 | 60 |
| 46 | 28 | 18 | 50 | 40 | 24 | 36 | 20 |
| 14 | 62 | 34 | 2 | 8 | 54 | 4 | 52 |
| 1 | 33 | 41 | 9 | 15 | 47 | 3 | 51 |
| 49 | 17 | 25 | 57 | 63 | 31 | 35 | 19 |
| 61 | 29 | 5 | 53 | 7 | 55 | 27 | 43 |
| 13 | 45 | 37 | 21 | 39 | 23 | 59 | 11 |

FIG. 44(D)

FIRST AND SECOND LOWEST BITS INVERTED

| | | | | | | | |
|---|---|---|---|---|---|---|---|
| 7 | 55 | 27 | 59 | 1 | 33 | 45 | 13 |
| 39 | 23 | 43 | 11 | 49 | 17 | 29 | 61 |
| 47 | 29 | 19 | 51 | 41 | 25 | 37 | 21 |
| 15 | 63 | 35 | 3 | 9 | 59 | 5 | 55 |
| 0 | 34 | 40 | 8 | 14 | 46 | 2 | 50 |
| 48 | 16 | 24 | 56 | 62 | 30 | 34 | 18 |
| 60 | 28 | 4 | 52 | 6 | 54 | 26 | 42 |
| 12 | 44 | 36 | 20 | 38 | 22 | 58 | 10 |

FIG. 44(E)

THIRD LOWEST BIT INVERTED

| | | | | | | | |
|---|---|---|---|---|---|---|---|
| 0 | 48 | 28 | 60 | 6 | 38 | 42 | 10 |
| 32 | 16 | 44 | 12 | 54 | 22 | 26 | 58 |
| 40 | 24 | 20 | 52 | 46 | 30 | 34 | 18 |
| 8 | 56 | 36 | 4 | 14 | 62 | 2 | 50 |
| 7 | 39 | 47 | 15 | 9 | 41 | 5 | 53 |
| 55 | 23 | 31 | 63 | 57 | 25 | 37 | 21 |
| 59 | 27 | 3 | 51 | 1 | 49 | 29 | 45 |
| 11 | 43 | 35 | 19 | 33 | 17 | 61 | 13 |

FIG. 44(F)

FIRST UPPERMOST BIT INVERTED

| | | | | | | | |
|---|---|---|---|---|---|---|---|
| 36 | 20 | 56 | 24 | 34 | 2 | 14 | 46 |
| 4 | 52 | 8 | 40 | 18 | 50 | 62 | 30 |
| 12 | 60 | 48 | 16 | 10 | 58 | 6 | 54 |
| 44 | 28 | 0 | 32 | 42 | 26 | 38 | 22 |
| 35 | 3 | 11 | 43 | 45 | 13 | 33 | 17 |
| 19 | 51 | 59 | 27 | 29 | 61 | 1 | 49 |
| 31 | 63 | 39 | 23 | 37 | 21 | 57 | 9 |
| 47 | 15 | 7 | 55 | 5 | 53 | 25 | 41 |

Fig. 45(A) THRESHOLD MATRIX
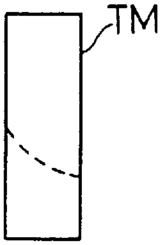
Fig. 45(B) PATTERN APPEARING IN BINARY IMAGE
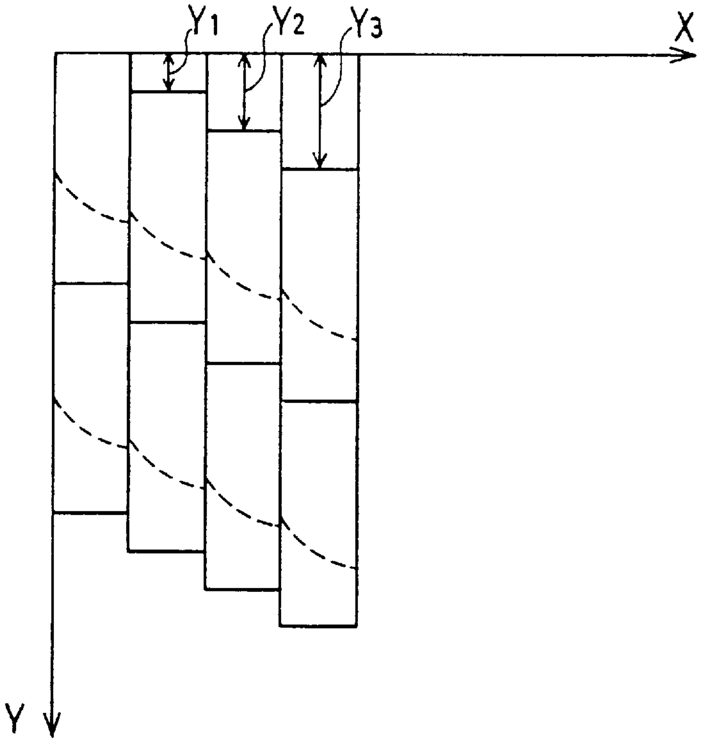

FIG. 46(A) ORIGINAL
FIG. 46(B) INSIDE OUT
FIG. 46(C) UPSIDE DOWN
FIG. 46(D) INSIDE OUT AND UPSIDE DOWN
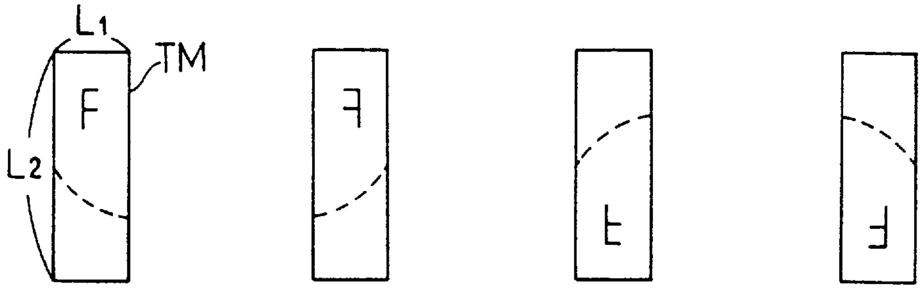
FIG. 46(E) PATTERN APPEARING IN BINARY IMAGE
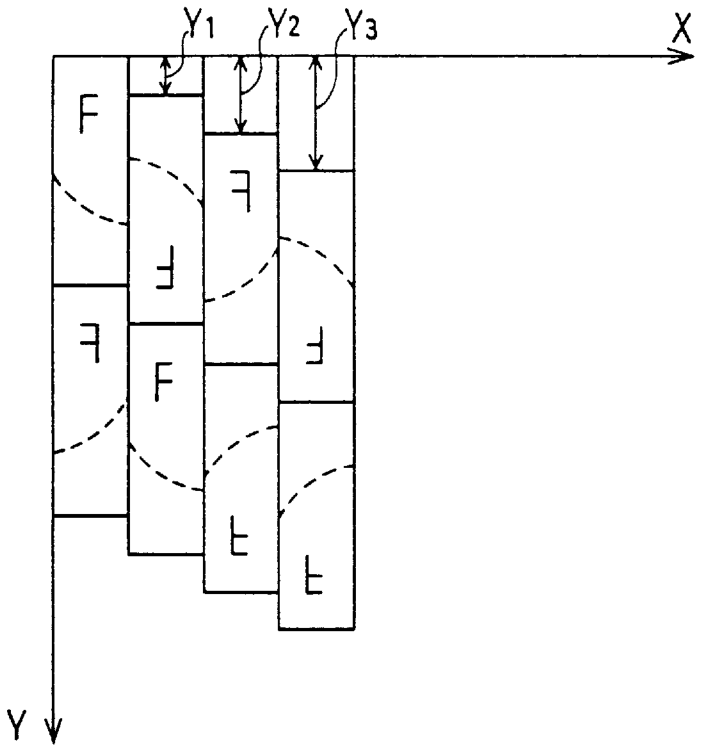

BINARY IMAGE ACCORDING TO THRESHOLD MATRICES OF FIGS. 50(A)-50(D)

METHOD AND APPARATUS FOR PRODUCING HALFTONE IMAGE WITH THRESHOLD MATRIX

BACKGROUND OF THE INVENTION

1. Field of the Invention

The present invention relates to a method and an apparatus for producing a halftone image with the threshold matrix.

2. Description of the Related Art

A conventional technique for reproduction of a continuous-tone image uses binarization of the continuous-tone image with halftone dots. Halftone dots are generated to occupy a large area in high-density regions and a small area in low-density regions. A print on which a number of halftone dots are arranged appears an image having the density gradation similar to that of the original continuous-tone image to the naked eyes.

A plurality of color separations used for reproducing a color print generally have different screen angles in a dimension of to prevent moires caused by interference among the color separations. For example, screen angles of 0, 15, 75, and 45 degrees are allocated to four color separations of Y (Yellow), M (Magenta), C (Cyan), and K (black), respectively.

The conventional technique of reproducing the continuous-tone image with halftones has such a problem that sharp edges, e.g., those of fine lines of pictures and characters, included in an image can not be reproduced clearly.

Another problem of the conventional technique is that it can not effectively prevent interference patterns called Rosetta patterns or Rosetta moire, and moires observed in a reproduction of a color print due to interference of halftone dot patterns of the original color print with halftone dot patterns of a plurality of color separations.

SUMMARY OF THE INVENTION

An object of the present invention is to reproduce sharp edges of an image more clearly than a conventional technique.

Another object of the present invention is to prevent interference patterns such as moires and Rosetta patterns in reproduction of color prints.

The present invention is directed to a method of generating a halftone image by comparing multi-tone image data with threshold data read out of an acting threshold matrix. The method comprises the steps of: (a) producing the acting threshold matrix by: dividing a matrix area of the acting threshold matrix into a plurality of sub-matrices of an equal size, each of the plurality of sub-matrices including a plurality of threshold data; setting a difference between the plurality of threshold data in the each sub-matrix to a predetermined value; and arranging the plurality of threshold data at random in the each sub-matrix; (b) reading out threshold data from the acting threshold matrix; (c) comparing the multi-tone image data with the threshold data read out of the acting threshold matrix, to thereby produce a binary image signal; and (d) producing the binary halftone image responsive to the binary image signal.

The acting threshold matrix has higher spatial frequency concerning the distribution of threshold data than conventional halftone-dot-based threshold matrices. A reproduced image produced with the acting threshold matrix will show sharp edges more clearly than those by the conventional techniques accordingly.

Use of a plurality of acting threshold matrices for a plurality of color components will prevent interference patterns such as moires and Rosetta patterns in a reproduced color image.

In the preferred embodiment of the present invention, the acting threshold matrix is an M×M matrix, M being equal to $2^N$, N being an integer of at least 2, the each sub-matrix being a 2×2 matrix $T_{ij}$ including four threshold data. The step (a) comprises the step of: determining an arrangement of the four threshold data in the each 2×2 sub-matrix $T_{ij}$ by:

$$T_{ij} = 2^{2(N-1)} \begin{bmatrix} a_{ij} & c_{ij} \\ d_{ij} & b_{ij} \end{bmatrix} + k_{ij} \begin{bmatrix} 1 & 1 \\ 1 & 1 \end{bmatrix}$$

where i and j respectively represent coordinates of the 2×2 sub-matrix $T_{ij}$ in the M×M matrix, and i and j are integers between 1 and $$\frac{M}{2};$$

$k_{ij}$ is an integer between 0 and $$\left(\frac{M^2}{4} - 1\right),$$

which has a different value for a different combination of i and j, and which is so determined that a value of MOD($k_{ij}$, GN) is identical for four 2×2 sub-matrices $T_{ij}$ included in each 4×4 sub-matrix; MOD(x,y) gives a remainder of x divided by y; GN is a number of 4×4 sub-matrices included in the M×M matrix, and is equal to $$\frac{M^2}{4 \times 4};$$

and elements $a_{ij}$, $b_{ij}$, $c_{ij}$, and $d_{ij}$ are different integers between 0 and 3, allocation of the elements $a_{ij}$, $b_{ij}$, $c_{ij}$, and $d_{ij}$ to 0 through 3 is determined independently for each 2×2 sub-matrix $T_{ij}$ at random.

In another embodiment of the present invention, the acting threshold matrix is an M×M matrix $TM_{M\times M}$, M being equal to $\mathbf{2}_N$, N being an integer of at least 2; and the step (a) comprises the step of: determining the M×M threshold matrix $TM_{M\times M}$ according to the following recursion formulae:

$$TM_{M\times M} = S^N_{(1,1)} = \begin{bmatrix} S^{(N-1)}_{(1,1)} & S^{(N-1)}_{(2,1)} \\ S^{(N-1)}_{(1,2)} & S^{(N-1)}_{(2,2)} \end{bmatrix} + 2^0 \begin{bmatrix} E(a)^{(N-1)} & E(c)^{(N-1)} \\ E(d)^{(N-1)} & E(b)^{(N-1)} \end{bmatrix}_{(1,1)}$$

$$S^{(N-1)}_{(u,v)} = \begin{bmatrix} S^{(N-2)}_{(1,1)} & S^{(N-2)}_{(2,1)} \\ S^{(N-2)}_{(1,2)} & S^{(N-2)}_{(2,2)} \end{bmatrix} + 2^2 \begin{bmatrix} E(a)^{(N-2)} & E(c)^{(N-2)} \\ E(d)^{(N-2)} & E(b)^{(N-2)} \end{bmatrix}_{(u,v)}$$

$$\ldots$$

$$S^2_{(u,v)} = \begin{bmatrix} S^1_{(1,1)} & S^1_{(2,1)} \\ S^1_{(1,2)} & S^1_{(2,2)} \end{bmatrix} + 2^{2(N-2)} \begin{bmatrix} E(a)^1 & E(c)^1 \\ E(d)^1 & E(b)^1 \end{bmatrix}_{(u,v)}$$

$$S^1_{(u,v)} = \begin{bmatrix} S^0_{(1,1)} & S^0_{(2,1)} \\ S^0_{(1,2)} & S^0_{(2,2)} \end{bmatrix} + 2^{2(N-1)} \begin{bmatrix} E(a)^0 & E(c)^0 \\ E(d)^0 & E(b)^0 \end{bmatrix}_{(u,v)}$$

$$S^0{}_{(u,v)}=0$$

where $S^n_{(u,v)}$ is a square matrix of a dimension of $2^n$, given by $$S^n_{(u,v)} = \begin{bmatrix} S^{(n-1)}_{(1,1)} & S^{(n-1)}_{(2,1)} \\ S^{(n-1)}_{(1,2)} & S^{(n-1)}_{(2,2)} \end{bmatrix} + 2^{2(N-n)} \begin{bmatrix} E(a)^{(n-1)} & E(c)^{(n-1)} \\ E(d)^{(n-1)} & E(b)^{(n-1)} \end{bmatrix}_{(u,v)}$$

and where n is an integer between 1 and N; $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively; the components a, b, c, and d are different integers between 0 and 3, and allocation of the components a, b, c, and d to 0 through 3 is independently determined for each coefficient matrix $$\begin{bmatrix} E(a)^{(n-1)} & E(c)^{(n-1)} \\ E(d)^{(n-1)} & E(b)^{(n-1)} \end{bmatrix}_{(u,v)}$$

at coordinates (u,v) while determining the allocation of the components a, b, c, and d to 0 through 3 at random for each 2×2 sub-matrix $S^1_{(u,v)}$.

The present invention is also directed to an apparatus for generating a halftone image by comparing multi-tone image data with threshold data read out of an acting threshold matrix. The apparatus comprises: a first memory for storing the acting threshold matrix produced by: dividing a matrix area of the threshold matrix into a plurality of sub-matrices of an equal size, each of the plurality of sub-matrices including a plurality of threshold data; setting a difference between the plurality of threshold data in the each sub-matrix to a predetermined value; and arranging the plurality of threshold data at random in the each sub-matrix; reading means for reading out threshold data of the acting threshold matrix from the first memory; a comparator for comparing multi-tone image data with the threshold data read out from the first memory, to thereby produce a binary image signal; and output means for producing the binary halftone image responsive to the binary image signal.

In another aspect of the present invention, a method comprising the steps of: (a) preparing an M×M threshold matrix $TM_{M\times M}$, where M is equal to $2^N$ and N is an integer of at least 2 according to the recursion formulae described before; (b) arranging $E(0)^{m-1}$ in each sub-matrix $S_{m(u,v)}$ at different positions for the plurality of color components, where m corresponds to at least one integer between 1 through N, to thereby prepare a plurality of acting threshold matrices for the plurality of color components; (c) selecting one of the plurality of acting threshold matrices according to a color component-under-processing, and reading out threshold data from the selected acting threshold matrix; (d) comparing the multi-tone image data with the threshold data read out of the selected acting threshold matrix, to thereby produce a binary image signal for each color component; and (e) producing the binary halftone image responsive to the binary image signal for each color component.

The present invention is further directed to a method comprising the steps of: (a) producing an M×M threshold matrix $TM_{M\times M}$ as the acting threshold matrix, where M is equal to $2^N$ and N is an integer of at least 2 according to the recursion formulae described before; (b) allocating a plurality of operation factors to the plurality of color components; (c) selecting one of the plurality of acting matrices according to a color component-under-processing, and reading out threshold data from the selected acting threshold matrix; (d) selecting one of the plurality of operation factors according to the color component-under-processing; (e) executing a predetermined operation between the threshold data read out of the acting threshold matrix and the selected operation factor, to thereby modify the threshold data; (f) comparing the multi-tone image data with the modified threshold data, to thereby produce a binary image signal for each color component; and (g) producing the binary halftone image responsive to the binary image signal for each color component.

The present invention is still directed to a method comprising the steps of: (a) repeatedly executing to substantially select one of a plurality of threshold matrices at random and apply the selected threshold matrix on an image plane; (b) reading out threshold data from the selected threshold matrix; and (c) comparing the multi-tone image data with the threshold data read out of the selected threshold matrix, to thereby produce the binary image signal.

The present invention is further directed to an apparatus comprising: matrix selection means for repeatedly executing to substantially select one of a plurality of threshold matrices at random and apply the selected threshold matrix on an image plane; means for reading out threshold data from the selected threshold matrix; and a comparator for comparing the multi-tone image data with the threshold data read out of the selected threshold matrix, to thereby produce the binary image signal.

These and other objects, features, aspects, and advantages of the present invention will become more apparent from the following detailed description of the preferred embodiments with the accompanying drawings.

BRIEF DESCRIPTION OF THE DRAWINGS

FIGS. 1(*a*) through 1(*c*) are plan views showing examples of basic threshold matrices BM;

FIG. 3 shows eight diagonal patterns applicable to the arrangement of threshold data in a 2×2 sub-matrix;

FIG. 4 shows eight matrices obtained by applying the eight diagonal patterns to a 2×2 sub-matrix $T_{11}$;

FIGS. 8(*a*) through 8(*f*) show the comparison among the 8×8 basic matrix $BM_{8\times8}$ of FIG. 1(*c*), the 8×8 threshold matrix $TM_{8\times8}$ of FIG. 6, and an 8×8 matrix where threshold values of 0 through 63 are simply arranged at random;

FIG. 9 shows an example of 16×16 threshold matrix $TM_{16\times16}$ in hexadecimal notation;

FIG. 10 shows the 16×16 threshold matrix $TM_{16\times16}$ of FIG. 9 rewritten in quaternary notation;

FIGS. 12(*a*) through 12(*d*) show the structure of an 8×8 base threshold matrix prepared in the embodiment;

FIGS. 13(*a*) through 13(*h*) show four 8×8 threshold matrices obtained by adjusting only the distribution of the lower two bits of threshold data in the 8×8 base threshold matrix shown in FIGS. 12(*a*) through 12(*d*);

FIGS. 14(A) and 14(B) respectively show ink spots to be exposed according to the threshold matrices of FIGS. 12(*a*) through 12(*d*) when image data ID is equal to the value '1' and '16';

FIGS. 15(*a*) through 15(*h*) show four 8×8 threshold matrices obtained by adjusting only the distribution of the upper two bits of threshold data in the threshold matrix shown in FIGS. 12(*a*) through 12(*d*);

FIGS. 16(A) and 16(B) respectively show spots to be exposed according to the threshold matrices of FIGS. 15(*a*) through 15(*d*) when image data ID is equal to the value '1' and '16';

FIGS. 17(*a*) through 17(*d*) show four 8×8 threshold matrices obtained by adjusting both the distributions of the lower two bits and the upper two bits of threshold data in the threshold matrix shown in FIGS. 12(*a*) through 12(*d*);

FIGS. 18(A) and 18(B) respectively show spots to be exposed according to the threshold matrices of FIGS. 17(*a*) through 17(*d*) when image data ID is equal to the value '1' and '16';

FIGS. 19(A) through 19(C) show examples of patterns where the coefficient $E(0)^0$ (=0) is arranged at different positions in the respective color components;

FIGS. 20(A) and 20(B) show a process of modifying the base pattern through bit operations;

FIGS. 21(*a*) through 21(*d*) show threshold matrices of the four color components satisfying a condition C3-1-1;

FIGS. 22(*a*) through 22(*d*) show the distribution of the lower two bits $E(0)^2$ through $E(3)^2$ of the threshold matrices shown in FIGS. 21(*a*) through 21(*d*);

FIGS. 23(*a*) through 23(*d*) show the distribution of the medium two bits $E(0)^0$ through $E(3)^1$ of the threshold matrices shown in FIGS. 21(*a*) through 21(*d*);

FIGS. 24(*a*) through 24(*d*) show the distribution of the upper two bits $E(0)^0$ through $E(3)^0$ of the threshold matrices shown in FIGS. 21(*a*) through 21(*d*);

FIGS. 25(A) and 25(B) show distributions of ink spots according to the threshold matrices of FIGS. 21(*a*) through 21(*d*);

FIGS. 26(*a*) through 26(*d*) show examples of threshold matrices prepared by inverting each bit of threshold data in the components M and C;

FIGS. 27(*a*) through 27(*d*) show the distribution of the lower two bits $E(0)^2$ through $E(3)^2$ the threshold matrices shown in FIGS. 26(*a*) through 26(*d*);

FIGS. 28(*a*) through 28(*d*) show the distribution of the medium two bits $E(0)^1$ through $E(3)^1$ of the threshold matrices shown in FIGS. 26(*a*) through 26(*d*);

FIGS. 29(*a*) through 29(*d*) show the distribution of the upper two bits $E(0)^0$ through $E(3)^0$ of the threshold matrices shown in FIGS. 26(*a*) through 26(*d*);

FIGS. 30(*a*) through 30(*d*) show examples of threshold matrices prepared according to a condition C4;

FIGS. 31(*a*) through 31(*d*) show the distribution of the upper two bits $E(0)^0$ through $E(3)^0$ of the threshold matrices shown in FIGS. 30(*a*) through 30(*d*);

FIGS. 32(A) and 32(B) show distributions of ink spots according to the threshold matrices of FIGS. 30(*a*) through 30(*d*);

FIG. 33 is a block diagram showing the structure of an image recording apparatus utilizing the threshold matrix shown in FIGS. 11(*a*) through 11(*d*);

FIG. 34 is a block diagram showing structure of an image recording apparatus including threshold matrices for the respective color components;

FIGS. 36(A) through 36(C) show an example of the operation by the adder 70;

FIGS. 38(*a*) through 38(*d*) show examples of threshold matrices obtained by inverting specific bits of threshold data in an 8×8 threshold matrix;

FIGS. 39(*a*) and 39(*b*) show a process of varying offset addresses of a threshold matrix according to a position in an image;

FIGS. 44(A) through 44(F) show an 8×8 threshold matrix as well as several examples of threshold matrices obtained by inverting some bits of the threshold data;

FIGS. 45(A) and 45(B) conceptually show an example where one threshold matrix is repeatedly applied with offsets;

FIGS. 46(A) through 46(E) conceptually show a method of applying a threshold matrix while inverting the same on an image plane according to the present invention;

DESCRIPTION OF THE PREFERRED EMBODIMENT

A. Structure of Basic Matrix

FIGS. 1(*a*) through 1(*c*) are plan views showing examples of basic threshold matrices applicable to one embodiment of the present invention. FIGS. 1(*a*), 1(*b*), and 1(*c*) respectively show 2×2, 4×4, and 8×8 basic matrices $BM_{2\times2}$, $BM_{4\times4}$, and $BM_{8\times8}$. These basic matrices represent patterns of specific threshold arrangements proposed by B. E. Beyer. As is generally known, binarization of a multi-tone image using one of those basic matrices makes a spatial frequency of the resultant binary image higher than those of binary images prepared with other types of threshold matrices.

Figure 2A:
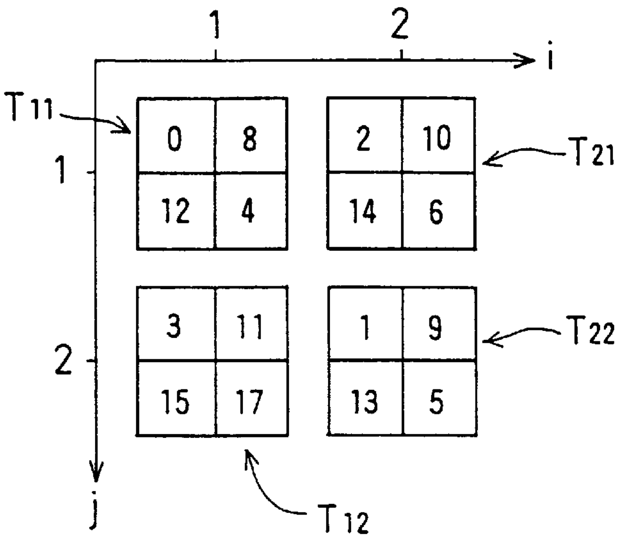
FIGS. 2(*a*) and 2(*b*) are plan views showing 2×2 sub-matrices constituting the 4×4 basic matrix $BM_{4\times4}$ and the 8×8 basic matrix $BM_{8\times8}$.
Figure 2B:
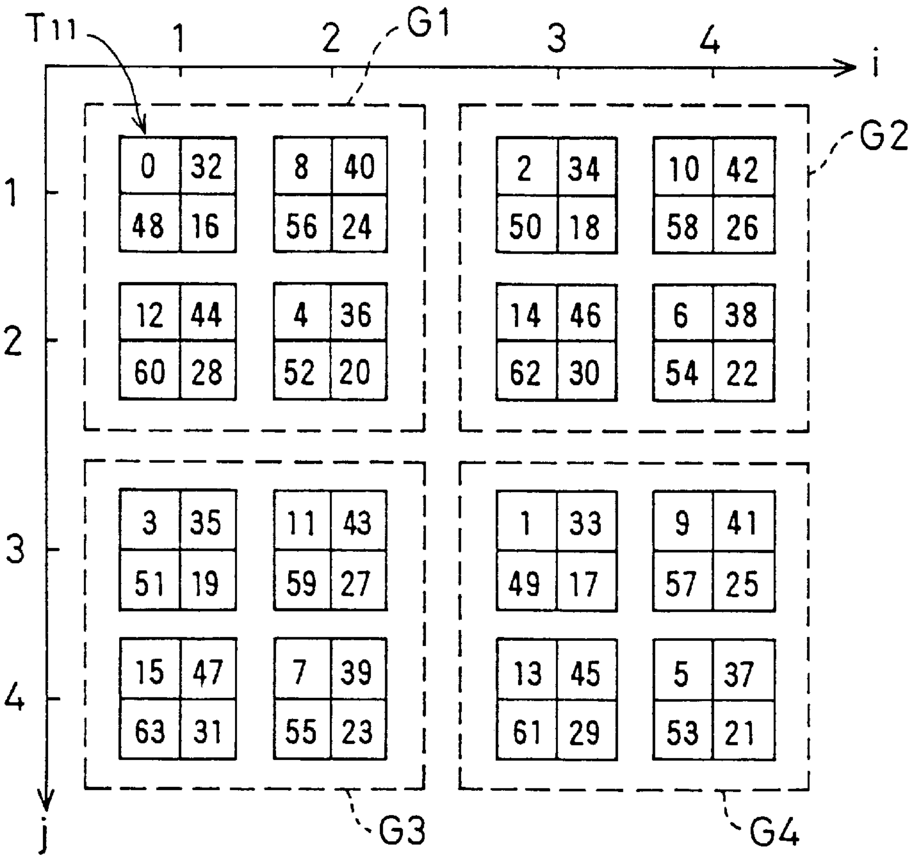

FIG. 2(*a*) shows the 4×4 basic matrix $BM_{4\times4}$ divided into four 2×2 sub-matrices $T_{ij}$ whereas FIG. 2(*b*) shows the 8×8 basic matrix $BM_{8\times8}$ divided into sixteen 2×2 sub-matrices $T_{ij}$, where i and j represent coordinates of the position of each 2×2 sub-matrix $T_{ij}$. The sixteen sub-matrices $T_{ij}$ in the 8×8 basic matrix $BM_{8\times8}$ are classified into four groups G1, G2, G3, and G4, each of which is a 4×4 sub-matrix. Each 2×2 sub-matrix $T_{ij}$ in FIG. 2(*b*) is expressed as:

$$T_{ij} = \begin{bmatrix} 0 & 32 \\ 48 & 16 \end{bmatrix} + k_{ij} \times \begin{bmatrix} 1 & 1 \\ 1 & 1 \end{bmatrix} = \begin{bmatrix} 0 & 2\times2^4 \\ 3\times2^4 & 2^4 \end{bmatrix} + k_{ij} \times \begin{bmatrix} 1 & 1 \\ 1 & 1 \end{bmatrix} = 2^4\begin{bmatrix} 0 & 2 \\ 3 & 1 \end{bmatrix} + k_{ij} \times \begin{bmatrix} 1 & 1 \\ 1 & 1 \end{bmatrix} \quad (1)$$

where i and j are integers between 1 and 4;

$k_{ij}$ is an integer between 0 and 15, which has a different value for a different combination of i and j, and which is so determined that a value of MOD($k_{ij}$,GN) is equal for four 2×2 sub-matrices $T_{ij}$ included in each of four groups G1–G4;

MOD(x,y) gives a remainder of x divided by y; and

GN is a number of groups, i.e., a number of 4×4 sub-matrices included in a M×M matrix, and is equal to 4.

The value of $k_{ij}$ used in Expression 1 is given by the following Expression 2 for the 8×8 basic matrix $BM_{8\times8}$ of FIG. 2(*b*):

$$k_{ij} = \begin{bmatrix} 0 & 8 & 2 & 10 \\ 12 & 4 & 14 & 6 \\ 3 & 11 & 1 & 9 \\ 15 & 7 & 13 & 5 \end{bmatrix} \quad (2)$$

The arrangement pattern of $k_{ij}$ shown by Expression 2 is identical with the threshold arrangement pattern of the 4×4 basic matrix $BM_{4\times4}$ of FIG. 1(*b*).

By generalizing Expression 1 to an M×M basic matrix $BM_{M\times M}$, each 2×2 sub-matrix included in the M×M basic matrix $BM_{M\times M}$ is expressed as:

$$T_{ij} = 2^{2(N-1)}\begin{bmatrix} a_{ij} & c_{ij} \\ d_{ij} & b_{ij} \end{bmatrix} + k_{ij}\begin{bmatrix} 1 & 1 \\ 1 & 1 \end{bmatrix} \quad (3)$$

where i and j are integers between 1 and $$\frac{M}{2};$$

N is an integer defined by $2^N$=M;

$k_{ij}$ is an integer between 0 and ( $$\left(\frac{M^2}{4} - 1\right),$$

−1), which has a different value for a different combination of i and j, and which is so determined that a value of MOD($k_{ij}$,GN) is equal for four 2×2 sub-matrices $T_{ij}$ included in each 4×4 sub-matrix;

MOD(x,y) gives a remainder of x divided by y;

GN is a number of groups, i.e., a number of 4×4 sub-matrices, and is equal to $$\frac{M^2}{4\times4};$$

and $a_{ij}$, $b_{ij}$, $c_{ij}$, and $d_{ij}$ are 0, 1, 2, and 3, respectively, regardless of i and j.

B. Preparation of Threshold Matrix of Embodiment

Preparation of an 8×8 threshold matrix according to the present invention includes the step of randomly selecting a combination of the values of coefficients $a_{ij}$, $b_{ij}$, $c_{ij}$, and $d_{ij}$ in Expression 3 from various combinations of 0, 1, 2, and 3 for each of the sixteen 2×2 sub-matrices $T_{ij}$ shown in FIG. 2(*b*). Hereinafter, the matrix of the coefficients $a_{ij}$, $b_{ij}$, $c_{ij}$, and $d_{ij}$, i.e., $$\begin{bmatrix} a_{ij} & c_{ij} \\ d_{ij} & b_{ij} \end{bmatrix},$$

included in Expression 3 is referred to as coefficient matrix CM.

There exist a total of twenty-four different patterns for the coefficient matrix CM. FIGS. 3(*a*) through 3(*h*) show eight favorable patterns selected among the twenty-four patterns. In each of the eight preferable patterns, the relatively small values 0 and 1 are arranged diagonally and so are the relatively large values 2 and 3. These patterns are hereinafter referred to as diagonal patterns. These eight diagonal patterns have the higher spatial frequency than those of the other sixteen patterns, thereby allowing sharp edges included in an image to be reproduced more clearly.

FIG. 4 shows eight diagonal patterns, each of which includes the same thresholds as those of the upper-left 2×2 sub-matrix $T_{11}$ in FIG. 2(*b*). The 2×2 sub-matrix $T_{11}$ of the 8×8 threshold matrix in the embodiment is preferably selected out of these eight diagonal patterns. As clearly understood from Expression 1, the sixteen 2×2 sub-matrices $T_{ij}$ shown in FIG. 2(*b*) are prepared by adding the constant $k_{ij}$ of Expression 2 to the upper-left 2×2 sub-matrix $T_{11}$. In determining the threshold pattern of each 2×2 sub-matrix $T_{ij}$ in this embodiment, the basic 2×2 pattern included in the first term of the right-hand side of Expression 1 can be selected among the eight diagonal patterns shown in FIG. 4 or FIGS. 3(*a*) through 3(*h*).

Figures 5, 6:
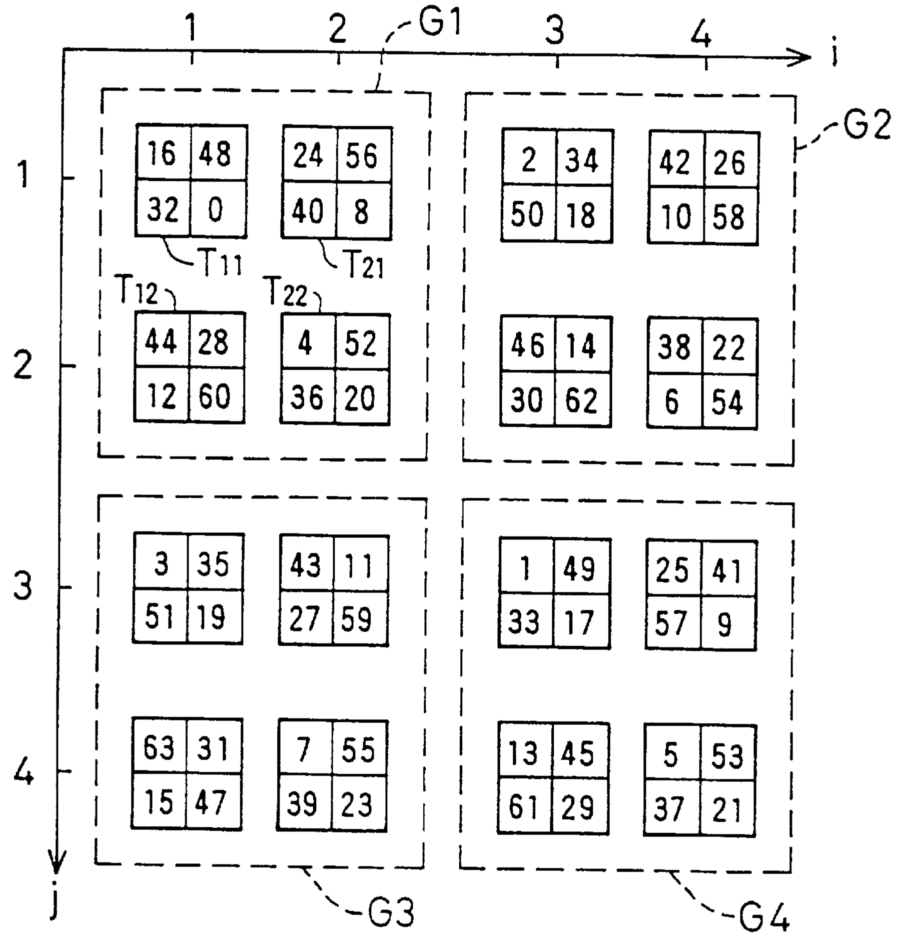
FIG. 5 is a plan view showing sixteen 2×2 sub-matrices $T_{ij}$ obtained by selecting a coefficient matrix CM at random out of the eight diagonal patterns.
FIG. 6 shows an 8×8 threshold matrix $TM_{8\times8}$ consisting of the sixteen 2×2 sub-matrices $T_{ij}$ of FIG. 5.

FIG. 5 shows sixteen 2×2 sub-matrices $T_{ij}$ obtained by randomly selecting and applying one of the eight diagonal patterns for each 2×2 sub-matrix. For example, the four 2×2 sub-matrices $T_{11}$, $T_{21}$, $T_{12}$, and $T_{22}$ included in the upper-left group G1 of FIG. 5 uses the diagonal patterns of FIGS. 3(*d*), 3(*d*), 3(*g*), and 3(*b*), respectively. These four 2×2 sub-matrices $T_{11}$, $T_{21}$, $T_{12}$, and $T_{22}$ are defined as:

$$T_{11}=2^{2(3-1)}\begin{bmatrix}1&3\\2&0\end{bmatrix}+0\begin{bmatrix}1&1\\1&1\end{bmatrix}=\begin{bmatrix}16&48\\32&0\end{bmatrix} \quad (4a)$$

$$T_{21}=2^{2(3-1)}\begin{bmatrix}1&3\\2&0\end{bmatrix}+8\begin{bmatrix}1&1\\1&1\end{bmatrix}=\begin{bmatrix}24&56\\40&8\end{bmatrix} \quad (4b)$$

$$T_{12}=2^{2(3-1)}\begin{bmatrix}2&1\\0&3\end{bmatrix}+12\begin{bmatrix}1&1\\1&1\end{bmatrix}=\begin{bmatrix}44&28\\12&60\end{bmatrix} \quad (4c)$$

$$T_{22}=2^{2(3-1)}\begin{bmatrix}0&3\\2&1\end{bmatrix}+4\begin{bmatrix}1&1\\1&1\end{bmatrix}=\begin{bmatrix}4&52\\36&20\end{bmatrix} \quad (4d)$$

When the four threshold entries of each 2×2 sub-matrix $T_{ij}$ of FIG. 5 are arranged in an ascending order of the magnitude, the increment or the difference between the adjacent threshold entries is equal to 16 ($=2^{2(N-1)}$; N=3) for any 2×2 sub-matrix $T_{ij}$. In general, the difference between each adjacent pair of the four threshold entries in the respective 2×2 sub-matrices $T_{ij}$ of an M×M threshold matrix is equal to $2^{2(N-1)}$, where N is an integer defined by $2^N$=M. This is found in the first term of the right-hand side of the above mentioned Expression 3.

FIG. 6 shows an 8×8 threshold matrix $TM_{8\times8}$ consisting of the sixteen 2×2 sub-matrices $T_{ij}$ of FIG. 5. The 8×8 threshold matrix $TM_{8\times8}$ is to be used in binarization of multi-tone image data in the embodiment of the present invention.

Incidentally, the four 2×2 sub-matrices $T_{ij}$ in each of the four groups G1 through G4, or 4×4 sub-matrices, in FIG. 5 can be randomly re-arranged. There are twenty-four patterns of arrangement for the four 2×2 sub-matrices $T_{ij}$ in each group or 4×4 sub-matrix. Preferable application is, however, to randomly select one of eight diagonal patterns, similar to those of FIG. 3, for each 2×2 sub-matrix. The eight diagonal patterns of FIG. 3 respectively include the two smaller threshold entries arranged diagonally as well as the two larger threshold entries also arranged diagonally. Similarly, in the preferable diagonal patterns applicable to the arrangement of the four 2×2 sub-matrices $T_{ij}$ of the group G1 shown in FIG. 5, the two threshold matrices having relatively small threshold entries, that is, the 2×2 sub-matrices $T_{11}$ and $T_{22}$, are arranged diagonally, and the other two threshold matrices having relatively great threshold entries, that is, the 2×2 sub-matrices $T_{21}$ and $T_{12}$, are also arranged diagonally. A 2×2 sub-matrix $T_{ij}$ is also referred to as 'threshold set', meaning a set of threshold entries. The diagonal patterns can be defined as patterns in which the two threshold sets having relatively small threshold entries are arranged diagonally and so are the other two threshold sets having relatively great threshold entries. The similar diagonal patterns can be defined to matrices of a greater dimension, for example, 4×4 matrices.

Figure 7:
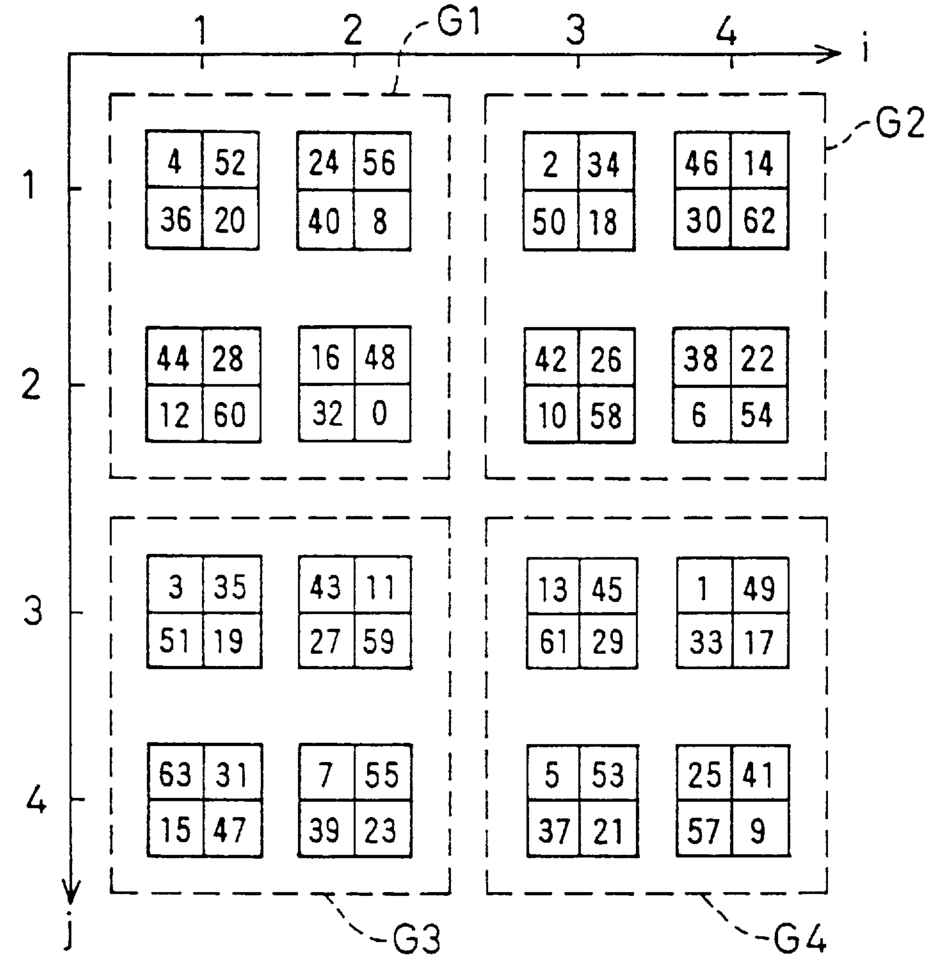
FIG. 7 is a plan view showing 2×2 sub-matrices $T_{ij}$ arranged at random in each group of the 8×8 threshold matrix shown in FIG. 6.
Figure 11A:
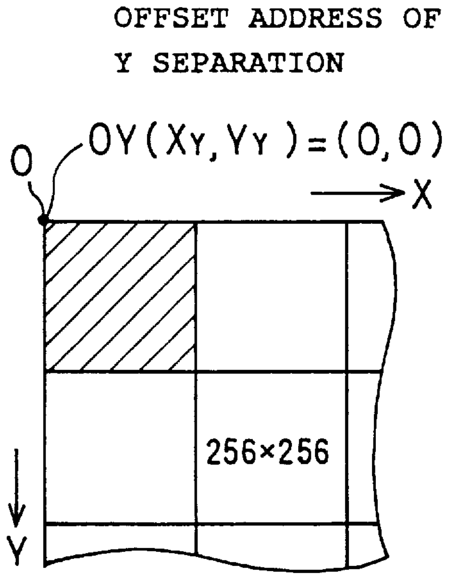
FIGS. 11(*a*) through 11(*d*) show a process of varying offset addresses of a threshold matrix for every color separation.
Figure 11B:
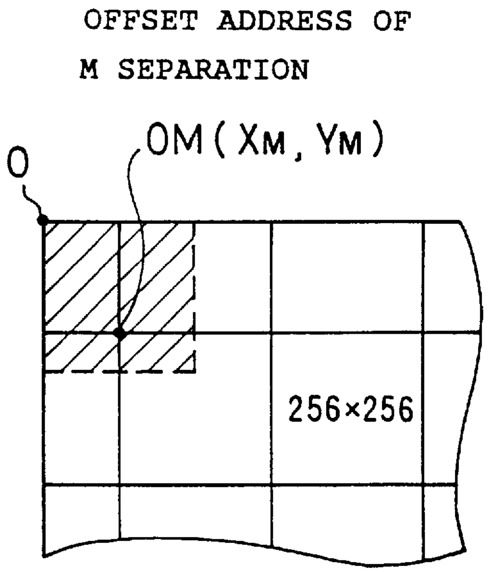
Figure 11C:
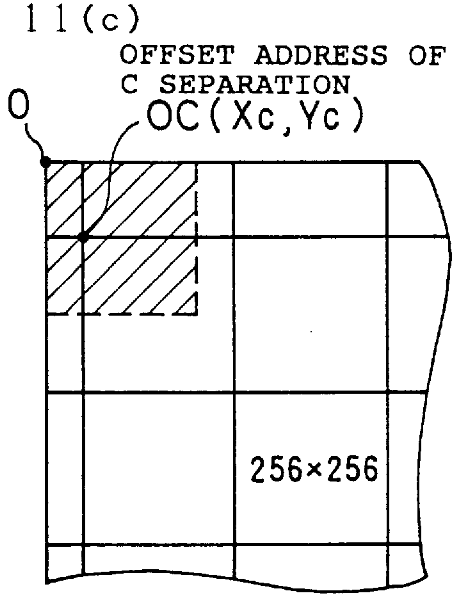
Figure 11D:
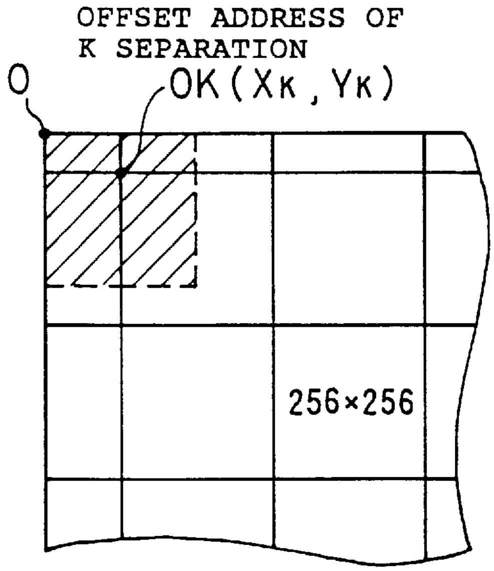

FIG. 7 shows another example of an 8×8 matrix which is produced by randomly selecting the arrangement of the four 2×2 sub-matrices $T_{ij}$ from the eight diagonal patterns in each of the four groups G1 through G4 or 4×4 sub-matrices shown in FIG. 5. In the example of FIG. 7, the difference of the threshold entries between the four 2×2 sub-matrices included in each of the four groups G1 through G4 is equal to 4 ($=M^2/4\times4$; M=8).

The arrangement of the four groups G1 through G4 can also be selected arbitrarily out of the twenty-four combinations. In this case, it is also preferably to select one of the eight diagonal patterns.

Each 2×2 sub-matrix $T_{ij}$ included in the 8×8 threshold matrix $TM_{8\times8}$ thus obtained can be expressed as:

$$T_{ij}=2^{2(N-1)}\begin{bmatrix}a_{ij}&c_{ij}\\d_{ij}&b_{ij}\end{bmatrix}+k_{ij}\begin{bmatrix}1&1\\1&1\end{bmatrix} \quad (5)$$

where i and j are integers between 1 and $$\frac{M}{2};$$

N is an integer defined by $2^N$=M;

$k_{ij}$ is an integer between 0 and $$\left(\frac{M^2}{4}-1\right),$$

which has a different value for a different combination of i and j, and which is so determined that a value of MOD($k_{ij}$,GN) is equal for four 2×2 sub-matrices $T_{ij}$ included in each 4×4 sub-matrix;

MOD(x,y) gives a remainder of x divided by y;

GN is a number of 4×4 sub-matrices included in a M×M matrix, and is equal to $$\frac{M^2}{4\times4};$$

and $a_{ij}$, $b_{ij}$, $c_{ij}$, and $d_{ij}$ are different integers between 0 and 3, and allocation of the elements $a_{ij}$, $b_{ij}$, $c_{ij}$, and $d_{ij}$ to 0 through 3 is determined independently for each 2×2 sub-matrix $T_{ij}$.

Expression 5 is modified from Expression 3 so that the entries $a_{ij}$, $b_{ij}$, $c_{ij}$, and $d_{ij}$ of the coefficient matrix CM (or 2×2 matrix of $a_{ij}$, $b_{ij}$, $c_{ij}$, and $d_{ij}$) are not fixed to constant values but their combination is selected at random among various combinations of 0 through 3.

The arrangement of threshold entries of FIG. 7 is obtained by setting the values of the coefficient $k_{ij}$ in Expression 5 as:

$$k_{ij}=\begin{bmatrix}4&8&2&14\\12&0&10&6\\3&11&13&1\\15&7&5&9\end{bmatrix} \quad (6)$$

C. Another Method of Expressing Threshold Matrix of Embodiment

The 8×8 basic matrix $BM_{8\times8}$ shown in FIG. 1(*c*) or FIG. 2(*b*) can be also expressed by the following recursion formulae:

$$BM_{8\times8}=S^3=\begin{bmatrix}S^2&S^2\\S^2&S^2\end{bmatrix}+\begin{bmatrix}E(0)^2&E(2)^2\\E(3)^2&E(1)^2\end{bmatrix} \quad (7a)$$

$$S^2=\begin{bmatrix}S^1&S^1\\S^1&S^1\end{bmatrix}+2^2\begin{bmatrix}E(0)^1&E(2)^1\\E(3)^1&E(1)^1\end{bmatrix} \quad (7b)$$

$$S^1=\begin{bmatrix}S^0&S^0\\S^0&S^0\end{bmatrix}+2^4\begin{bmatrix}0&2\\3&1\end{bmatrix} \quad (7c)$$

$$S^0=0 \quad (7d)$$

where $E(0)^{n-1}$, $E(1)^{n-1}$, $E(2)^{n-1}$, and $E(3)^{n-1}$ are square matrices of a dimension of $2^{n-1}$, whose components are all 0, 1, 2, and 3, respectively, for example, $$\begin{bmatrix} E(0)^1 & E(2)^1 \\ E(3)^1 & E(1)^1 \end{bmatrix} = \begin{bmatrix} 0 & 0 & 2 & 2 \\ 0 & 0 & 2 & 2 \\ 3 & 3 & 1 & 1 \\ 3 & 3 & 1 & 1 \end{bmatrix}; \text{ and}$$

n is an integer between 1 and 3.

In Expressions 7a–7d, matrices $S^1$, $S^2$, and $S^3$ respectively represent a basic pattern of the 2×2 sub-matrices $T_{ij}$, a basic pattern of the 4×4 sub-matrices or groups G1 through G4, and a basic pattern of the 8×8 basic matrix $BM_{8\times8}$. In other words, a square matrix $S^n$ has a dimension of $2^n$. In the specification herein, the smallest sub-matrix in a basic matrix BM is referred to as 'basic sub-matrix'. The 2×2 sub-matrix $S^1$ is the basic sub-matrix in the 8×8 basic matrix $BM_{8\times8}$, and a 3×3 sub-matrix is the basic sub-matrix in a 9×9 basic matrix. Extension of Expression 7a representing the 8×8 basic matrix $BM_{8\times8}$ to a general M×M basic matrix $BM_{M\times M}$ gives:

$$BM_{M\times M} = S^N = \begin{bmatrix} S^{N-1} & S^{N-1} \\ S^{N-1} & S^{N-1} \end{bmatrix} + 2^0 \begin{bmatrix} E(a)^{N-1} & E(c)^{N-1} \\ E(d)^{N-1} & E(b)^{N-1} \end{bmatrix} \quad (8a)$$

$$S^{N-1} = \begin{bmatrix} S^{N-2} & S^{N-2} \\ S^{N-2} & S^{N-2} \end{bmatrix} + 2^2 \begin{bmatrix} E(a)^{N-2} & E(c)^{N-2} \\ E(d)^{N-2} & E(b)^{N-2} \end{bmatrix} \quad (8b)$$

...

$$S^3 = \begin{bmatrix} S^2 & S^2 \\ S^2 & S^2 \end{bmatrix} + 2^{2(N-3)} \begin{bmatrix} E(a)^2 & E(c)^2 \\ E(d)^2 & E(b)^2 \end{bmatrix} \quad (8c)$$

$$S^2 = \begin{bmatrix} S^1 & S^1 \\ S^1 & S^1 \end{bmatrix} + 2^{2(N-2)} \begin{bmatrix} E(a)^1 & E(c)^1 \\ E(d)^1 & E(b)^1 \end{bmatrix} \quad (8d)$$

$$S^1 = \begin{bmatrix} S^0 & S^0 \\ S^0 & S^0 \end{bmatrix} + 2^{2(N-1)} \begin{bmatrix} E(a)^0 & E(c)^0 \\ E(d)^0 & E(b)^0 \end{bmatrix} \quad (8e)$$

-continued $$S^0 = 0 \quad (8f)$$

where $E(a)^{n-1}$, $E(b)^{n-1}$, $E(c)^{n-1}$, and $E(d)^{n-1}$ are square matrices of a dimension of $2^{n-1}$, whose components are all a, b, c, and d, respectively;

n is an integer between 1 and N; and a, b, c, and d are 0, 1, 2, and 3, respectively.

In this specification, a matrix $$\begin{bmatrix} E(a)^{n-1} & E(c)^{n-1} \\ E(d)^{n-1} & E(b)^{n-1} \end{bmatrix}$$

included in a matrix $S^n$ of a dimension of $2^n$ is referred to as coefficient matrix $CM^n$.

In the recursion formulae 8a–8f, a coefficient matrix $CM^n$ represents values to be added to four matrices $S^{n-1}$ of a dimension of $2^{n-1}$. The above mentioned Expressions 7a–7d correspond to Expressions 8*a*–8*f* where M=8, N=3, a=0, b=1, c=2, and d=3.

The general M×M basic matrix $BM_{M\times M}$ being expressed Expressions 8a–8f, the 8×8 threshold matrix $TM_{8\times8}$ shown in FIGS. 5 and 6 is produced according to the following steps. First, the entries a, b, c, and d of a coefficient matrix $CM^3$ included in an 8×8 matrix, i.e., a matrix $S^3$ of a dimension of $2^3$, are set equal to 0, 1, 2, and 3, respectively. The matrix $S^3$ is accordingly expressed as:

$$S^3 = \begin{bmatrix} S^2_{(1,1)} & S^2_{(2,1)} \\ S^2_{(1,2)} & S^2_{(2,2)} \end{bmatrix} + 2^0 \underbrace{\begin{bmatrix} 0 & 0 & 0 & 0 & 2 & 2 & 2 & 2 \\ 0 & 0 & 0 & 0 & 2 & 2 & 2 & 2 \\ 0 & 0 & 0 & 0 & 2 & 2 & 2 & 2 \\ 0 & 0 & 0 & 0 & 2 & 2 & 2 & 2 \\ 3 & 3 & 3 & 3 & 1 & 1 & 1 & 1 \\ 3 & 3 & 3 & 3 & 1 & 1 & 1 & 1 \\ 3 & 3 & 3 & 3 & 1 & 1 & 1 & 1 \\ 3 & 3 & 3 & 3 & 1 & 1 & 1 & 1 \end{bmatrix}}_{CM^3} \quad (9)$$

At this step, the contents of the four 4×4 matrices $s^2_{(u,v)}$ included in the matrix $S^3$ are not determined.

Next, the entries a, b, c, and d of a coefficient matrix $CM^2$ included in each of the four matrices $S^2_{(u,v)}$ of Expression 9 (see Expression 8d) are set equal to 0, 1, 2, and 3, respectively. The matrix $S^3$ is accordingly rewritten as:

$$S^3 = \begin{bmatrix} \begin{bmatrix} S^1_{(1,1)} & S^1_{(2,1)} \\ S^1_{(1,2)} & S^1_{(2,2)} \end{bmatrix}_{(1,1)} + 2^2 \begin{bmatrix} 0 & 0 & 2 & 2 \\ 0 & 0 & 2 & 2 \\ 3 & 3 & 1 & 1 \\ 3 & 3 & 1 & 1 \end{bmatrix} & \begin{bmatrix} S^1_{(1,1)} & S^1_{(2,1)} \\ S^1_{(1,2)} & S^1_{(2,2)} \end{bmatrix}_{(2,1)} + 2^2 \begin{bmatrix} 0 & 0 & 2 & 2 \\ 0 & 0 & 2 & 2 \\ 3 & 3 & 1 & 1 \\ 3 & 3 & 1 & 1 \end{bmatrix} \\ \begin{bmatrix} S^1_{(1,1)} & S^1_{(2,1)} \\ S^1_{(1,2)} & S^1_{(2,2)} \end{bmatrix}_{(1,2)} + 2^2 \underbrace{\begin{bmatrix} 0 & 0 & 2 & 2 \\ 0 & 0 & 2 & 2 \\ 3 & 3 & 1 & 1 \\ 3 & 3 & 1 & 1 \end{bmatrix}}_{(CM^2)} & \begin{bmatrix} S^1_{(1,1)} & S^1_{(2,1)} \\ S^1_{(1,2)} & S^1_{(2,2)} \end{bmatrix}_{(2,2)} + 2^2 \underbrace{\begin{bmatrix} 0 & 0 & 2 & 2 \\ 0 & 0 & 2 & 2 \\ 3 & 3 & 1 & 1 \\ 3 & 3 & 1 & 1 \end{bmatrix}}_{(CM^2)} \end{bmatrix} + 2^0 \underbrace{\begin{bmatrix} 0 & 0 & 0 & 0 & 2 & 2 & 2 & 2 \\ 0 & 0 & 0 & 0 & 2 & 2 & 2 & 2 \\ 0 & 0 & 0 & 0 & 2 & 2 & 2 & 2 \\ 0 & 0 & 0 & 0 & 2 & 2 & 2 & 2 \\ 3 & 3 & 3 & 3 & 1 & 1 & 1 & 1 \\ 3 & 3 & 3 & 3 & 1 & 1 & 1 & 1 \\ 3 & 3 & 3 & 3 & 1 & 1 & 1 & 1 \\ 3 & 3 & 3 & 3 & 1 & 1 & 1 & 1 \end{bmatrix}}_{(CM^3)} \quad (10)$$

Lastly, a combination of the entries a, b, c, and d of a coefficient matrix $CM^1$ included in each of the sixteen 2×2 matrices $S^1_{(u,v)}$ of Expression 10 (see Expression 8e) is selected at random from various combinations of 0, 1, 2, and 3. This gives the 8×8 matrix $S^3$ as:

$$S^3 = 2^4 \begin{bmatrix} 1 & 3 & 1 & 3 & 0 & 2 & 2 & 1 \\ 2 & 0 & 2 & 0 & 3 & 1 & 0 & 3 \\ 2 & 1 & 0 & 3 & 0 & 3 & 1 & 2 \\ 0 & 3 & 2 & 1 & 2 & 1 & 3 & 0 \\ 0 & 2 & 2 & 0 & 0 & 3 & 1 & 2 \\ 3 & 1 & 1 & 3 & 2 & 1 & 3 & 0 \\ 3 & 1 & 0 & 3 & 0 & 2 & 0 & 3 \\ 0 & 2 & 2 & 1 & 3 & 1 & 2 & 1 \end{bmatrix} + \tag{11}$$

(16 matrices $CM^1$)

$$2^2 \begin{bmatrix} 0 & 0 & 2 & 2 & 0 & 0 & 2 & 2 \\ 0 & 0 & 2 & 2 & 0 & 0 & 2 & 2 \\ 3 & 3 & 1 & 1 & 3 & 3 & 1 & 1 \\ 3 & 3 & 1 & 1 & 3 & 3 & 1 & 1 \\ 0 & 0 & 2 & 2 & 0 & 0 & 2 & 2 \\ 0 & 0 & 2 & 2 & 0 & 0 & 2 & 2 \\ 3 & 3 & 1 & 1 & 3 & 3 & 1 & 1 \\ 3 & 3 & 1 & 1 & 3 & 3 & 1 & 1 \end{bmatrix} +$$

(4 matrices $CM^2$)

$$2^0 \begin{bmatrix} 0 & 0 & 0 & 0 & 2 & 2 & 2 & 2 \\ 0 & 0 & 0 & 0 & 2 & 2 & 2 & 2 \\ 0 & 0 & 0 & 0 & 2 & 2 & 2 & 2 \\ 0 & 0 & 0 & 0 & 2 & 2 & 2 & 2 \\ 3 & 3 & 3 & 3 & 1 & 1 & 1 & 1 \\ 3 & 3 & 3 & 3 & 1 & 1 & 1 & 1 \\ 3 & 3 & 3 & 3 & 1 & 1 & 1 & 1 \\ 3 & 3 & 3 & 3 & 1 & 1 & 1 & 1 \end{bmatrix}$$

(a matrix $CM^3$)

Expression 11 gives the 8×8 threshold matrix $TM_{8\times8}$ shown in FIGS. 5 and 6. As clearly understood from Expression 11, the components of the coefficient matrix $CM^1$ is multiplied by $2^4$, those of the coefficient matrix $CM^2$ by $2^2$, and those of the coefficient matrix $CM^3$ by a constant $2^0$ (=1). In general, a coefficient matrix $CM^n$ included in a matrix $S^n$ of a dimension of $2^n$ in an M×M matrix (see Expressions 8a–8e) is multiplied by $2^{2(N-n)}$, where n is an integer between 1 and N, and N is an integer satisfying $2^N$=M.

Comparison of Expressions 10 and 11 shows that the sixteen matrices $S^1_{(u,v)}$ included in the matrix $S^3$ of a dimension of $2^3$ (see Expression 10) are determined independently from one another in the above process of preparing the threshold matrix. Similarly, the four matrices $S^2_{(u,v)}$ included in the matrix $S^3$ (see Expression 9) may be determined independently from one another. The 8×8 threshold matrix $TM_{8\times8}$ thus produced in the embodiment can accordingly be expressed as:

$$TM_{8\times8} = S^3_{(1,1)} = \begin{bmatrix} S^2_{(1,1)} & S^2_{(2,1)} \\ S^2_{(1,2)} & S^2_{(2,2)} \end{bmatrix} + 2^0 \begin{bmatrix} E(a)^2 & E(c)^2 \\ E(d)^2 & E(b)^2 \end{bmatrix}_{(1,1)} \tag{12a}$$

$$S^2_{(u,v)} = \begin{bmatrix} S^1_{(1,1)} & S^1_{(2,1)} \\ S^1_{(1,2)} & S^1_{(2,2)} \end{bmatrix} + 2^2 \begin{bmatrix} E(a)^1 & E(c)^1 \\ E(d)^1 & E(b)^1 \end{bmatrix}_{(u,v)} \tag{12b}$$

$$S^1_{(u,v)} = \begin{bmatrix} S^0_{(1,1)} & S^0_{(2,1)} \\ S^0_{(1,2)} & S^0_{(2,2)} \end{bmatrix} + 2^4 \begin{bmatrix} E(a)^0 & E(c)^0 \\ E(d)^0 & E(b)^0 \end{bmatrix}_{(u,v)} \tag{12c}$$

-continued $$S^0_{(u,v)} = 0 \tag{12d}$$

where $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively;

n is an integer between 1 and 3;

a, b, c, and d are different integers between 0 and 3, and values of a, b, c, and d are randomly determined for each coefficient matrix $$\begin{bmatrix} E(a)^{n-1} & E(c)^{n-1} \\ E(d)^{n-1} & E(b)^{n-1} \end{bmatrix}_{(u,v)}$$

at coordinates (u,v).

Extension of Expressions 12a–12d to a generalized M×M threshold matrix $TM_{M\times M}$ provides the following recursion formulae:

$$TM_{M\times M} = S^N_{(1,1)} = \begin{bmatrix} S^{(N-1)}_{(1,1)} & S^{(N-1)}_{(2,1)} \\ S^{(N-1)}_{(1,2)} & S^{(N-1)}_{(2,2)} \end{bmatrix} + 2^0 \begin{bmatrix} E(a)^{(N-1)} & E(c)^{(N-1)} \\ E(d)^{(N-1)} & E(b)^{(N-1)} \end{bmatrix}_{(1,1)} \tag{13a}$$

$$S^{(N-1)}_{(u,v)} = \begin{bmatrix} S^{(N-2)}_{(1,1)} & S^{(N-2)}_{(2,1)} \\ S^{(N-2)}_{(1,2)} & S^{(N-2)}_{(2,2)} \end{bmatrix} + 2^2 \begin{bmatrix} E(a)^{(N-2)} & E(c)^{(N-2)} \\ E(d)^{(N-2)} & E(b)^{(N-2)} \end{bmatrix}_{(u,v)} \tag{13b}$$

. . .

$$S^2_{(u,v)} = \begin{bmatrix} S^1_{(1,1)} & S^1_{(2,1)} \\ S^1_{(1,2)} & S^1_{(2,2)} \end{bmatrix} + 2^{2(N-2)} \begin{bmatrix} E(a)^1 & E(c)^1 \\ E(d)^1 & E(b)^1 \end{bmatrix}_{(u,v)} \tag{13c}$$

$$S^1_{(u,v)} = \begin{bmatrix} S^0_{(1,1)} & S^0_{(2,1)} \\ S^0_{(1,2)} & S^0_{(2,2)} \end{bmatrix} + 2^{2(N-1)} \begin{bmatrix} E(a)^0 & E(c)^0 \\ E(d)^0 & E(b)^0 \end{bmatrix}_{(u,v)} \tag{13d}$$

$$S^0_{(u,v)} = 0 \tag{13e}$$

where $S^n_{(u,v)}$ is a square matrix of a dimension of $2^n$, given by $$S^n_{(u,v)} = \begin{bmatrix} S^{(n-1)}_{(1,1)} & S^{(n-1)}_{(2,1)} \\ S^{(n-1)}_{(1,2)} & S^{(n-1)}_{(2,2)} \end{bmatrix} + 2^{2(N-n)} \begin{bmatrix} E(a)^{(n-1)} & E(c)^{(n-1)} \\ E(d)^{(n-1)} & E(b)^{(nn-1)} \end{bmatrix}_{(u,v)}$$

and wherein

N is an integer defined by $2^N$=M;

n is an integer between 1 and N;

$E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively;

a, b, c, and d are different integers between 0 and 3, and allocation of a, b, c, and d to 0 through 3 is randomly determined for each coefficient matrix $$\begin{bmatrix} E(a)^{(n-1)} & E(c)^{(n-1)} \\ E(d)^{(n-1)} & E(b)^{(n-1)} \end{bmatrix}_{(u,v)}$$

at coordinates (u,v).

D. Effect of Threshold Matrix of Embodiment

FIGS. 8(*a*) through 8(*c*) respectively show the 8×8 basic matrix $BM_{8\times8}$ shown in FIG. 1(*c*), the 8×8 threshold matrix $TM_{8\times8}$ shown in FIG. 6, and an 8×8 matrix where threshold values of 0 through 63 are arranged at random. In this embodiment, each spot, i.e., each position in the matrix, is set ON or OFF according to the following Inequalities 14*a* and 14*b* defining the relationship between image data ID and threshold data TD:

$$ID>TD\text{: ON (black)} \quad (14a)$$

$$ID\leq TD\text{: OFF (white)} \quad (14b)$$

FIGS. 8(*d*), 8(*e*), and 8(*f*) show ON/OFF patterns in a matrix when uniform image data ID=32 (density=50%) is applied to the three matrices of FIGS. 8(*a*), 8(*b*), and 8(*c*). Black spots show the positions where TD<ID=32. FIG. 8(*d*) shows that the 8×8 basic matrix BM produces a regular checker-board pattern. Application of the basic matrix BM often gives a regular pattern in an image area of substantially uniform density, although the regular pattern is not shown in the continuous tone image. Neither the 8×8 threshold matrix TM of the embodiment nor the completely random 8×8 matrix (FIG. 8(*c*)) generates a regular pattern. While the largest cluster of vertically and horizontally connected black pixels has the size of 2×2 for the 8×8 threshold matrix TM of the embodiment as shown in FIG. 8(*e*), black clusters larger than 2×3 or 3×2 pixels in size are observed for the completely random 8×8 matrix as shown in FIG. 8(*f*). This means that the 8×8 threshold matrix TM of the embodiment shown in FIG. 8(*b*) provides the higher spatial frequency in the binary image than the completely random 8×8 matrix shown in FIG. 8(*c*).

The two patterns shown in FIGS. 8(*e*) and 8(*f*) may appear to have different densities to the naked eyes. The 8×8 threshold matrix TM of the embodiment increases the size of the black clusters substantially proportional to the image data ID whereas the size of the black clusters is not always proportional to the image data ID in the completely random 8×8 matrix. Accordingly, the 8×8 threshold matrix TM of the embodiment can reproduce the middle tone area of the image more smoothly than the completely random 8×8 matrix. These advantages of the 8×8 threshold matrix TM, that is, no generation of a regular pattern which is not shown in an original image and smooth tone reproduction, are ascribed to the selection of the coefficient matrix $CM_n$ among the eight diagonal patterns. That is, the coefficient matrix $$CM^n = \begin{bmatrix} E(a)^{n-1} & E(c)^{n-1} \\ E(d)^{n-1} & E(b)^{n-1} \end{bmatrix}$$

is selected from the following eight diagonal patterns:

$$\begin{bmatrix} E(0)^{n-1} & E(2)^{n-1} \\ E(3)^{n-1} & E(1)^{n-1} \end{bmatrix}, \begin{bmatrix} E(0)^{n-1} & E(3)^{n-1} \\ E(2)^{n-1} & E(1)^{n-1} \end{bmatrix},$$

$$\begin{bmatrix} E(2)^{n-1} & E(0)^{n-1} \\ E(1)^{n-1} & E(3)^{n-1} \end{bmatrix}, \begin{bmatrix} E(3)^{n-1} & E(0)^{n-1} \\ E(1)^{n-1} & E(2)^{n-1} \end{bmatrix},$$

$$\begin{bmatrix} E(1)^{n-1} & E(2)^{n-1} \\ E(3)^{n-1} & E(0)^{n-1} \end{bmatrix}, \begin{bmatrix} E(1)^{n-1} & E(3)^{n-1} \\ E(2)^{n-1} & E(0)^{n-1} \end{bmatrix},$$

$$\begin{bmatrix} E(2)^{n-1} & E(1)^{n-1} \\ E(0)^{n-1} & E(3)^{n-1} \end{bmatrix}, \begin{bmatrix} E(3)^{n-1} & E(1)^{n-1} \\ E(0)^{n-1} & E(2)^{n-1} \end{bmatrix}$$

where $E(0)^{(n-1)}$, $E(1)^{(n-1)}$, $E(2)^{(n-1)}$, and $E(3)^{(n-1)}$ are square matrices of a dimension of $2^{(n-1)}$, whose components are all 0, 1, 2, and 3, respectively.

E. Another Threshold Matrix of Embodiment

A threshold matrix which can be halved at a plurality of times down to 2×2 sub-matrices, viz., a square matrix of a dimension of $2^N$ where N is an integer, is preferable. Practical examples of such threshold matrices other than 8×8 matrix are 16×16 and 32×32 matrices.

FIG. 9 shows an example of 16×16 threshold matrix $TM_{16\times16}$. In the example of FIG. 9, the threshold values are written in hexadecimal notation, which clearly shows the relations among the threshold values in the 2×2 sub-matrices and in the 4×4 sub-matrices. Threshold values are expressed in 8-bit digital data, and range from 0 through 255. As shown in FIG. 9, sixteen threshold values in each 4×4 sub-matrix have an identical figure for the lower four bits or the lowest place in the hexadecimal notation.

FIG. 10 shows the 16×16 threshold matrix $TM_{16\times16}$ of FIG. 9 rewritten in quaternary notation. As shown in FIG. 10, all the threshold values in each of the four 8×8 sub-matrices in the 16×16 threshold matrix $TM_{16\times16}$ have an identical figure for the lowest place in quaternary notation or bits 1 and 2 in binary notation. It should be also noted that the four 8×8 sub-matrices have different figures, 0 through 3, for the lowest place in quaternary notation.

In a similar manner, all the threshold values in each of the four 4×4 sub-matrices in each 8×8 sub-matrix have identical figures for the lowest two places in quaternary notation or bits 1 through 4 in binary notation. The four 4×4 sub-matrices included in one 8×8 sub-matrix have different figures, 0 through 3, for the second lowest place in quaternary notation or bits 3 and 4 in binary notation.

All the threshold values in each of the four 2×2 sub-matrices in each 4×4 sub-matrix have identical figures for the lowest three places in quaternary notation or bits 1 through 6 in binary notation. The four 2×2 sub-matrices included in one 4×4 sub-matrix have different figures, 0 through 3, for the third lowest place in quaternary notation or bits 5 and 6 in binary notation. The four threshold values included in each 2×2 sub-matrix have different figures, 0 through 3, for the uppermost place in quaternary notation.

The 16×16 threshold matrix $TM_{16\times16}$ shown in FIGS. 9 and 10 is obtained by substituting M=16 and N=4 in Expressions 13a–13e and expressed as:

$$TM_{16\times16} = S^4_{(1,1)} = \begin{bmatrix} S^3_{(1,1)} & S^3_{(2,1)} \\ S^3_{(1,2)} & S^3_{(2,2)} \end{bmatrix} + 2^0 \begin{bmatrix} E(a)^3 & E(c)^3 \\ E(d)^3 & E(b)^3 \end{bmatrix}_{(1,1)} \quad (15a)$$

$$S^3_{(u,v)} = \begin{bmatrix} S^2_{(1,1)} & S^2_{(2,1)} \\ S^2_{(1,2)} & S^2_{(2,2)} \end{bmatrix} + 2^2 \begin{bmatrix} E(a)^2 & E(c)^2 \\ E(d)^2 & E(b)^2 \end{bmatrix}_{(u,v)} \quad (15b)$$

$$S^2_{(u,v)} = \begin{bmatrix} S^1_{(1,1)} & S^1_{(2,1)} \\ S^1_{(1,2)} & S^1_{(2,2)} \end{bmatrix} + 2^4 \begin{bmatrix} E(a)^1 & E(c)^1 \\ E(d)^1 & E(b)^1 \end{bmatrix}_{(u,v)} \quad (15c)$$

$$S^1_{(u,v)} = \begin{bmatrix} S^0_{(1,1)} & S^0_{(2,1)} \\ S^0_{(1,2)} & S^0_{(2,2)} \end{bmatrix} + 2^6 \begin{bmatrix} E(a)^0 & E(c)^0 \\ E(d)^0 & E(b)^0 \end{bmatrix}_{(u,v)} \quad (15d)$$

$$S^o_{(u,v)} = 0 \quad (15e)$$

where $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively;

n is an integer between 1 and 4; and a, b, c, and d are different integers between 0 and 3, and the values of a, b, c, and d are randomly determined for each coefficient matrix $$\begin{bmatrix} E(a)^{n-1} & E(c)^{n-1} \\ E(d)^{n-1} & E(b)^{n-1} \end{bmatrix}_{(u,v)}$$

at coordinates (u,v).

In the 16×16 threshold matrix $TM_{16\times16}$ shown in FIG. 10, the entries of the coefficient matrix $CM^4$, which consists of $E(a)^3$, $E(b)^3$, $E(c)^3$, and $E(d)^3$, in a 16×16 matrix $S^4$ of Expression 15a is determined that (a,b,c,d)=(2,1,0,3). Four coefficient matrices $CM^3$, each of which consists of $E(a)^2$, $E(b)^2$, $E(c)^2$, and $E(d)^2$, in four 8×8 sub-matrices $S^3$ are selected at random out of eight diagonal patterns of combination of the entries a, b, c, and d. Sixteen coefficient matrices, $CM^2$, each of which consists of $E(a)^1$, $E(b)^1$, $E(c)^1$, and $E(d)^1$, in sixteen 4×4 sub-matrices $S^2$ are prepared by setting the entries a, b, c, and d equal to 0, 1, 3, and 2, respectively. Sixty-four coefficient matrices $CM^1$, each of which consists of $E(a)^0$, $E(b)^0$, $E(c)^0$, and $E(d)^0$, in sixty-four 2×2 basic sub-matrix $S^1$ are selected at random out of eight diagonal patterns of combination of the entries a, b, c, and d. In this manner, the combination of the entries a, b, c, and d can be determined at random in some stages of a multi-stage matrix structure expressed by the recursion formulae and fixed to specific combinations in other stages. In determining the combination of the entries a, b, c, and d at random, it can be selected at random out of eight diagonal patterns or out of possible twenty-four patterns.

As Expressions 15a–15f clearly show, the coefficient matrix $CM^4\{E(a)^3, E(b)^3, E(c)^3, E(d)^3\}$ defines the first and second lowest bits of 8-bit threshold data (FIG. 10). In a similar manner, the coefficient matrix $CM^3\{E(a)^2, E(b)^2, E(c)^2, E(d)^2\}$ defines the third and fourth lowest bits of the 8-bit threshold data, the coefficient matrix $CM^2\{E(a)^1, E(b)^1, E(c)^1, E(d)^1\}$ the fifth and sixth lowest bits of the 8-bit threshold data, and the coefficient matrix $CM^1\{E(a)^0, E(b)^0, E(c)^0, E(d)^0\}$ the seventh and eighth lowest bits, or first and second uppermost bits, of the 8-bit threshold data.

The above principles being applied to the general Expressions 13a–13e, a coefficient matrix $CM^n\{E(a)^{n-1}, E(b)^{n-1}, E(c)^{n-1}, E(d)^{n-1}\}$ defines the (2(N−n)+1)-th and (2(N−n)+2)-th lowest bits of 2N-bit threshold data. Namely, each coefficient matrix $CM^n\{E(a)^{n-1}, E(b)^{n-1}, E(c)^{n-1}, E(d)^{n-1}\}$ in the recursion formulae 13a–13e defines two bits of the 2N-bit threshold data.

F. Combination of Threshold Matrices

If only one M×M threshold matrix is repeatedly used in producing a binary halftone image in both a primary scanning direction and a secondary scanning direction, the resultant binary halftone image or binary image may show a repeated pattern which is characteristic of the M×M threshold matrix and which does not exist in the original continuous tone image. In practical operation, an L1×L2 threshold matrix consisting of a plurality of M×M threshold matrices, where L1 and L2 are integral multiplies of an integer M, is used for preventing such a repeated pattern. In this case, a plurality of M×M threshold matrices are prepared to have different distributions of threshold data. For example, two hundred and fifty six different 16×16 threshold matrices are prepared and arranged in 16 columns and 16 rows to form a 256×256 threshold matrix.

In the M×M threshold matrix expressed by the recursion formulae 13a–13e, the combination of the entries a, b, c, and d of the coefficient matrix $CM^n$ should be selected at random out of a predetermined plural patterns in at least one stage of the recursion formulae $S^n$. This attains different distributions of threshold data assigned to the plurality of M×M threshold matrices constituting the L1×L2 threshold matrix.

In a binary halftone image produced with the L1×L2 threshold matrix thus prepared, an image area having substantially uniform density has hardly a regular pattern in an L1×L2 matrix area. It is not necessary that all the two hundred and fifty six 16×16 threshold matrices have completely different distributions of threshold data from each other, and a plurality of 16×16 threshold matrices may be prepared to have partially identical distributions of threshold data and arranged separately or at random.

Multi-tone image data of 2N bit digital data, where N is an integer satisfying $2^N$=M, have M×M tone levels. Under the condition of the above mentioned Inequalities 14*a* and 14*b*, all of the M×M tone levels of the multi-tone image data can be reproduced if the maximum threshold value ($M^2$−1) in each M×M threshold matrix is substituted by a value in the range of 0 through ($M^2$−2). For example, if the range of threshold data is 0 through 254 in each 16×16 threshold matrix, the comparison of the threshold data with 8-bit multi-tone image data ranging from 0 through 255 results in reproduction of 256 tone levels. The M×M threshold matrix where the maximum ($M^2$−1) of the 2N-bit data is substituted by a value in the range of 0 through ($M^2$−2) satisfies the condition that one of the threshold values in the range of 0 through ($M^2$−2) appear twice and the other threshold values appear only once.

It is preferable to produce an L1×L2 threshold matrix from a plurality of M×M threshold matrices so that it allows smooth reproduction of tone levels in the original image. This is realized by substituting the maximum threshold value ($M^2$−1) in each M×M threshold matrix by a value selected at random out of 0 through ($M^2$−2). A substitute value TT can be determined, for example, as follows:

$$TT = \frac{M \times M}{N_M} \times \alpha + \beta \tag{16}$$

where $N_M$ is a number of M×M matrices included in an L1×L2 matrix; and

α and β are integers satisfying $0 \leqq \alpha, \beta < N_M$, which are randomly determined while a same value of α is used only once.

When Expression 16 gives the substitute value TT of ($M^2$−1), at least one of α and β is to be reset to obtain another value. By determining the substitute value TT using random values, the substitute value TT is distributed at random in the range of 0 through ($M^2$−2), and thereby all of the tone levels of the image data can be smoothly reproduced with the threshold matrix.

When the following Inequalities 17a and 17b are used to determine ON/OFF of each spot, in place of the above mentioned Inequalities 14a and 14b, the minimum threshold value (=0) is substituted by a value in the range of 0 through ($M^2$−1):

$$ID \leqq TD\text{: ON (black)} \tag{17a}$$

$$ID > TD\text{: OFF (white)} \tag{17b}$$

G. Preparation of Threshold Matrices for Plural Color separations

Binarization of multi-tone image data with respect to each of a plurality of color separations is required for reproduction of a color image. A plurality of methods are applicable to the binarization of color image data based on the threshold matrices described above.

In a first method, L1×L2 threshold matrices are separately prepared for the respective color separations. Since the threshold data are arranged at random as described previously, the L1×L2 threshold matrices prepared for the respective color separations have different distributions of threshold data from each other. This effectively prevents a moire and Rosetta patterns from being observed in a color print, which is reproduced by overprinting a plurality of color plates one upon another.

In a second method, a threshold data memory storing only one L1×L2 threshold matrix is prepared, and threshold data read from the threshold data memory is adjusted differently for each color separation in binarization of the image data. The second method is further classified into the following three methods:

(a) Providing different offset-addresses to the threshold data memory for respective color separations;

(b) Executing a predetermined arithmetic operation (addition, subtraction, or the like) on the threshold data read from the threshold data memory with different factors for respective color separations, and using the result of the arithmetic operation as new threshold data; and (c) Inverting at least one specific bit of the threshold data read from the threshold data memory while the specific bits are predetermined differently for the color separations.

FIG. 11 shows an example of the above method (a). In this example, color image data consists of four color separations, Y (yellow), M (magenta), C (cyan), and K (black), which respectively have offset addresses OY, OM, OC, and OK with respect to an origin O on an image plane. The block labeled '256×256' corresponds to one L1×L2 threshold matrix, which is repeatedly applied on the image plane. While the offset address $OY(X_Y,Y_Y)$ for the Y separation is equal to (0,0), the offset addresses $OM(X_M,Y_M)$ for the M separation, $OC(X_C,Y_C)$ for the C separation, and $OK(X_K,Y_K)$ for the K separation are set different from one another. Preferably, these offset addresses are set to be integral multiples of the number of rows or columns M of M×M threshold matrices constituting the L1×L2 threshold matrix. The offset addresses may, however, be set to any other integers.

By using different offset addresses to the respective color separations, different distributions of threshold data are applied to the respective color separations even when only one L1×L2 threshold matrix is stored in a memory. This effectively prevents a moire and Rosetta patterns from being observed in a color print, which is reproduce by overprinting a plurality of color plates one upon another. This method requires only one L1×L2 threshold matrix stored in the memory, thereby saving the time and labor for preparation of the threshold matrices as well as saving the memory capacity.

Alternatively, four threshold matrices, whose areas are filled with slant lines in FIGS. 11(*a*) through 11(*d*), may be prepared in place of storing one L1×L2 threshold matrix and applying a plurality of offset addresses. This alternative method still saves the time and labor for preparation of the threshold matrices although it does not save the memory capacity.

H. Details of Method of Preparing Threshold Matrices for a Plurality of Color Separations Prior to describing the method of preparing threshold matrices for a plurality of color separations, the structure of a threshold matrix according to the above mentioned Equations 13a–13f will be analyzed below. FIGS. 12(*a*) through 12(*d*) show the structure of an 8×8 threshold matrix prepared in the embodiment. The 8×8 threshold matrix is expressed both in decimal notation and quaternary notation in FIG. 12(*a*). Threshold data included in the 8×8 threshold matrix range from 0 through 63 in decimal notation and expressed by 6-bit digital data. In quaternary notation, each threshold data is expressed by three place values, where each place value corresponds to two bits in binary notation.

FIGS. 12(*b*), 12(*c*), and 12(*d*) respectively show distributions of the lowest two bits, medium two bits, and uppermost two bits of threshold data in the threshold matrix of FIG. 12(*a*). Actual forms of Equations 13a–13e for the 8×8 threshold matrix are the above mentioned Equations 12a–12d. As clearly understood from Equation 12a, the distribution of coefficients $E(a)^2$ through $E(d)^2$ represent the distribution of the lowest two bits shown in FIG. 12(*b*). In a similar manner, the distribution of coefficients $E(a)^1$ through $E(d)^1$ and that of coefficients $E(a)^0$ through $E(d)^0$ represent the distribution of the medium two bits shown in FIG. 12(*c*), and the distribution of the uppermost two bits shown in FIG. 12(*d*), respectively.

If four different threshold matrices are prepared for the four color separations Y, M, C, and K, it is preferable that the respective threshold matrices have different distributions of threshold data from each other. It should be noted that the distribution of threshold data according to Equations 13a–13e (or Equations 12a–12d) is determined by each coefficient matrix, that is, the distribution of $E(a)^{n-1}$ through $E(d)^{n-1}$. Adjustment of the coefficient matrix, viz., the distribution of $E(a)^{n-1}$ through $E(d)^{n-1}$, is required to allow the threshold matrices for the respective color separations to have different distributions of threshold data from one another.

FIGS. 13(*a*) through 13(*d*) show four 8×8 threshold matrices obtained by adjusting only the distribution of the lowest two bits of threshold data in the 8×8 threshold matrix shown in FIG. 12(*a*). A threshold matrix for the Y separation shown in FIG. 13(*a*) is identical with the threshold matrix of FIG. 12(*a*). Threshold matrices for the M, C, and K separations shown in FIGS. 13(*b*), 13(*c*), and 13(*d*) are obtained by modifying the lowest two bits, viz., the distribution of $E(a)^2$ through $E(d)^2$, of threshold data for the Y separation, which is shown in FIG. 13(*e*), as illustrated in FIGS. 13(*f*) through 13(*h*), respectively, while maintaining the upper four bits of the threshold data. As can be understood from FIGS. 13(*e*) through 13(*h*), the specific 4×4 sub-matrix where all entries of the lowest two bits are equal to zero is arranged at different positions in the respective 8×8 matrices of the four color separations. It should be further noted that the four 4×4 sub-matrices of the lowest two bits, which has values of 0 through 3, are arranged in diagonal patterns.

As clearly shown in FIGS. 13(*a*) through 13(*h*), adjustment of the lowest two bits changes the positions of the four 4×4 sub-matrices. For example, a 4×4 sub-matrix which is positioned on the upper left in the threshold matrix for the Y separation is on the lower right of the 8×8 threshold matrix for the M separation, on the upper right for the C separation, and on the lower left for the K separation. Although these equivalent 4×4 sub-matrices include the same series of threshold data of 0, 4, 8, 12, . . . , 60, each threshold data is positioned differently in the respective 4×4 sub-matrices. This is because the distribution of threshold data in each 4×4 sub-matrix is determined from the distributions of the middle two bits and the uppermost two bits (see FIGS. 12(*c*) and 12(*d*)), which are different for the respective four 4×4 sub-matrices.

FIGS. 14(A) and 14(B) respectively show spots to be exposed according to the threshold matrices of FIGS. 13(*a*)

through 13(*d*) when image data ID is equal to 1 and 16. Since the spots to be exposed in a binary image are applied with color ink in a reproduced color image, they are hereinafter referred to as ink spots.

When ID=1 as shown in FIG. 14(A), ink spots of the four color inks exist in different 4×4 sub-matrices. This means that the ink spots of the respective color separations are not close to one another but dispersed sufficiently. The dispersion of ink spots effectively improves graininess in the resulting image. When the image data ID is no less than 2, on the other hand, the ink spots of the respective color inks partly overlap. Upon condition that ID=16 as shown in FIG. 14(B), the ink spots of the four color inks completely overlap on all of the sixteen points. This will cause muddiness of colors in the color print. Incidentally, ID=16 represents the density of 25%.

FIGS. 15(*a*) through 15(*d*) shows four 8×8 threshold matrices obtained by adjusting only the distribution of the uppermost two bits of threshold data in the threshold matrix shown in FIG. 12(*a*). A threshold matrix for the Y separation shown in FIG. 15(*a*) is identical with the threshold matrix of FIG. 12(*a*). Threshold matrices for the M, C, and K separations shown in FIGS. 15(*b*), 15(*c*), and 15(*d*) are obtained by adjusting the uppermost two bits, viz., the distribution of $E(a)^0$ through $E(d)^0$, of threshold data for the Y separation shown in FIG. 15(*e*) as illustrated in FIGS. 15(*f*) through 15(*h*) while maintaining the lowest four bits of the threshold data. In the examples of FIGS. 15(*e*) through 15(*h*), the positions of the value '0' represented by the uppermost two bits for the respective color separations are different from one another.

As clearly shown by the comparison among the four 8×8 threshold matrices of FIGS. 15(*a*) through 15(*d*), modification of only the distribution of the uppermost two bits does not vary the combination of the four threshold data included in each 2×2 sub-matrix but changes the positions of these threshold data in each 2×2 sub-matrix. For example, four threshold values {4,20,36,50} included in an upper-left 2×2 sub-matrix of the threshold matrix for the Y separation are also included in the corresponding 2×2 sub-matrices for the M-, C-, and K-separations although these four threshold values are arranged at different positions in the respective 2×2 sub-matrices.

FIGS. 16(A) and 16(B) show spots to be exposed according to the threshold matrices of FIGS. 14(*a*) through 14(*d*) when image data ID is equal to 1 and 16, respectively. As can be understood from FIG. 16(B), ink spots of the four color inks do not overlap one another in a range of image density up to 25%, or ID=16, with the four threshold matrices which are produced by adjusting the uppermost two bits. Non-overlapped ink spots effectively reduce the muddiness of colors in a resulting color image reproduced by overprinting binary halftone images of the four color separations one upon another, thus realizing a color image having high saturation. When ID=1 as shown in FIG. 16(A), on the contrary, ink spots of the four color inks are positioned close to one another, which give a rough graininess to the resulting color image. When the image data ID is more than 16, that is, when the density is greater than 25%, ink spots of the four color inks will partly overlap.

FIGS. 17(*a*) through 17(*d*) show four 8×8 threshold matrices obtained by adjusting both of the distributions of the lowest two bits and the uppermost two bits of threshold data in the threshold matrix shown in FIG. 12(*a*). A threshold matrix for the Y separation shown in FIG. 17(*a*) is identical with the threshold matrix of FIG. 12(*a*). Threshold matrices for the M, C, and K separations shown in FIGS. 17(*b*), 17(*c*), and 17(*d*) are obtained by: changing the lowest two bits, viz., the distribution of $E(a)^2$ through $E(d)^2$, of threshold data for the Y separation to those of FIGS. 12(*f*) through 12(*h*), respectively; and changing the uppermost two bits, viz., the distribution of $E(a)^0$ through $E(d)^0$, of threshold data for the Y separation to those of FIGS. 14(*f*) through 14(*h*), respectively.

It should be noted for the four threshold matrices of FIGS. 17(*a*) through 17(*d*) that the 4×4 sub-matrices are arranged at different positions for respective 8×8 matrices, and that the 2×2 sub-matrices have different 'threshold value orders'. The former is attributable to the adjusted distribution of the lowest two bits whereas the latter is ascribed to the adjusted distribution of the uppermost two bits. The term 'threshold value order' represents an order of four threshold values included in each 2×2 sub-matrix. For example, an upper-left 2×2 sub-matrix of FIG. 17(*a*) has the threshold value order of upper left (=4), lower right (=29), lower left (=36), and upper right (=52) whereas the upper-left 2×2 sub-matrix of FIG. 17(*b*) has the threshold value order of lower left (=5), upper right (=21), upper left (=37), and lower right (=53).

FIGS. 18(A) and 18(B) show spots to be exposed according to the threshold matrices of FIGS. 17(*a*) through 17(*d*) when image data ID is equal to 1 and 16, respectively. Similar to the ink spots shown in FIG. 14(A) where the threshold matrices used are produced by adjusting only the lowest two bits, when ID=1 as shown in FIG. 18(A), ink spots of the four color inks are not close to one another but dispersed sufficiently. As can be understood from FIG. 18(B), ink spots of the four color inks do not overlap one another in a range of image density up to 25%, or ID=16. Accordingly, the four threshold matrices produced by adjusting the uppermost two bits and the lowest two bits improves the graininess of a resulting image and eliminates muddiness of colors, thereby allowing a color image to be reproduced with high saturation both in low and medium ranges of density.

FIGS. 13(*a*) through 18(B) reveals the following two rules with respect to a 8×8 threshold matrix. The first rule is related to the adjustment of the uppermost two bits, and the second rule to the adjustment of the lowest two bits.

The first rule is that four threshold matrices produced by adjusting the uppermost two bits of threshold data allows the ink spots of the four color inks not to overlap one another in a range of image density up to 25%. When threshold data of 0 through 63 included in an 8×8 threshold matrix are divided into four groups, i.e., 0 through 15, 16 through 31, 32 through 47, and 48 through 63, adjustment of the uppermost two bits replaces each threshold data in one group with another threshold data in another group.

The second rule is that the four threshold matrices produced by adjusting the lowest two bits of threshold data allows ink spots of the four color inks sufficiently dispersed while the image data ID is relatively low.

The first rule can be extended to mean that the adjustment of the upper bits controls the threshold matrix microscopically, thus allowing ink spots of the color inks not to overlap one another up to the higher density. The second rule can be extended to mean that the adjustment of the lower bits controls the threshold matrix macroscopically, thus allowing ink spots of the respective color inks to be dispersed more.

The adjustment of the upper bits prevents ink spots of the respective color inks from overlapping, thereby allowing inks to develop their intrinsic colors accurately and realizing a color image with high saturation. The adjustment of the lower bits allows ink spots of the respective color inks to be dispersed, thus improving graininess of a resulting color image.

In general, the first rule is applied to the M×M threshold matrix given by Equations 13(a)–13(e). The uppermost two bits of threshold data are expressed by a coefficient matrix $CM^1\{E(a)^0,E(b)^0,E(c)^0,E(d)^0\}$. The values of 0 through 3 represented by the uppermost bit pairs are multiplied by $2^{2(N-1)}$. If threshold matrices for the four color separations have different values for the respective uppermost bit pairs, ink spots of the four color inks do not overlap one another until the value of image data ID becomes up to $2^{2(N-1)}$. Since the image data ID ranges from 0 to $2^{2N}$, the upper limit of image data ID ($=2^{2(N-1)}$) which prevents ink spots from overlapping corresponds to the density of 25% ($=2^{2(N-1)}/2^{2N}$).

Generally, an n-th uppermost bit pair of threshold data is expressed by a coefficient matrix $CM^n\{E(a)^{(n-1)},E(b)^{(n-1)},E(c)^{(n-1)},E(d)^{(n-1)}\}$. The values of 0 through 3 represented by the n-th it pairs are multiplied by $2^{2(N-n)}$. If threshold matrices for the four color separations have different values for the respective n-th bit pairs, ink spots of the four color inks do not overlap one another until the value of image data ID becomes up to $2^{2(N-n)}$. Since the image data ID ranges from 0 to $2^{2N}$, the upper limit of image data ID ($=2^{2(N-n)}$ which prevents ink spots from overlapping corresponds to the density of $1/2^{2n}$ ($=2^{2(N-n)}/2^{2N}$).

According to the characteristics of threshold data described above, it is preferred to satisfy the condition given below in preparation of threshold matrices for the four color separations, in order to prevent ink spots of the respective color separations from overlapping in a relatively low range of density.

[Condition C1]

The positions of coefficient $E(0)^0$ in a coefficient matrix $\{E(a)^0,E(b)^0,E(c)^0E(d)^0\}$, which is expressed by the uppermost bit pairs, for respective color separations are different from each other.

FIG. 19(A) shows an exemplified arrangement of the coefficient $E(0)^0$ (=0) satisfying the condition C1. In the example of FIG. 19(A), the other coefficients $E(1)^0$ through $E(3)^0$ may be put at arbitrary positions. The arrangement of the coefficient $E(0)^0$ as shown in FIG. 19(A) effectively prevents ink spots of the four color inks from overlapping one another in a range of image density up to 25%, thus reproducing a color image with high saturation.

It is more preferable to satisfy the following condition C1-1 in addition to the condition C1.

[Condition C1-1]

Coefficient matrices $\{E(a)^0,E(b)^0,E(c)^0,E(d)^0\}$ or the four color separations have different values from each other at each corresponding position.

FIG. 19(B) shows an exemplified arrangement of the coefficients $E(0)^0$ through $E(3)^0$ satisfying the conditions C1 and C1-1. This arrangement substantially reduces local overlapping of ink spots of the four color inks even in the range of the density greater than 25%.

It is still more preferable to satisfy the following condition C1-1-1 in addition to the conditions C1 and C1-1.

[Condition C1-1-1]

Each coefficient matrix $\{E(a)^0,E(b)^0,E(c)^0,E(d)^0\}$ has a diagonal pattern.

FIG. 19(C) shows an exemplified arrangement of the coefficients $E(0)^0$ through $E(3)^0$ satisfying the conditions C1, C1-1, and C1-1-1. The arrangement of coefficients in the diagonal pattern enhances the spatial frequency of a reproduced image.

The second rule given above can be applied to the M×M threshold matrix given by Equations 13a–13e as follows. The lowest bit pair of threshold data represent a coefficient matrix $CM^N\{E(a)^{N-1},E(b)^{N-1},E(c)^{N-1},E(d)^{N-1}\}$ shown in Expression 13a, and each value between 0 through 3 expressed by the respective lowest bit pairs are multiplied by $2^0$(=1). If threshold matrices of the four color separations have different values for the respective lowest bit pairs, ink spots of the four color inks are dispersed in each (M/2)×(M/2) matrix, which is a quarter of the M×M matrix.

According to the characteristics of threshold data described above, it is preferred to satisfy the conditions given below in preparation of threshold matrices for the four color separations, in order to disperse ink spots of the respective color inks sufficiently.

[Condition C2]

The positions of coefficient $E(0)^{N-1}$ in a coefficient matrix $\{E(a)^{N-1},E(b)^{N-1},E(c)^{N-1},E(d)^{N-1}\}$, which is expressed by the lowest bit pairs, for respective color separations are different from each other.

It is more preferable to satisfy the following condition C2-1 in addition to the condition C2.

[Condition C2-1]

Coefficient matrices $\{E(a)^{N-1},E(b)^{N-1},E(c)^{N-1},E(d)^{N-1}\}$ for the four color separations have different values from each other at each corresponding position.

It is still more preferable to satisfy the following condition C2-1-1 in addition to the conditions C2 and C2-1.

[Condition C2-1-1]

Each coefficient matrix $\{E(a)^{N-1},E(b)^{N-1},E(c)^{N-1},E(d)^{N-1}\}$ has a diagonal pattern.

Both of the conditions C1 and C2 are to be satisfied in order to reproduce a color image which has improved graininess and high saturation in low and medium ranges of density. These effects will be significantly enhanced by satisfying the following condition C3.

[Condition C3]

The positions of the coefficient $E(0)^{n-1}$ in coefficient matrices $\{E(a)^{n-1},E(b)^{n-1},E(c)^{n-1},E(d)^{n-1}\}$, for every value of n, for respective color separations are different from each other.

It is more preferable to satisfy the following conditions C3-1 and C3-1-1 in addition to the condition C3.

[Condition C3-1]

Coefficient matrices $\{E(a)^{n-1},E(b)^{n-1},E(c)^{n-1}\}$ for the four color separations have different values from each other at each corresponding position.

[Condition C3-1-1]

Each coefficient matrix $\{E(a)^{n-1},E(b)^{n-1},E(c)^{n-1},E(d)^{n-1}\}$ has a diagonal pattern.

Incidentally, various value patterns of the coefficients $E(0)^{n-1}$ through $E(3)^{n-1}$ as shown in FIGS. 19(B) and 19(C) can be obtained by executing bit operations on a specific base pattern. FIGS. 20(A) and 20(B) show some examples of bit operations to obtain the value patterns shown in FIG. 19(C). Values in 2×2 spots are expressed in binary notation in FIG. 20(A), and in quaternary notation in FIG. 20(B). A value pattern for the M separation is given by adding or subtracting a binary data '10' to or from a value pattern for the Y separation. In this case, a carry and a borrow should be neglected. The addition or subtraction of the binary data '10' is equivalent to inversion of the upper bit.

Inversion of both bits in the Y-separation pattern gives a value pattern for the C separation. Alternatively, inversion of the lower bit of the M-separation pattern also gives the C-separation pattern.

Inversion of the lower bit of the Y-separation pattern gives a value pattern for the K separation. Inversion of both bits in the M-separation pattern or addition of the binary data '10' to the C-separation pattern also gives the K-separation pattern.

Repeated bit operations change a value pattern alternately between the two patterns as shown by the arrows in FIGS. 20(A) and 20(B). Once a value pattern is prepared for one color separation, value patterns for the other color separations can be obtained easily by the bit operations including addition, subtraction, and inversion. The bit operations shown in FIGS. 20(A) and 20(B) convert one diagonal pattern to another diagonal pattern. A diagonal pattern will be converted to a non-diagonal pattern by addition or subtraction of binary data '01' or '11'. In such operations, a carry and a borrow of the two bits are also neglected.

The bit operations shown in FIGS. 20(A) and 20(B) can be executed for each bit pair. As clearly understood from Equations 13a–13e shown above, values expressed by the n-th uppermost bit pair, i.e., the coefficient matrix $\{E(a)^{n-1}, E(b)^{n-1}, E(c)^{n-1}, E(d)^{n-1}\}$, is multiplied by $2^{2(N-n)}$. Therefore the operation of adding the binary data '10' to the n-th uppermost bit pair is equivalent to addition of $2^{2(N-n+1)}$.

FIGS. 21(*a*) through 21(*d*) show threshold matrices of the four color separations satisfying the above conditions C3, C3-1, and C3-1-1. FIGS. 22(*a*)–22(*d*), 23(*a*)–23(*d*), and 24(*a*)–24(*d*) show the distributions of the lowest two bits $E(0)^2$–$E(3)^2$, the medium two bits $E(0)^1$–$E(3)^1$, and the uppermost two bits $E(0)^0$–$E(3)^0$ of the threshold matrices shown in FIGS. 21(*a*) through 21(*d*).

FIGS. 25(A) and 25(B) show distributions of ink spots according to the threshold matrices of FIGS. 21(*a*) through 21(*d*). Ink spots are arranged at different positions in binary halftone images of the respective color separations in the range of image data ID up to 16 (density of 25%) as shown in FIG. 25(A). The scarce-overlapping of ink spots in the binary images of the respective color separations allows a color image to be reproduced with high saturation. The dispersion of ink spots of the respective color separations results in improving graininess in the resulting color image.

When the value of image data ID is equal to 32 (density of 50%) as shown in FIG. 25(B), the ink spots for the Y and M separations are put at the same positions, and so are those for the C and K separations. This is attributable to the following reasons. In binarization process, the positions where the value of the uppermost two bits are equal to '0' are exposed in the range of the image data ID from 0 to 16, and the positions where the value of the uppermost two bits are equal to '1' are exposed in the range of the image data ID from 16 to 32. As shown in FIGS. 24(*a*) and 24(*b*), the positions of the values '0' and '1' are exchanged in the distributions of the uppermost two bits for the Y and M separations. Accordingly, the ink spots of the Y and M separations are placed at the same positions when the value of image data ID is equal to 32,. This phenomenon is also observed for the C and K separations. A countermeasure against such drawbacks will be described later.

Amongst the four color separations of Y, M, C, and K, the M and C separations are primary causes of rough graininess of a reproduced color image. A binary halftone image of the Y separation is not significantly conspicuous, thereby having substantially no effect on the graininess of the reproduced color image. In an image area of a relatively low density which often causes rough graininess, the K separation does not exist, thereby not affecting the rough graininess of the reproduced color image. Positional adjustment of ink spots of the M and C separations is thus required to improve the graininess of the reproduced color image.

FIGS. 26(*a*) through 26(*d*) shows examples of threshold matrices where each bit of threshold data for the C separation is inverted from that of M separation, and vice versa. FIGS. 27(*a*)–27(*d*), 28(*a*)–28(*d*), and 29(*a*)–29(*d*) show the distributions of the lowest two bits $E(0)^2$–$E(3)^2$, the medium two bits $E(0)^1$–$E(3)^1$, and the uppermost two bits $E(0)^0$–$E(3)^0$ of the threshold matrices shown in FIGS. 26(*a*)–26(*d*). Although the threshold matrices for the Y and K separations are prepared to satisfy the above conditions C3, C3-1, and C3-1-1 in this example, it not necessary for them to satisfy these conditions.

Preparation of the threshold matrices for the C separation by inverting every bit of the threshold data for the M separation as shown in FIGS. 26(*a*) through 29(*d*) will improve the graininess in a reproduced color image. Once a threshold matrix is prepared for either one of the M and C separations, a threshold matrix for the other separation can be obtained easily by the bit inversion.

Incidentally, ink spots of the four color separations can be arranged at different positions in a density range of 0 through 25% by allocating at least the uppermost bit pair having the value '0' at different positions in the respective color separations according to the above condition C1. Such characteristics are especially favorable in those output devices that have little misalignment between ink spots in reproduction of color images, that is, in overprinting binary halftone images of the four color separations on a printing sheet. In actual reproduction of a color image, however, significant misalignment between ink spots of the respective color separations is frequently observed. Plate misalignment is generally observed in offset printing, and it is highly probable that the ink spots of the four color inks are shifted from the positions shown in FIG. 25(A) or 25(B).

If the ink spots of the respective color separations are shifted from the positions shown in FIG. 25(A) or 25(B), color shift is observed in a reproduced color image. For example, if ink spots of the C separation (cyan) are shifted downward by one spot from the positions shown in FIG. 25(A), dropouts or blank spots are observed at the positions where the ink spots of the C separations are to exist. The ink spots of the cyan separation are accordingly laid over the ink spots of the other color separations, whereby the resulting color image appears reddish to the naked eyes. In order to prevent such color shift, a threshold matrix is prepared to satisfy the following condition C4 instead of the above condition C1 or C3.

[Condition C4]

The positions of the coefficient $E(0)^{n-1}$ in coefficient matrices $\{E(a)^{n-1}, E(b)^{n-1}, E(c)^{n-1}, E(d)^{n-1}\}$, for every value of n other than n=1, for respective color separations are different from each other, and a value pattern of each coefficient matrix $\{E(a)^0, E(b)^n, E(c)^0, E(d)^n\}$ is determined at random.

FIGS. 30(*a*) through 30(*d*) show examples of threshold matrices prepared according to the condition C4, and FIGS. 31(*a*) through 31(*d*) show the distribution of the uppermost two bits $E(0)^0$ through $E(3)^0$ of the threshold matrices shown in FIGS. 30(*a*) through 30(*d*). The distributions of the lowest two bits $E(0)^2$ through $E(3)^2$ and the medium two bits $E(0)^1$ through $E(3)^1$ are identical with those shown in FIGS. 22(*a*)–22(*d*) and 23(*a*)–23(*d*).

FIGS. 32(A) and 32(B) show distributions of ink spots according to the threshold matrices of FIGS. 30(*a*) through 30(*d*). When the value of image data ID is equal to 16 (density of 25%) as shown in FIG. 32(A), some overlapping of ink spots is observed. In the example of FIG. 32(A), there are dispersed in the 8×8 matrix: blank spots to which no ink is applied; one-color spots to which ink of one color separation is applied; two-color spots to which inks of two color separations are applied; and three-color spots to which inks of three color separations are applied. Color shift is accordingly not conspicuous in the reproduced color image even if the binary halftone images of the respective color separations are misaligned. Since the ink spots of the four color separations are not so much localized, the resulting color image has improved graininess.

According to the threshold matrices of FIGS. 21(*a*) through 21(*d*), ink spots of the Y and M separations and those of the C and K separations overlap completely as shown in FIG. 25(B) when the value of image data ID is equal to 32. In the threshold matrices of FIGS. 30(*a*) through 30(*d*), on the other hand, ink spots of the color separations do not always overlap as shown in FIG. 32(B) even when the value of image data ID is equal to 32. This means that the above condition C4 effectively prevents the color shift due to misalignment over a wide range of image data ID.

I. Apparatus Structure

FIG. 33 is a block diagram showing the structure of an image recording apparatus which applies different offsets to a threshold memory for respective color separations to obtain the threshold matrices as shown in FIGS. 11(*a*)–11(*d*). The image recording apparatus comprises an image memory 20 for storing multi-tone image data ID, a threshold matrix memory 30 for storing an L1×L2 threshold matrix, a comparator 40 for comparing the multi-tone image data ID with threshold data TD to generate a binary recording signal RS, and an output unit 50 for recording a binary halftone image or a binary image in response to the recording signal RS. The image recording apparatus is further provided with clock generators 21 and 22, frequency dividers 23 and 24, and address counters 25 and 26, which constitute a circuit of generating reading-address for the image memory 20. The image recording apparatus is also provided with offset address memories 31 and 32 and ring counters 33 and 34, which constitute a circuit of generating writing-address for the threshold matrix memory 30. The image memory 20 and the offset address memories 31 and 32 receive a color separation signal Sc which indicates one of plural color separations and is output from a controller like a CPU (not shown).

The primary-scanning clock generator 21 generates a primary-scanning reference clock signal RCLy having a period corresponding to one spot of the recording signal RS, and the secondary-scanning clock generator 22 generates a secondary-scanning reference clock signal RCLX having a period corresponding to one primary scanning line of the recording signal RS.

When a scanning start signal ST is given, the ring counters 33 and 34 are preset by offset address data supplied from the offset address memories 31 and 32, respectively. Both of the offset address memories 31 and 32 store different offset address data for four color separations and output the four different offset addresses according to the 2-bit color separation signal Sc. The offset addresses of the respective color separations are, for examples, OY, OM, OC, and OK shown in FIGS. 11(*a*) through 11(*d*).

The ring counter 33 is a L2-shift ring counter for counting the number of pulses of the primary-scanning reference clock signal RCLy from the preset value which is given as the offset address data OFy from the primary-scanning offset address memory 31. The ring counter 34 is a L1-shift ring counter for counting the number of pulses of the secondary-scanning reference clock signal RCLX from the preset value which is given as the offset address data OFx from the secondary-scanning offset address memory 32. Outputs from the ring counters 33 and 34 are supplied to the threshold matrix memory 30 as a primary-scanning address and a secondary-scanning address, respectively. Threshold data specified by the addresses are read out from the threshold matrix memory 30 accordingly. The threshold matrix memory 30 stores only one block of threshold matrix, for example, a block defined as '256×256' in FIG. 11(*a*).

Addresses for the image memory 20 are generated in the following manner. The frequency dividers 23 and 24 respectively divide the frequencies of the primary-scanning reference clock signal RCLy and the secondary-scanning reference clock signal RCLX by M, to thereby generate clock signals CLy and CLx, which are supplied to the address counters 25 and 26, respectively. The address counters 25 and 26 count the number of pulses of the clocks CLy and CLx, respectively, and output the counts as address data ADy and ADx. The division factors of the frequency dividers 23 and 24 are determined from the number My of threshold data corresponding to one pixel of the image data ID in the primary scanning direction and the number Mx in the secondary scanning direction. That is, the division factors of the frequency dividers 23 and 24 are set equal to 1/Mx and 1/My, respectively. If one pixel of image data corresponds to M×M threshold data area, for example, the division factor is equal to 1/M for both of the frequency dividers 23 and 24.

The threshold data TD are read out from the threshold matrix memory 30 according to the addresses given by the ring counters 33 and 34, and subsequently compared with the multi-tone image data ID by the comparator 40. The comparator 40 generates the recording signal RS indicative of ON/OFF of a light beam at each spots based on the results of comparison and supplies the recording signal RS to the output unit 50. The output unit 50, which is a recording scanner for reproduction, for example, records binary halftone images of the respective color separations on a recording medium such as a photosensitive film. The binary halftone images of the respective color separations thus prepared do not have any conspicuous regular patterns, and a color image obtained by overprinting these binary halftone images accordingly have no interference patterns like a moire or Rosetta pattern.

FIG. 34 is a block diagram showing the structure of an image recording apparatus which has L1×L2 threshold matrices separately prepared for the respective color separations. The image recording apparatus comprises a threshold matrix memory 28 and a selector 29 in place of the threshold matrix memory 30 in the apparatus of FIG. 33, and the offset address memories 31 and 32 are omitted. The threshold matrix memory 28 stores L1×L2 threshold matrices for the four color separations Y, M, C, and K. Four threshold data for the respective color separations are read out from the threshold matrix memory 28 according to the addresses supplied from the counters 33 and 34. The selector 29 selects one of the four threshold data TD for the four color separations of Y, M, C, and K according to the color separation signal Sc, and supplies the selected threshold data TD to the comparator 40.

Figure 35:
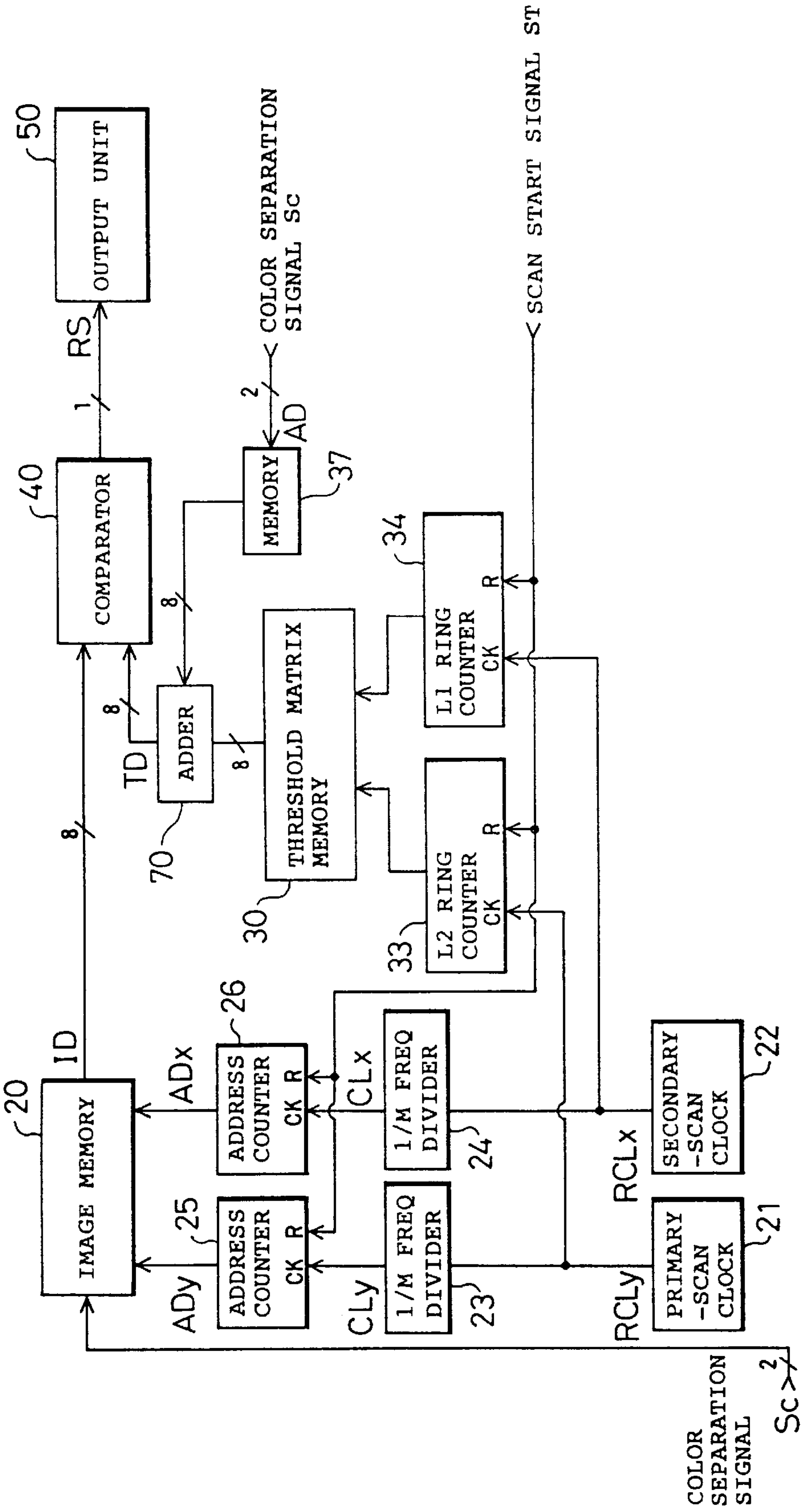
FIG. 35 is a block diagram showing structure of another image recording apparatus having a circuit of adding different values specified for the respective color components to threshold data.

FIG. 35 is a block diagram showing the structure of another image recording apparatus including a circuit for adding different values to threshold data for respective color separations. The apparatus of FIG. 35 includes an adder 70 and a memory 37 in addition to the elements of the apparatus of FIG. 33, and the offset address memories 31 and 32 are omitted. The memory 37 stores four different factors of addition according to the address indicated by the 2-bit color separation signal Sc. The adder 70 adds the factor read out from the memory 37 to the threshold data TD supplied from the threshold matrix memory 30, to generate new threshold data. In the example of FIG. 35, only the lower eight bits are effective in the output of the adder 70. Alternatively, addition may be executed for each bit pair on condition that a carry and a borrow of each bit pair are neglected.

The addition factors for the respective color separations stored in the memory 37 can be selected at random from the values of 0 through ($M^2$−1). The addition factors ranging from $2^{2(N-1)}$ through $3\times2^{2(N-1)}$ are preferable. The preferable difference between the addition factors of the respective color separations is from $2^{2(N-1)}$ through $2\times2^{2(N-1)}$. Such difference effectively prevents ink spots of the respective color separations from overlapping one another.

As described previously, when multi-tone image data are 2N-bit digital data where N is an integer satisfying 2N=M, threshold data in the threshold matrix are preferably set in a range of 0 through ($M^2$−2), but without ($M^2$−1), for reproduction of all the tone levels of the multi-tone image data. Simple addition operation by the adder 70 in the apparatus of FIG. 35 may, however, make a threshold data equal to ($M^2$−1). In order to prevent the threshold data from becoming equal to ($M^2$−1), the adder 70 has a function of determining whether the result of addition expressed as 2N-bit data has a carry, and subtracting one from the result if the result has not caused a carry.

FIG. 36 shows an example of the results by the adder 70. In this example, five is added to a 4×4 threshold matrix shown in FIG. 36(A). Simple addition of the value '5' provides new threshold data shown in FIG. 36(B). Numerals circled in FIG. 36(B) represent the values which have not caused carries in 4-bit binary notation. While the preferable range for threshold data in the 4×4 threshold matrix is 0 through 14, the value 15 exists as seen in FIG. 36(B). The adder 70 therefore subtracts one from each threshold data which has not caused a carry and outputs the result as shown in FIG. 36(C). This operation restricts the threshold data to the preferable range of 0 through 14.

Figure 37:
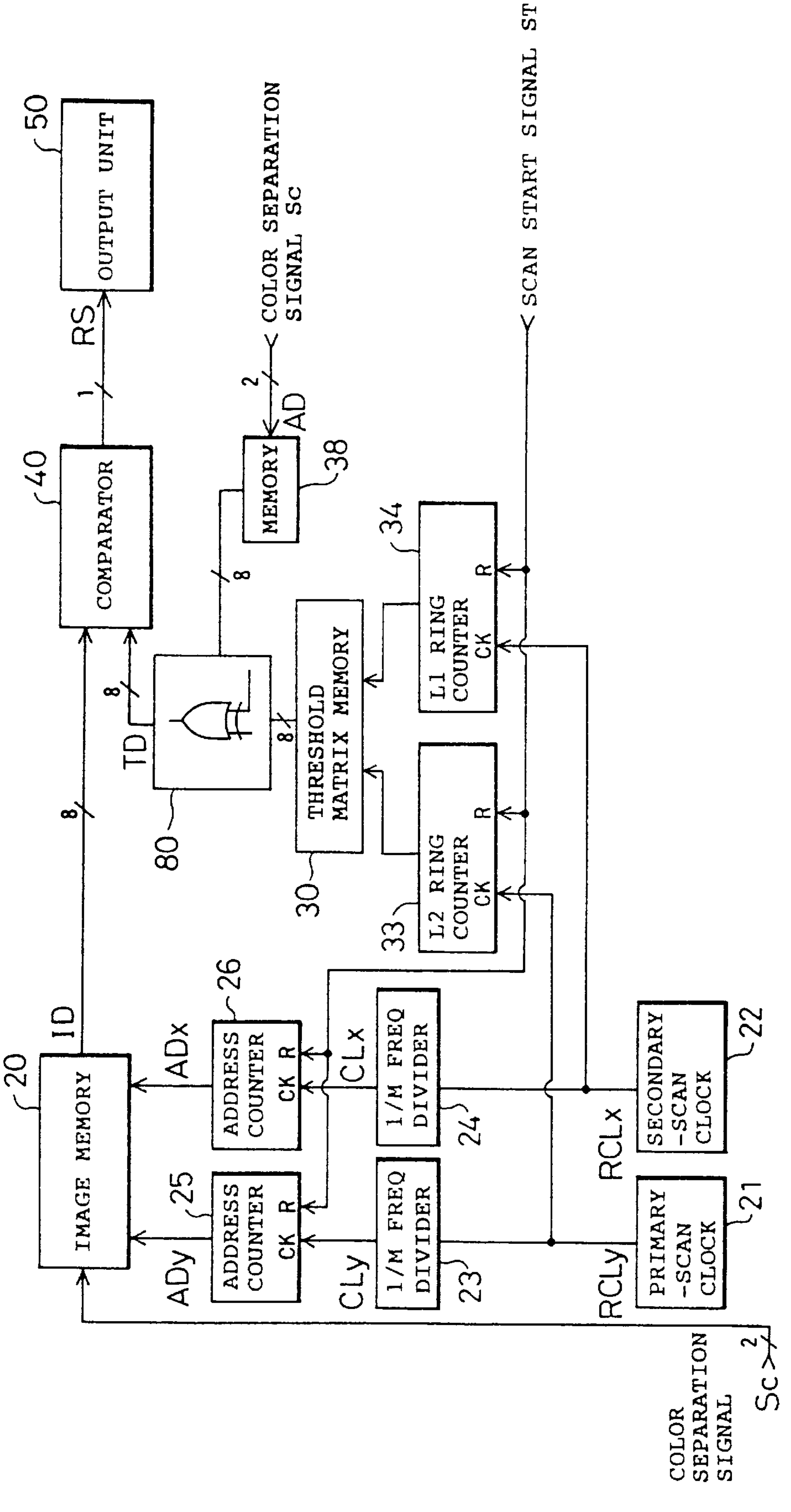
FIG. 37 is a block diagram showing structure of still another image recording apparatus having a circuit for inverting specific bits of threshold data according to the color component.

FIG. 37 is a block diagram showing the structure of another image recording apparatus including a circuit for inverting a specific bit of threshold data according to respective color separations. The difference from the apparatus of FIG. 35 is that the adder 70 and the memory 37 are replaced by a bit inversion unit 80 and a memory 38. The bit inversion unit 80 includes eight EXOR circuits. One input terminal of each EXOR circuit is supplied with each bit of the 8-bit threshold data read out from the threshold matrix memory 30, while the other input terminal is supplied with each bit of an 8-bit addition factor output from the memory 38. If a bit of the output from the memory 38 is at H level, the corresponding bit of the threshold data is inverted by the bit inversion unit 80. If a bit of the output from the memory 38 is at L level, on the contrary, the corresponding bit of the threshold data passes through the bit inversion unit 80. In other words, each bit of the output of the memory 38 is a factor to be used in logical operation on the threshold data. Consequently, specific bits of threshold data are inverted according to the levels of the bits of the output from the memory 38. Such bit inversion will produce a variety of value patterns for a specific bit pair from only one value pattern as shown in FIG. 20(A) and 20(B) described before.

FIGS. 38(*a*) through 38(*d*) show examples of threshold matrices obtained by inverting the uppermost bit pair of threshold data in a base 8×8 threshold matrix. FIG. 38(*a*) shows the distribution of the uppermost two bits of the base threshold matrix both in quaternary notation and binary notation. FIG. 38(*b*) shows a pattern obtained by inverting the uppermost bit of the base threshold matrix, FIG. 38(*c*) a pattern obtained by inverting the second uppermost bit, and FIG. 38(*d*) a pattern obtained by inverting the uppermost two bits. The distributions shown in FIGS. 38(*a*) through 38(*d*) are identical with those shown in FIGS. 15(*e*) through 15(*h*). The threshold matrices of the respective color separations shown in FIGS. 15(*a*) through 15(*d*) can thus be obtained by inverting some of the uppermost two bits as shown in FIGS. 38(*a*) through 38(*d*).

A set of the adder 70 and the memory 37 shown in FIG. 35 and a set of the bit inversion unit 80 and the memory 38 shown in FIG. 37 can be provided in series or in parallel in one apparatus. In such apparatus, the selective execution of the addition and the bit inversion for the respective color separations will produce a number of different threshold matrices.

J. Adjustment of Threshold Data Based on Position

The greater L1×L2 threshold matrix is preferable in terms of preventing a specific pattern due to repeated application of one threshold matrix from being observed in a binary halftone image whereas the smaller L1×L2 threshold matrix is preferable in terms of saving the memory capacity. These contradictory requirements are fulfilled by reducing the size of the L1×L2 threshold matrix stored in the memory and adjusting threshold data read out of the memory according to coordinates or position on the image plane.

The following three methods are available for the adjustment of threshold data read out of the memory according to the position on the image plane:

(a) assigning different offset addresses to the memory according to the position in the image plane;

(b) executing an arithmetic operation (addition, subtraction, or the like) for threshold data read out from the memory with different factors according to the position in the image plane, and using the results of the arithmetic operation as new threshold data; or (c) inverting different bits of threshold data read out from the memory according to the position in the image plane.

FIGS. 39(*a*) and 39(*b*) show a threshold data adjustment process according to the above method (a). A shaded portion of FIG. 39(*a*) shows a 16×256 threshold matrix consisting of sixteen 16×16 threshold matrices arranged in the primary scanning direction (y direction). The sixteen 16×16 threshold matrices included in the 16×256 threshold matrix have different distributions of threshold data from one another. A one-dimensional array of offset address (Y1,Y2, . . . Ym) for the primary scanning direction are set at random along the secondary scanning direction X as illustrated in FIG. 39(*b*). This effectively prevents a specific pattern characteristic of the 16×256 threshold matrix from being observed in a resultant binary halftone image. A 256×256 threshold matrix can be simulated by setting the number of offset addresses in the one-dimensional array (Y1,Y2, . . . Ym) equal to 16.

When one threshold value is expressed by eight-bit (=one-byte) data, the memory capacity required is 64 kilobytes for a 256×256 threshold matrix and 4 kilobytes for a 16×256 threshold matrix. The use of the 16×256 threshold matrix significantly saves the memory capacity compared with the 256×256 threshold matrix.

In reproduction of a color image by the method shown in FIGS. 39(*a*) and 39(*b*), different one-dimensional array of offset address (Y1,Y2, . . . Ym) should be assigned to the respective color separations. It is preferable that at least the offset addresses for the respective color separations which are applied to the same scanning line in the image plane are made different from one another. This prevents binary halftone images of plural color separations from completely overlapping one another, thus effectively preventing the color shift.

K. Apparatus for Adjusting Threshold Data Based on Position

Figure 40:
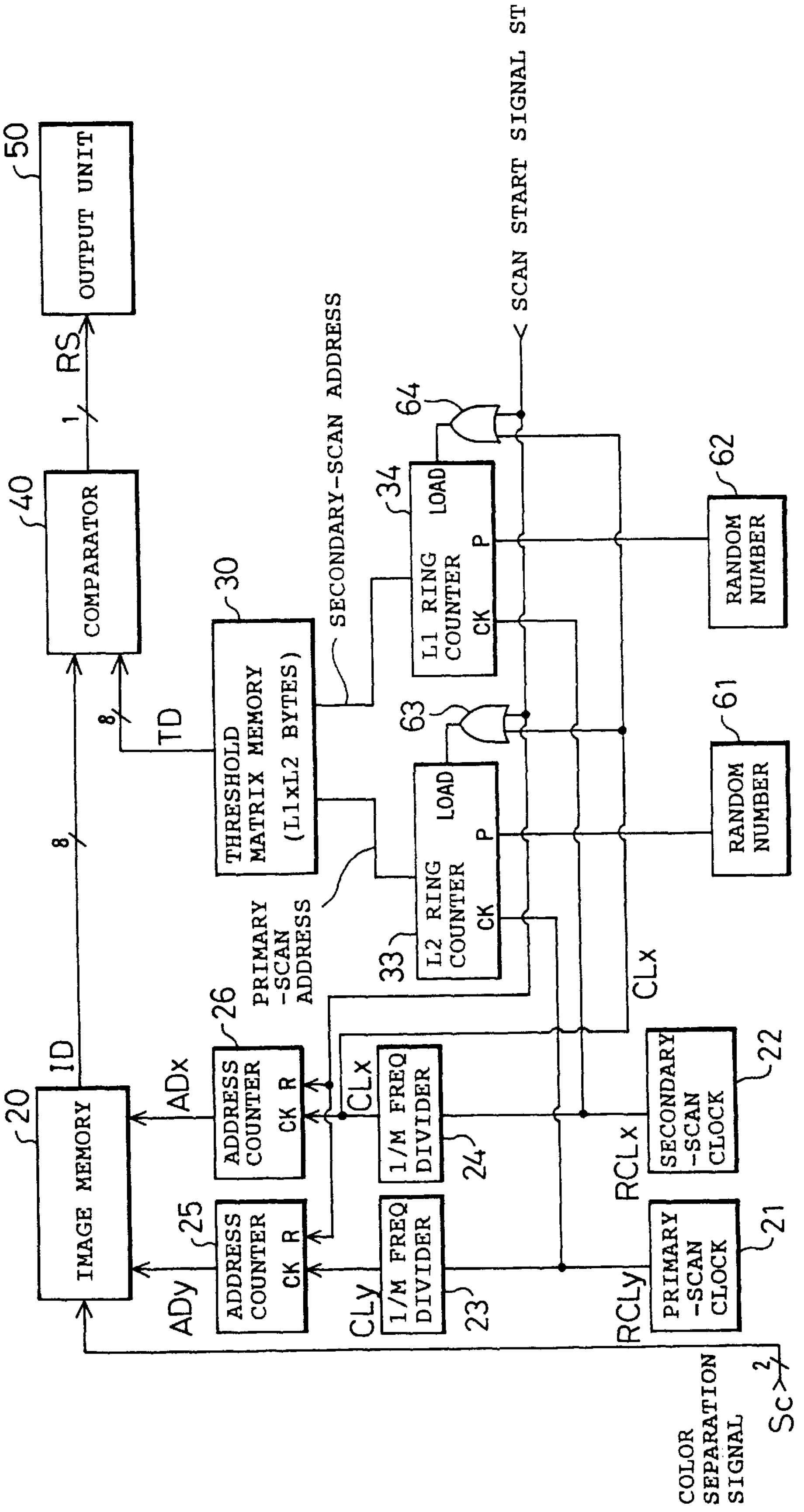
FIG. 40 is a block diagram showing the structure of an image recording apparatus with a circuit of varying the offset addresses of the threshold matrix memory 30 according to a position in an image.

FIG. 40 is a block diagram showing the structure of an image recording apparatus with a circuit of varying the offset addresses of the threshold matrix memory according position in the image plane. The difference from the apparatus of FIG. 33 is that the apparatus of FIG. 40 has random number generators 61 and 62 in place of the two offset address memories 31 and 32 and that logical sums of the scanning start signal ST and the secondary-scanning clock CLx obtained by OR circuits 63 and 64 are input into load terminals of the ring counters 31 and 32, respectively.

Random numbers generated by the random number generators 61 and 62 are preset in the ring counters 33 and 34 as address offsets in synchronism with the secondary-scanning clock CLx. Every time when binarization of the image data ID is completed for one primary scanning line, that is, at every cycle of secondary scanning of the image data ID, the random numbers are supplied to the threshold matrix memory 30 as offsets of the primary-scanning address and the secondary-scanning address. Namely, threshold data are read out from the threshold matrix memory 30 according to the offset addresses which varies with the secondary-scanning coordinate in the image.

Figure 41:
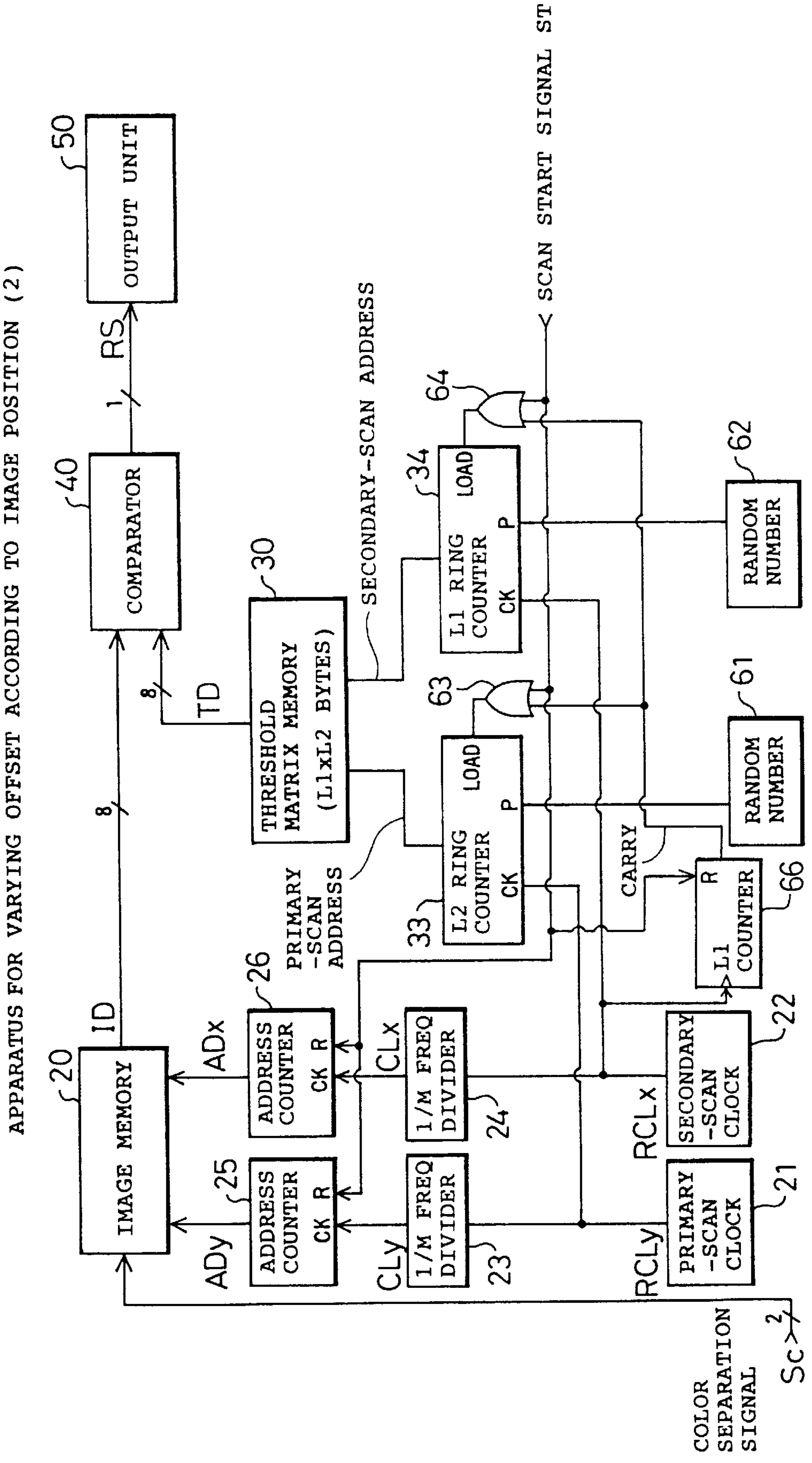
FIG. 41 is a block diagram showing another structure of an image recording apparatus with a circuit of varying the offset addresses of the threshold matrix memory 30 according to a position in an image.

FIG. 41 is a block diagram showing another structure of an image recording apparatus with a circuit of varying the offset addresses of the threshold matrix memory 30 according to the position in the image plane. The difference from the apparatus of FIG. 40 is that the apparatus of FIG. 41 further includes an L1-shift counter 66 for counting the number of pulses of the secondary-scanning reference clock signal RCLx and supplying a carry signal to the OR circuits 63 and 64. Accordingly, the offset address is changed when the L1×L2 threshold matrix stored in the threshold matrix memory 30 is used by a width L1 in the secondary scanning direction. The distribution of offset address data shown in FIG. 39(*b*) is realized by omitting the random number generator 62 functioning as an offset address generator in the secondary scanning direction from the apparatus of FIG. 41 and setting an initial value of the ring counter 34 equal to zero.

The main difference between the apparatuses of FIGS. 40 and 41 is the timing when the random numbers are preset to the ring counters 33 and 34 as offset address data. The offset address data can be loaded to the ring counters 33 and 34 at timings other than the examples of FIGS. 40 and 41, for example, at arbitrary or random timings.

Figure 42:
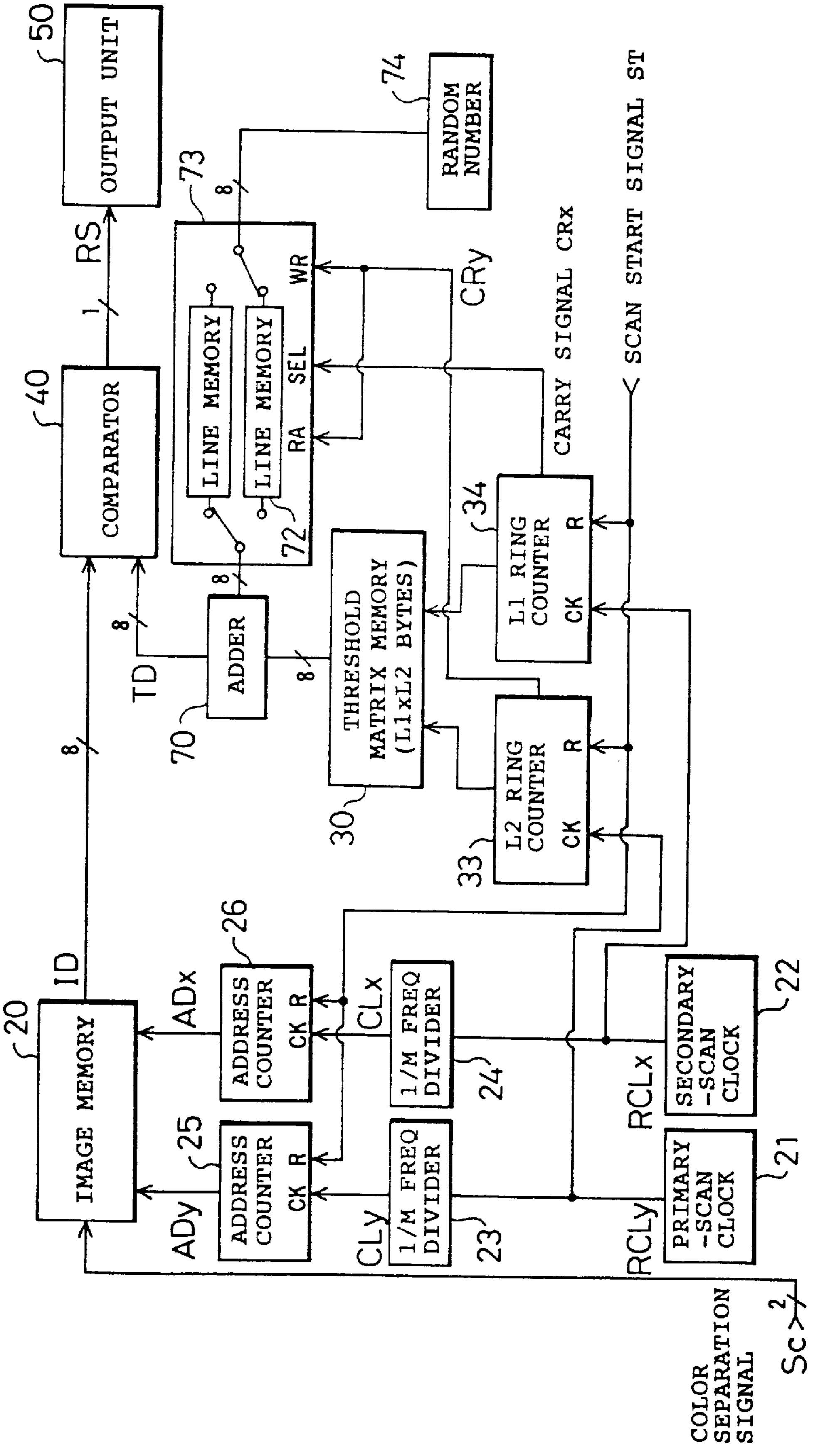
FIG. 42 is a block diagram showing an image recording apparatus having a function for adding a value corresponding to the coordinates to threshold data.

FIG. 42 is a block diagram showing an image recording apparatus having a function for adding a value according to the position in the image plane to threshold data. The difference from the apparatus of FIG. 33 is that the apparatus of FIG. 42 does not have the two offset address memories 31 and 32 shown in FIG. 33 but includes an adder 70, a line memory unit 73 including two line memories 71 and 72, and a random number generator 74.

Random numbers generated by the random number generator 74 are written into one of the line memories of the line memory unit 73 in synchronism with a carry signal CRy output from the L2-shift ring counter 33. The other line memory of the line memory unit 73 successively outputs random numbers stored in response to the carry signal CRy of the L2-shift ring counter 33, and supplies the random numbers to the adder 70. The adder 70 adds a random number supplied from the line memory unit 73 to each threshold data read out from the threshold matrix memory 30 and supplies the result of addition to the comparator 40. The two line memories 71 and 72 are switched alternately and complementary in synchronism with a carry signal CRx of the ring counter 34. One of the line memories (for example, 71) of the line memory unit 73 successively outputs 'RAy' pieces of random numbers in synchronism with the carry signal CRy. The output of the same random number sequence is repeated (L1-1) times. After the repeated outputs, the line memories 72 and 72 are switched in a complementary manner in response to the carry signal CRx. The other line memory (for example, 72) then successively outputs 'RAy' pieces of random numbers in synchronism with the carry signal CRy. The output of the same random number sequence is also repeated (L1-1) times. The adder 70 executes the addition while neglecting non-significant bits of threshold data. If threshold data having eight significant bits is equal to 250 and the addition factor is equal to 9, for example, the resulting threshold data TD of the addition is equal to 3 ($=250+9-2^8$).

The apparatus of FIG. 42 has the following advantages:

(1) Since different factors according to the positions in the image plane are added to threshold data, a variety of threshold data patterns, which are different from that stored in the threshold matrix memory 30, are generated for the respective positions in the image plane.

(2) Each of the two line memories 71 and 72 stores 'RAy' pieces of random numbers, where the number 'RAy' corresponds to one primary scanning line of image data ID. 'RAy' is equal to the value obtained by dividing the number of pixels of an image represented by the recording signal RS in the primary scanning direction by L2. The line memories 71 and 72 are switched in a complementary manner by every width L1 of the threshold matrix in the secondary scanning direction. Accordingly, the same random number sequence is used in each rectangular block of the L1×L2 threshold matrix. This prevents partial use of the threshold matrix but allows threshold data to be read out of the whole threshold matrix, thus reproducing precise tone levels in the resulting binary halftone image.

If an M×M threshold matrix is stored in the threshold matrix memory 30, the L2-shift and L1-shift ring counters 33 and 34 are M-shift ring counters. A secondary-scanning clock signal CLx is used as a signal for instructing a timing of switching the two line memories 71 and 72 while a primary-scanning clock signal CLy is used as a clock signal input as an address to the line memory unit 73. In this case, the addition factor is varied for every pixel of the image data ID.

As described previously, when multi-tone image data are 2N-bit digital data, where N is an integer satisfying $2^N=M$, threshold data in the threshold matrix are preferably set in a range of 0 through ($M^2-2$) for reproduction of all tone levels of the multi-tone image data. Simple addition by the adder 70 in the apparatus of FIG. 42 may, however, result in the threshold value equal to ($M^2-1$). The adder 70 accordingly has the function to maintain the threshold data in the range of 0 through ($M^2-1$), which is described before along with FIGS. 36(A)–36(C).

When threshold data in a threshold matrix are set in a range of 1 through ($M^2-1$) as described previously, the adder 70 first adds the addition factor to each threshold data, and then adds one to the resulting threshold data whose uppermost bit has caused a carry, thereby maintaining the threshold data in the range of 1 through ($M^2-1$).

Figure 43:
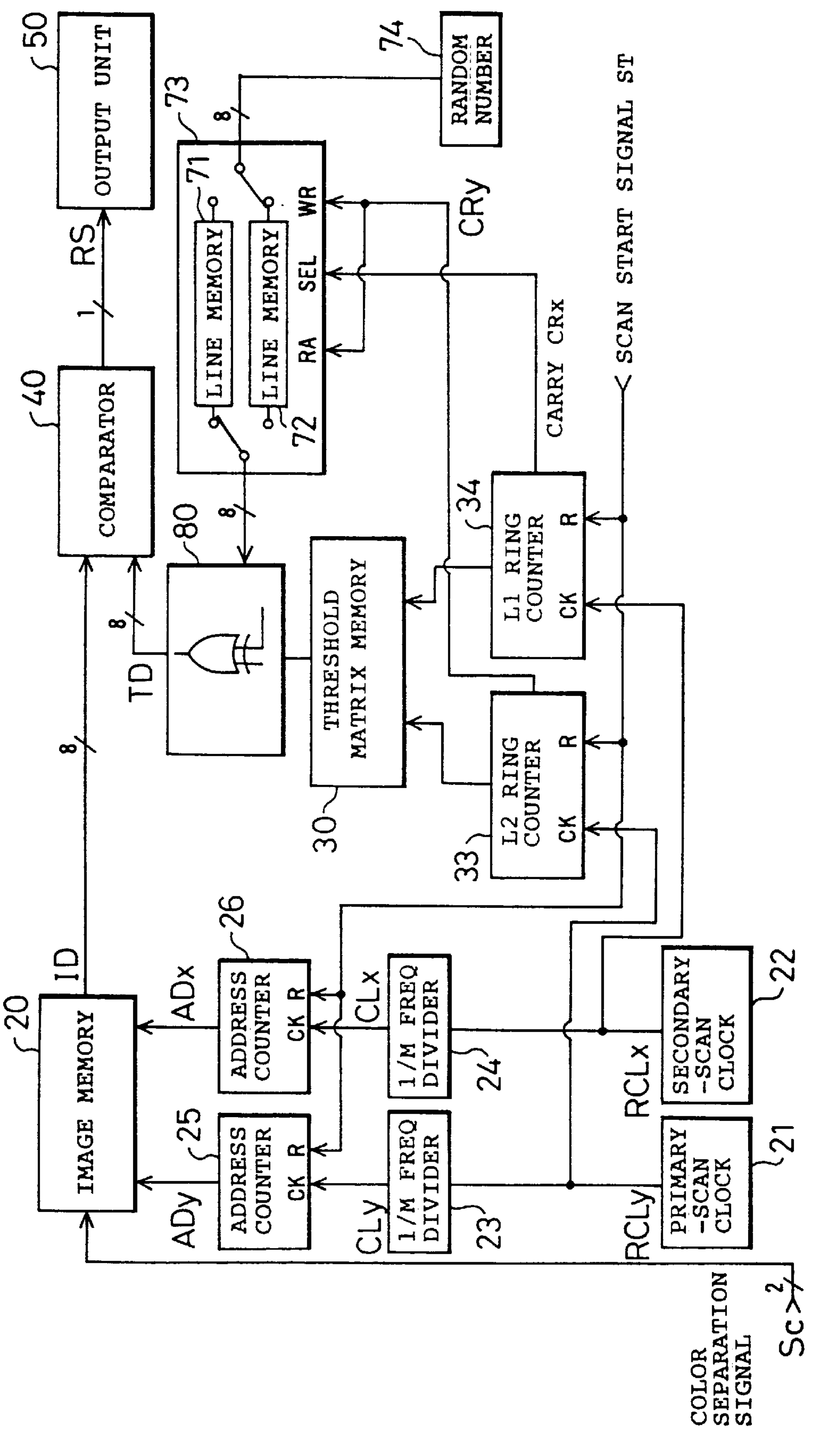
FIG. 43 is a block diagram showing the structure of an image recording apparatus having a function of inverting specific bits of threshold data according to a position in an image.

FIG. 43 is a block diagram showing the structure of an image recording apparatus having a function of inverting specific bits of threshold data according to the position in the image plane. The difference from the apparatus of FIG. 42 is that the adder 70 is replaced by a bit inversion unit 80. The bit inversion unit 80 includes eight EXOR circuits. One input terminal of each EXOR circuit receives each bit of 8-bit threshold data read out from the threshold matrix memory 30, and the other input terminal receives each bit of 8-bit data output from the line memory unit 73. The output of the line memory unit 73 is used as a factor of a logical operation on the threshold data. The bit inversion process inverts some bits of threshold data according to the levels of the respective bits of the output from the line memory unit 73.

FIGS. 44(A) through 44(F) show several examples of threshold matrices obtained by inverting some bits of a base threshold data. The apparatus of FIG. 43 inverts some bits of threshold data according to the position in the image plane, thereby implementing binarization of the image data using random threshold data according to the position in the image plane.

Incidentally, in place of the square matrix of a dimension of M, where M is an integer equal to $2^N$, in the above embodiment, a rectangular M1×M2 threshold matrix, where M1 and M2 are even numbers, can be used in the present invention. In this case, it is also preferable to randomly select the arrangement of threshold data in each 2×2 sub-matrix of the M1×M2 threshold matrix from eight diagonal patterns.

The minimum sub-matrix of a threshold matrix can be a square matrix having a dimension of any prime number other than 2, for example, 3×3 or 5×5. In this case, one threshold matrix can be also divided into a plurality of minimum sub-matrices, and a difference between a plurality of threshold data in each sub-matrix is fixed to a specific value. In the 8×8 threshold matrix TM shown in FIGS. 5 and 6, for example, the minimum sub-matrix is 2×2 and the difference between the threshold data in each sub-matrix is equal to 16.

L. Modified Method of Utilizing Threshold Matrix

The threshold matrices described above are well adopted to an image screening method called 'FM Screening', or Frequency Modulation Screening, which expresses the density of a multi-tone image by means of frequency modulation. In the FM Screening, spots or dots of inks have a fixed size, and the frequency of appearance of the dots is varied according to the density of the multi-tone image. Since the FM Screening dispersively arranges smaller dots than the conventional halftone-dot method, an original multi-tone image is reproduced at higher resolution. The FM Screening has no periodicity in the arrangement of the dots, thus effectively preventing interference patterns such as a moire and Rosetta patterns in multi-color printing.

The FM Screening executes binarization of each color separation image by repeatedly applying one threshold matrix in an image plane and comparing threshold data read out of the threshold matrix with image data. This process is identical with the conventional halftone-dot screening. Whereas the threshold matrix must be prepared to have a specific regular arrangement of the dots in the conventional halftone-dot screening, the FM Screening has no such restrictions. The FM Screening can accordingly use a relatively small threshold matrix, thus reducing the memory capacity for storing the threshold matrix.

If an original image is binarized by simply repeating a small threshold matrix, however, the repeated application of the threshold matrix often gives a resulting binary image, or a halftone image some uneven or stripe patterns which do not exist in the original image. One method to solve this problem is to use various offsets to the threshold matrix as described before. FIG. 45(A) shows an example of a threshold matrix TM used in FM Screening, and FIG. 45(B) conceptually shows an exemplified binary image when the threshold matrix TM is repeatedly applied with different offsets Y1, Y2, Y3, . . . assigned to the respective secondary scanning positions x. A broken line in FIG. 45(A) shows a stripe pattern appearing in an image area which has uniform density. As shown in FIG. 45(B), even if the different offsets are assigned to the respective secondary scanning positions, the stripe pattern appearing in each threshold matrix area may be connected to one another to form relatively long lines, which are rather conspicuous to the naked eyes. These conspicuous patterns may appear even if the offsets are given at random.

The relatively small threshold matrix used in the FM Screening often results in conspicuous patterns, which do not exist in the original image but caused by the threshold matrix, thereby deteriorating the image quality.

In an aspect of the present invention, the method of utilizing a threshold matrix is modified as described below, in order to make characteristic patterns caused by the threshold matrix sufficiently inconspicuous in a binary halftone image even when a relatively small threshold matrix is used in FM Screening.

FIGS. 46(A) through 46(E) conceptually show a modified method of using a threshold matrix. An original L1×L2 threshold matrix TM shown in FIG. 46(A) is prepared, where a letter 'F' indicating the direction of the threshold matrix TM is written in the threshold matrix area for convenience. A broken line drawn in the threshold matrix TM represents a stripe pattern appearing in an image area having a substantially uniform density. The actual threshold matrix is a rectangular array of threshold data arranged in L1 columns and L2 rows.

A threshold matrix of FIG. 46(B) is an inside-out of the original threshold matrix TM of FIG. 46(A); that of FIG. 46(C) is an upside-down of the original threshold matrix TM; and that of FIG. 46(D) is an inside-out and upside-down of the original threshold matrix TM. FIG. 46(E) shows an exemplified pattern appearing in a binary image when the four threshold matrices of FIGS. 46(A) through 46(D) are arranged at random on the image plane. Comparison between FIG. 45(B) and FIG. 46(E) shows that the random arrangement of the threshold matrices of FIGS. 46(A) through 46(D) effectively prevents stripe patterns appearing in the binary image from being connected with each other to form long lines. While the long stripe patterns of FIG. 45(B) appear rather conspicuous to the naked eyes, the short stripe patterns of FIG. 46(E) are not. The random arrangement of the threshold matrices of FIGS. 46(A) through 46(D) makes the stripe patterns inconspicuous to the naked eyes, thus improving the quality of the binary image, or the binary halftone image, and thereby the quality of a reproduced color image obtained by overprinting binary halftone images of respective color separations one upon another.

Figure 47:
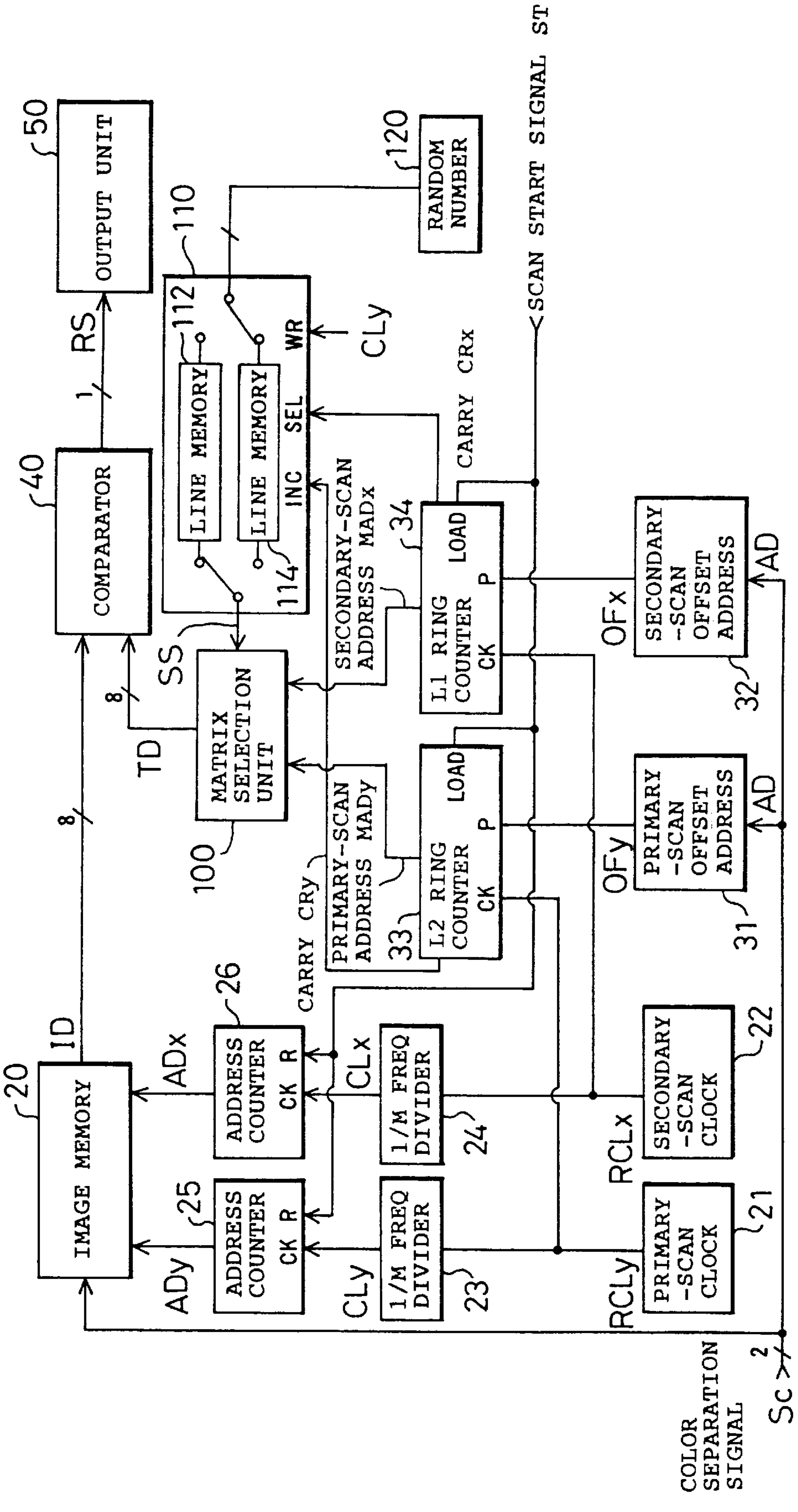
FIG. 47 is a block diagram showing the structure of an image recording apparatus for implementing the method shown in FIGS. 46(A) through 46(E)

FIG. 47 is a block diagram showing the structure of an image recording apparatus, which implements the above modified method. The difference between the apparatus of FIG. 47 and that of FIG. 33 is that the threshold matrix memory 30 in FIG. 33 is replaced by a matrix selection unit 100, a line memory unit 110, and number generator 120. The matrix selection unit 100 selects one of a plurality of threshold matrices and outputting threshold data TD in the selected threshold matrix. The line memory unit 110 has two line memories 112 and 114. The line memory unit 110 and the random number generator 120 acts as a circuit for providing a selection signal SS to the matrix selection unit

100. Random numbers generated by the random number generator 120 are given to and written in one of the two line memories 112 or 114 synchronously with a scanning clock CLy, whereas the random numbers previously stored are successively read out from the other line memory and supplied as the selection signal SS to the matrix selection unit 100. The matrix selection unit 100 stores the four threshold matrices shown in FIGS. 46(A) through 46(D), and selects one of the four threshold matrices in response to the selection signal SS. The reading address of the line memory unit 110 is incremented by a carry signal CRy supplied from the ring counter 33. Every time when binarization is completed over the width L2 of the threshold matrix TM in the primary scanning direction (see FIG. 46(A)), one of the four threshold matrices is selected at random. The two line memories 112 and 114 are switched over each other in an alternate and complementary manner in synchronism with a carry signal CRx supplied from the ring counter 34. Every time when binarization is completed over the width L1 of the threshold matrix TM in the secondary scanning direction (see FIG. 46(A)), the two line memories 112 and 114 are switched over each other and a new selection signal SS is output for another primary scanning line.

Figure 48:
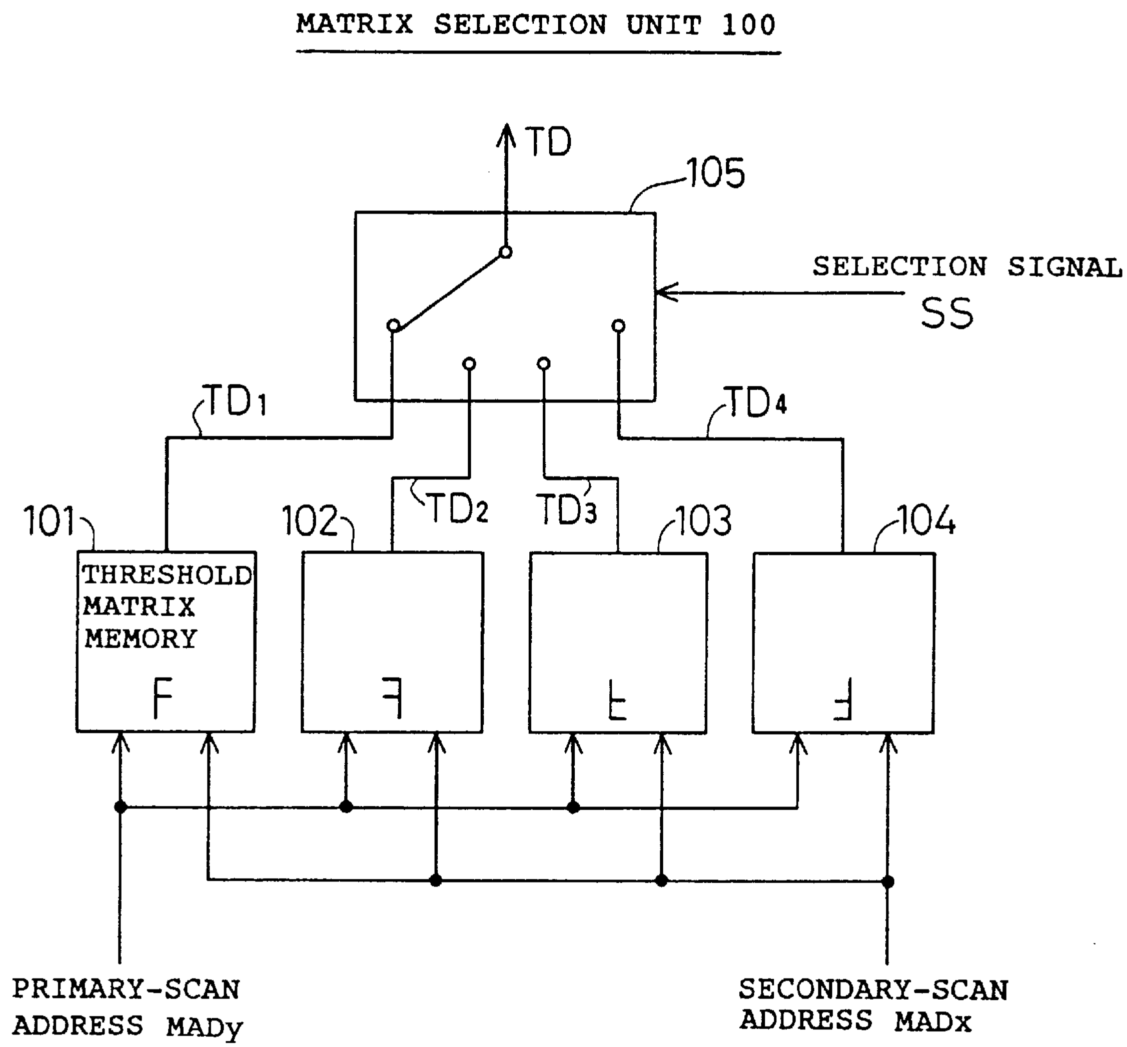
FIG. 48 is a block diagram showing the structure of the matrix selection unit 100.

FIG. 48 is a block diagram showing the structure of the matrix selection unit 100. The matrix selection unit 100 includes four threshold matrix memories 101 through 104 and a selector 105. The four threshold matrix memories 101 through 104 store the threshold matrices of FIGS. 46(A) through 46(D), respectively. The four threshold matrix memories 101 through 104 receive a common primary-scanning address MADy and a common secondary-scanning address MADx supplied from the ring counters 33 and 34. Four threshold data TD1 through TD4 are simultaneously read out from the respective threshold matrix memories 101 through 104 and supplied to the selector 105. The selector 105 selects one of the threshold data TD1 through TD4 in response to the selection signal SS supplied from the line memory unit 110.

The primary-scanning clock generator 21 shown in FIG. 47 generates a primary-scanning reference clock signal RCLY having a period corresponding to one spot of the threshold matrix, whereas the secondary-scanning clock generator 22 generates a secondary-scanning reference clock signal RCLX having a period corresponding to one primary scanning line.

When a scanning start signal ST is given, the ring counters 33 and 34 are preset by offset data supplied from the primary-scanning offset memory 31 and the secondary-scanning offset memory 32. The primary-scanning offset memory 31 and the secondary-scanning offset memory 32 respectively store offset data assigned to the four color separations and output one of the four different offset data in response to the 2-bit color separation signal Sc. A series of offset data {Y1,Y2,Y3 . . . } for one color separation is shown in FIG. 46(E) as an example.

The ring counter 33 is an L2-shift ring counter for counting the number of pulses of the primary-scanning reference clock signal RCLy from the offset data OFy which is supplied from the primary-scanning offset address memory 31 as an initial value. The ring counter 34 is an L1-shift ring counter for counting the number of pulses of the secondary-scanning reference clock signal RCLX from the offset data OFx which is supplied from the secondary-scanning offset address memory 32 as an initial value. Outputs from the ring counters 33 and 34 are given to the threshold matrix memories 101 through 104, as shown in FIG. 48, as the primary-scanning address MADy and the secondary-scanning address MADx, respectively.

Figure 49:
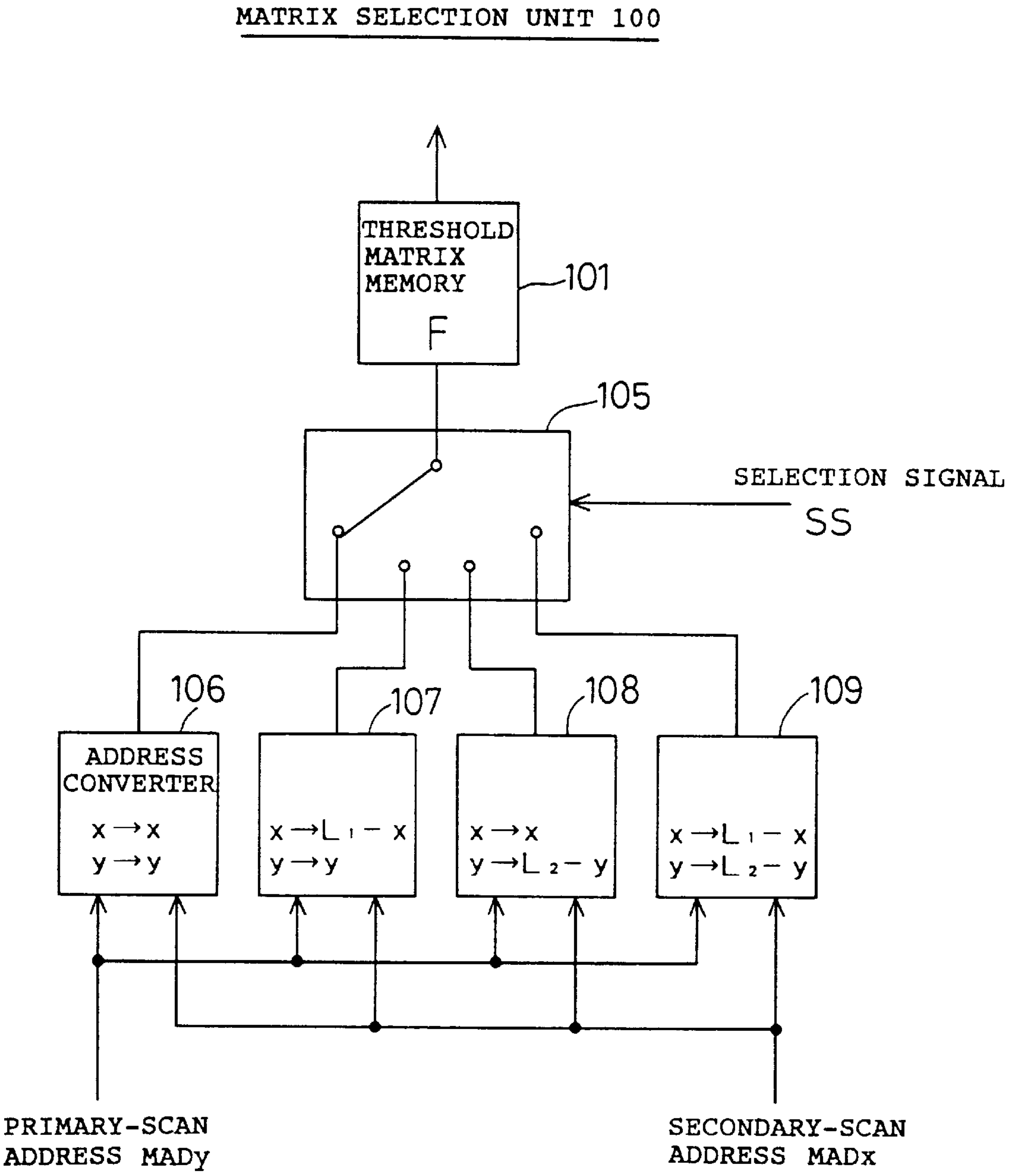
FIG. 49 is a block diagram illustrating another possible structure of the matrix selection unit 100.

FIG. 49 is a block diagram illustrating another structure of the matrix selection unit 100. The matrix selection unit 100 shown in FIG. 49 includes one threshold matrix memory 101, a selector 105, and four address converters 106 through 109. The threshold matrix of FIG. 46(A) is stored in the threshold matrix memory 101. The four address converters 106 through 109 receive a common primary-scanning address MADy and a common secondary-scanning address MADx output from the ring counters 33 and 34.

The first address converter 106 outputs both of the input addresses MADy and MADx themselves. The second address converter 107 outputs a difference (L1-MADx) obtained by subtracting the secondary-scanning address MADx from the maximum value L1 of the secondary-scanning address of the threshold matrix memory 101 while outputting the primary-scanning address MADy unchanged. Reading of the threshold data from the threshold matrix memory 101 with the addresses obtained by the second address converter 107 is equivalent to using the inside-out pattern of the original threshold matrix of FIG. 46(A), which is shown in FIG. 46(B). The third address converter 108 outputs a difference (L2-MADy) obtained by subtracting the primary-scanning address MADy from the maximum value L2 of the primary-scanning address of the threshold matrix memory 101 while outputting the secondary-scanning address MADx unchanged. The addresses output from the third address converter 108 produces the upside-down pattern of the original threshold matrix as shown in FIG. 46(C). The fourth address converter 109 outputs the differences (L2-MADy) and (L1-MADx) as the primary-scanning and the secondary-scanning addresses. The addresses output from the fourth address converter 109 produces the upside-down and inside-out pattern of the original threshold matrix as shown in FIG. 46(D).

If the maximum address L2 of the threshold matrix in the primary scanning direction is identical with a maximum value expressed by the bits of the primary-scanning address MADy (for example, 255 for 8 bits), the operation for determining the difference (L2-MADy) is equivalent to inversion of all the bits of the primary-scanning address MADy. This operation is also applied to the secondary-scanning address MADx.

The addresses generated by the four address converters 106 through 109 are supplied to the selector 105. The selector 105 selects one of the input addresses in response to the selection signal SS given from the line memory unit 110 and outputs the selected address to the threshold matrix memory 101. In FIG. 49, a primary-scanning address line and a secondary-scanning address line connecting each of the address converters 106 through 109 with the selector 105 are shown by one line for the convenience of illustration.

The matrix selection unit 100 of FIG. 49 requires only one threshold matrix memory 101 and thereby reduces the memory capacity. On the other hand, the matrix selection unit 100 of FIG. 48 does not require any address converting operations, thus allowing threshold data to be read out at higher speed than that of FIG. 49.

Incidentally, the color separation signals Sc can be used as the selection signal SS given to the matrix selection unit 100 in place of random numbers read out of the line memory unit 110. Such modified structure allows the selector 105 to select one threshold matrix according to a current color separation under binarization.

A plurality of threshold matrices independent of one another may be prepared and utilized for the above modified method. For example, four threshold matrices which are independent of one another may be prepared and stored in the four threshold matrix memories 101 through 104 shown in FIG. 48.

Figure 50A:
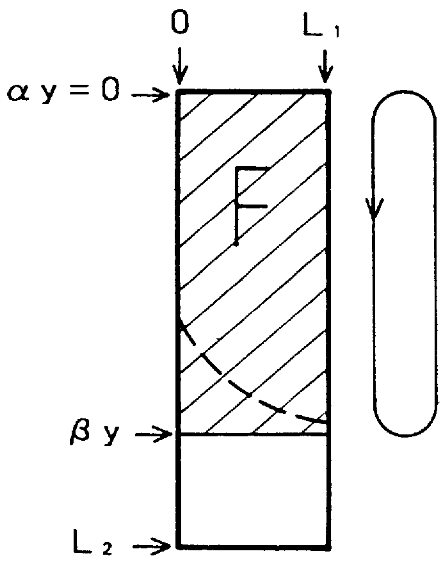
FIGS. 50(A) through 50(D) conceptually show another method of applying a threshold matrix according to the present invention.
Figure 50B:
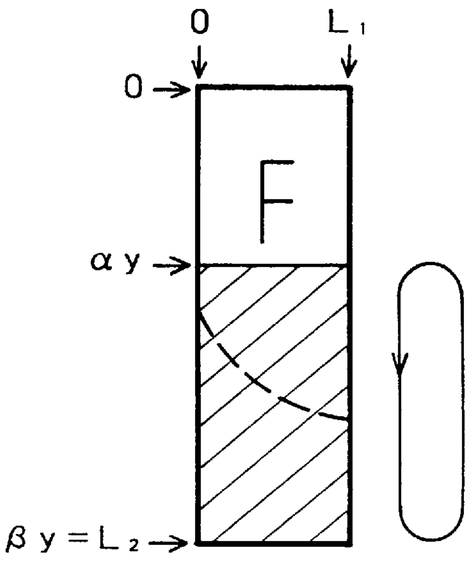
Figure 50C:
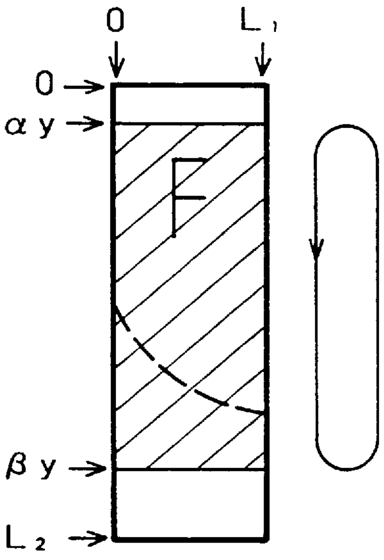
Figure 50D:
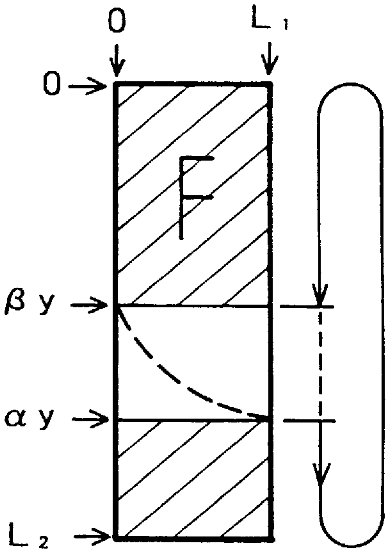

FIGS. 50(A) through 50(D) show various methods of utilizing part of the L1×L2 threshold matrix of FIG. 46(A) in the primary scanning direction. In the drawings of FIGS. 50(A) through 50(D), $\alpha_y$ and $\beta_y$ respectively denote an initial value and a terminal value of the primary-scanning address MADy, and they can take any values in the range of 0 through L2, provided that $\alpha_y$ and $\beta_y$ are different from each other. Portions filled with slant lines in FIGS. 50(A) through 50(D) represent ranges from which threshold data are read out. When $\alpha_y<\beta_y$ as shown in FIGS. 50(A) through 50(C), threshold data are read out according to the primary-scanning address MADy in the range between $\alpha_y$ and $\beta_y$. When $\beta_y<\alpha_y$ as shown in FIG. 50(D), on the contrary, threshold data are read out while the primary-scanning address MADy starts from the initial value $\alpha_y$, returns to zero after reaching the maximum value L2, and goes to the terminal value $\beta_y$. Namely, in FIG. 50(D), threshold data are not read out in the range from the terminal value $\beta_y$ to the initial value $\alpha_y$. The method of FIGS. 50(A)–50(D) substantially produce a plurality of threshold matrices from only one threshold matrix.

Figure 51:
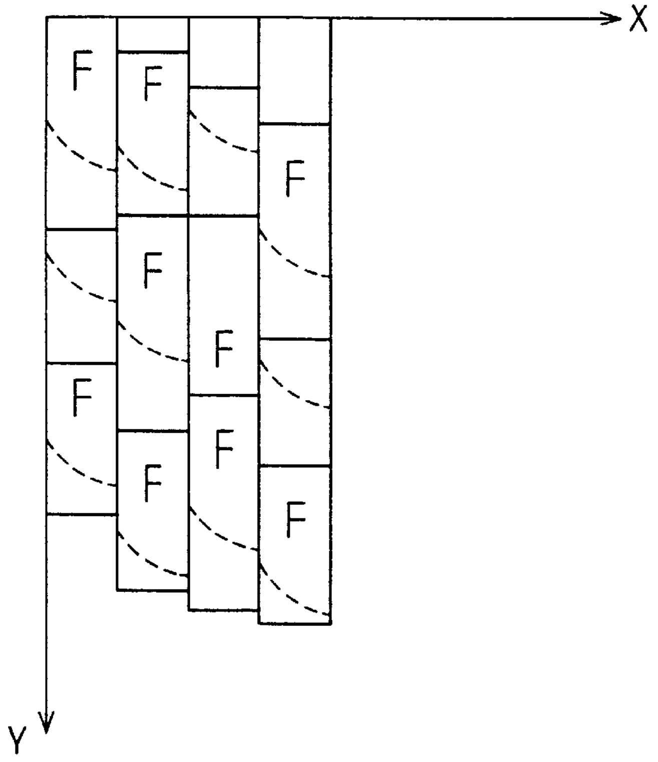
FIG. 51 shows an exemplified pattern appearing in a binary image when the five threshold matrices of FIGS. 46(A) and FIGS. 50(A) through 50(D) are arranged at random.

FIG. 51 shows an exemplified pattern appearing in a binary image when the five threshold matrices of FIG. 46(A) and FIGS. 50(A) through 50(D) are arranged at random on the image plane. Comparison between FIG. 45(B) and FIG. 51 shows that the random arrangement of the five threshold matrices effectively prevents stripe patterns appearing in the binary image from being connected with each other to form long lines.

Figure 52:
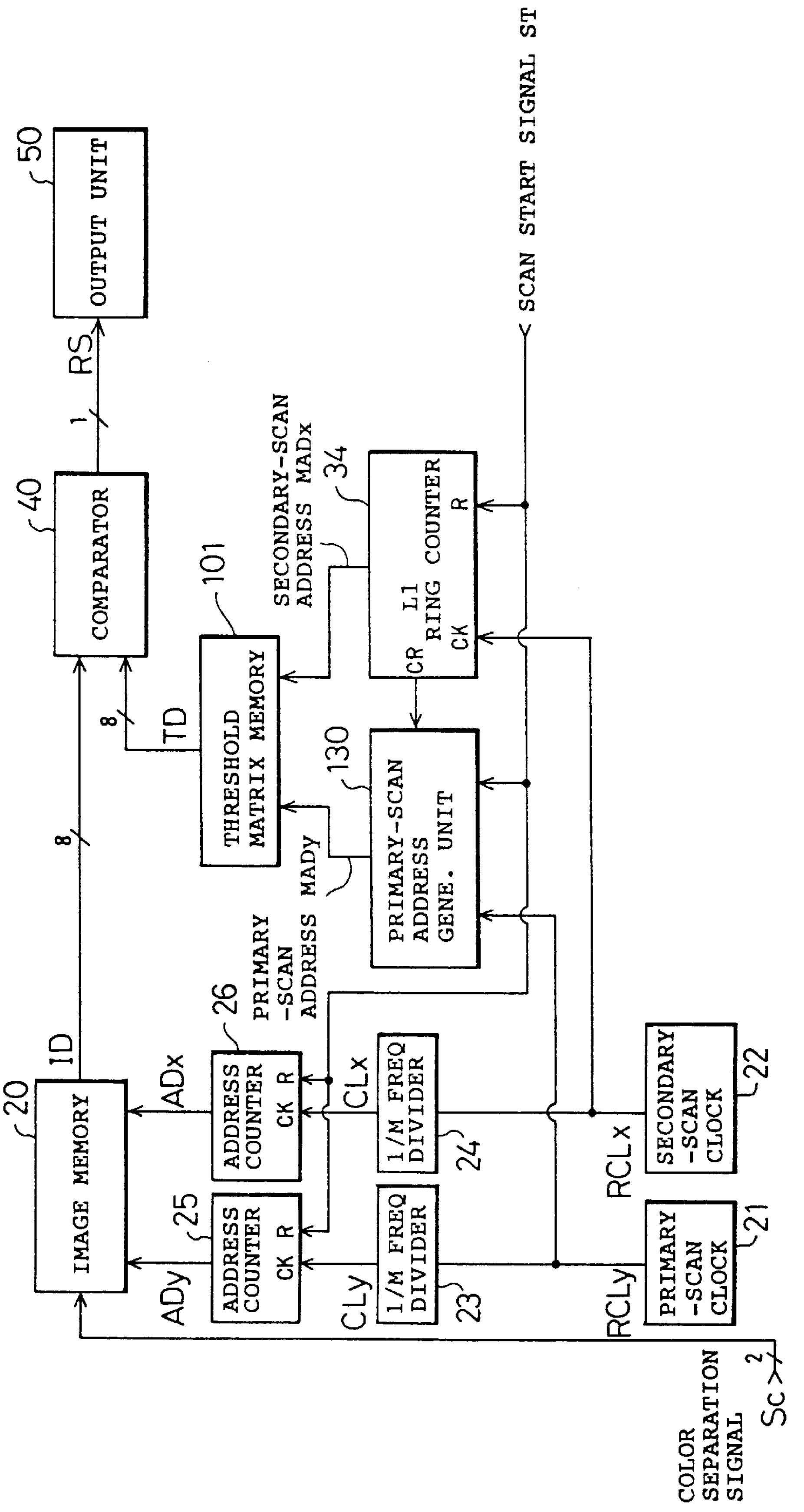
FIG. 52 is a block diagram showing the structure of an image recording apparatus for implementing the method shown in FIGS. 50(A) through 50(D)

FIG. 52 is a block diagram showing the structure of an image recording apparatus, which implements the above method of reading out part of the threshold matrix in the primary scanning direction. The primary differences from the apparatus of FIG. 47 are that the matrix selection unit 100 is replaced with a threshold matrix memory 101; that the primary-scanning ring counter 33 is replace with a primary-scanning address generator unit 130; and that the line memory unit 110, the random number generator 120, and the two offset memories 31 and 32 are omitted.

Figure 53:
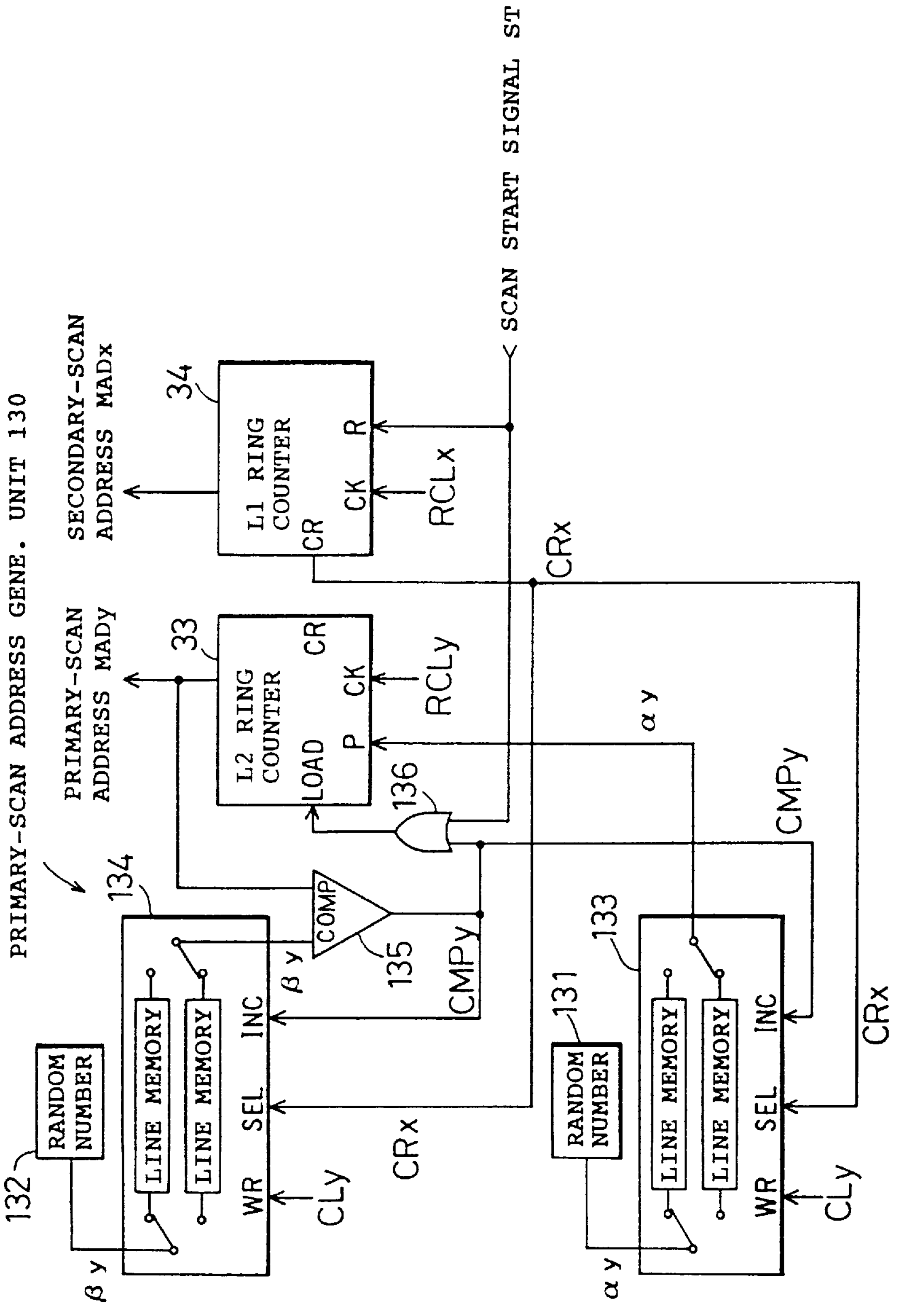
FIG. 53 is a block diagram illustrating the detailed structure of the primary-scanning address generator unit 130 and the ring counter 34 shown in FIG. 52.

FIG. 53 is a block diagram showing the structure of the primary-scanning address generator unit 130 and the ring counter 34 in detail. The primary-scanning address generator unit 130 includes an L2-shift ring counter 33, two random number generators 131 and 132, two line memory units 133 and 134 each including two line memories, a comparator 135, and an OR gate 136.

Random numbers generated by the first random number generator 131 are supplied to and written in one of the two line memories in the first line memory unit 133 synchronously with a scanning clock CLy, whereas the random numbers previously stored are successively read out from the other line memory of the first line memory unit 133 and output as the initial value $\alpha_y$ of the primary-scanning address to a preset terminal of the ring counter 33.

Random numbers generated by the second random number generator 132 are supplied to and written in one of the two line memories in the second line memory unit 134 synchronously with the scanning clock CLy, whereas the random numbers previously stored are successively read from the other line memory of the second line memory unit 134 and output as the terminal value $\beta_y$ of the primary-scanning address to the comparator 135.

The comparator 135 compares the primary-scanning address MADy supplied from the ring counter 33 with the terminal value $\beta_y$, and outputs one pulse of a coincidence signal CMPy when MADy and $\beta_y$ are equal to each other. The coincidence signal CMPy is transmitted to a load terminal of the ring counter 33 via the OR gate 136. The initial value $\alpha_y$ is accordingly preset in the ring counter 33 in response to the coincidence signal CMPy. The coincidence signal CMPy is also given to the two line memory units 133 and 134 to increase the reading addresses of the units 133 and 134. Every time when the primary-scanning address MADy becomes equal to the terminal value $\beta_y$, a new initial value $\alpha_y$ and a new terminal value $\beta_y$ are output from the line memory units 133 and 134, respectively.

The two line memories in the first line memory unit 133 are switched over each other in an alternate and complementary manner in synchronism with a carry signal CRx output from the ring counter 34 in the secondary scanning direction. Every time when binarization is completed over the width L1 of the threshold matrix TM in the secondary scanning direction (see FIG. 46(A)), the two line memories are switched over each other and a new initial value $\alpha_y$ for another primary scanning line is output from the first line memory unit 133. These operations are also applied to the second line memory unit 134. Every time when binarization is completed over the width L1 of the threshold matrix TM in the secondary scanning direction, a new terminal value $\beta_y$ for another primary scanning line is output from the second line memory unit 134.

The image recording apparatus shown in FIGS. 52 and 53 use random numbers as the initial value $\alpha_y$ and the terminal value $\beta_y$ of the primary-scanning address MADy of the threshold matrix memory 101, thereby executing binarization using a plurality of threshold matrices, which are obtained by extracting part of the L1×L2 threshold matrix in the primary scanning direction.

Incidentally, a plurality of threshold matrix memories may store the plurality of threshold matrices as shown in FIGS. 50(A) through 50(D) instead of varying the initial value $\alpha_y$ and the terminal value $\beta_y$ of the primary-scanning address.

Figure 54:
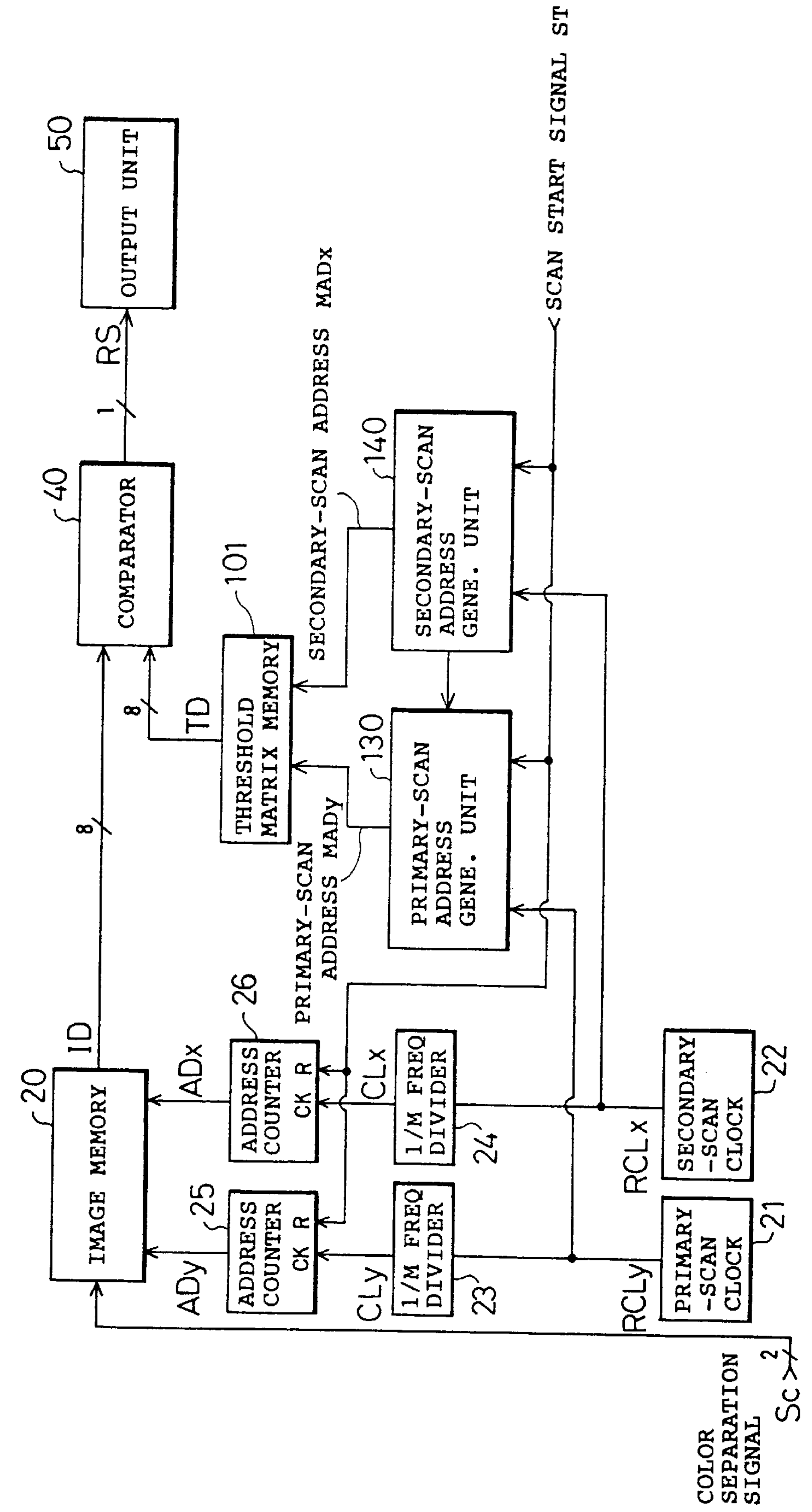
FIG. 54 is a block diagram showing another structure of the image recording apparatus.

FIG. 54 is a block diagram showing another structure of the image recording apparatus, which also implements the modified method of utilizing part of a threshold matrix. The difference from the apparatus of FIG. 52 is that the ring counter 34 is replaced by a secondary-scanning address generator unit 140.

Figure 55:
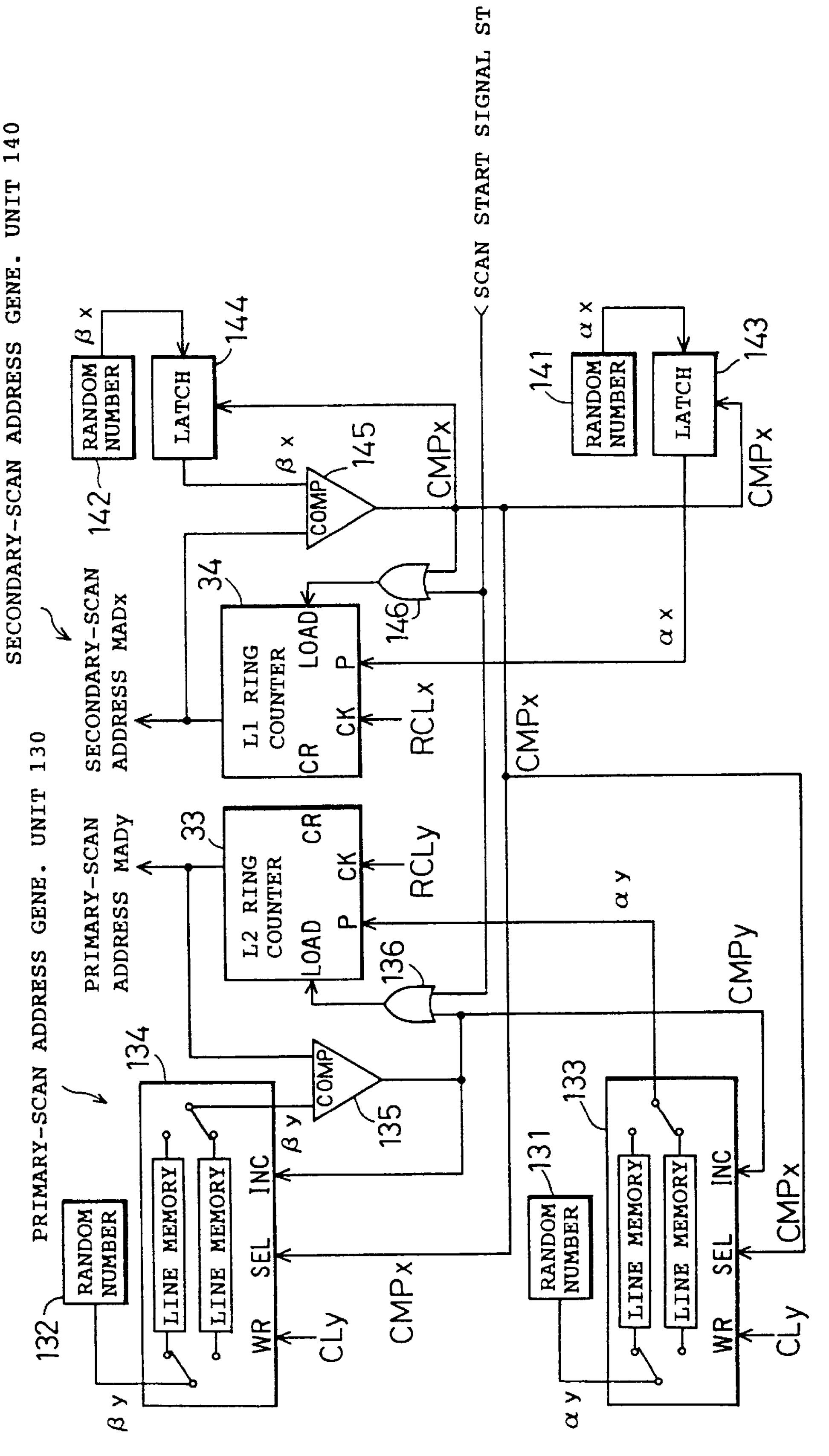
FIG. 55 is a block diagram showing the detailed structure of the primary-scanning address generator unit 130 and the secondary-scanning address generator unit 140 shown in FIG. 54.

FIG. 55 is a block diagram showing the structure of the primary-scanning address generator unit 130 and the secondary-scanning address generator unit 140 in detail. The primary-scanning address generator unit 130 has constituents identical with those shown in FIG. 53. The secondary-scanning address generator unit 140 includes an L1-shift ring counter 34, two random number generators 141 and 142, two latches 143 and 144, a comparator 145, and an OR gate 146.

Each random number generated by the first random number generator 141 is supplied as an initial value $\alpha_x$ of the secondary-scanning address to a preset terminal of the ring counter 34 via the latch 143, whereas each random number generated by the second random number generator 142 is supplied as a terminal value $\beta_x$ of the secondary-scanning address to the comparator 145 via the latch 144.

The comparator 145 compares the secondary-scanning address MADx supplied from the ring counter 34 with the terminal value $\beta_x$, and outputs one pulse of a coincidence signal CMPx when MADx and $\beta_x$ are equal to each other. The coincidence signal CMPx is transmitted to a load terminal of the ring counter 34 via the OR gate 146. The initial value $\alpha_x$ is accordingly preset in the ring counter 34 in response to the coincidence signal CMPx. The coincidence signal CMPx is also given to the two latches 143 and 144 to latch the initial value $\alpha_x$ and the terminal value $\beta_x$. Every time when the secondary-scanning address MADx becomes equal to the terminal value $\beta_x$, a new initial value $\alpha_x$ and a new terminal value $\beta_x$ are latched.

In the circuit of FIG. 53 described before, the carry signal CRx of the ring counter 34 is input into selection signal terminals of the two line memory units 133 and 134 in the primary-scanning address generator unit 130. In the circuit of FIG. 55, on the other hand, the coincidence signal CMPx is input in place of the carry signal CRx. The two line memories in each of the line memory units 133 and 134 are switched over each other in an alternate and complementary manner every time when the secondary-scanning address MADx becomes equal to the terminal value $\beta_x$.

The image recording apparatus shown in FIGS. 54 and 55 uses random numbers as the initial value $\alpha_y$ and the terminal value $\beta_y$ of the primary-scanning address MADy as well as the initial value $\alpha_x$ and the terminal value $\beta_x$ of the secondary-scanning address MADx in the threshold matrix memory 101, thereby executing binarization using a plurality of threshold matrices, which are prepared by extracting part of the L1×L2 threshold matrix in both the primary scanning direction and secondary scanning direction.

Figure 56:
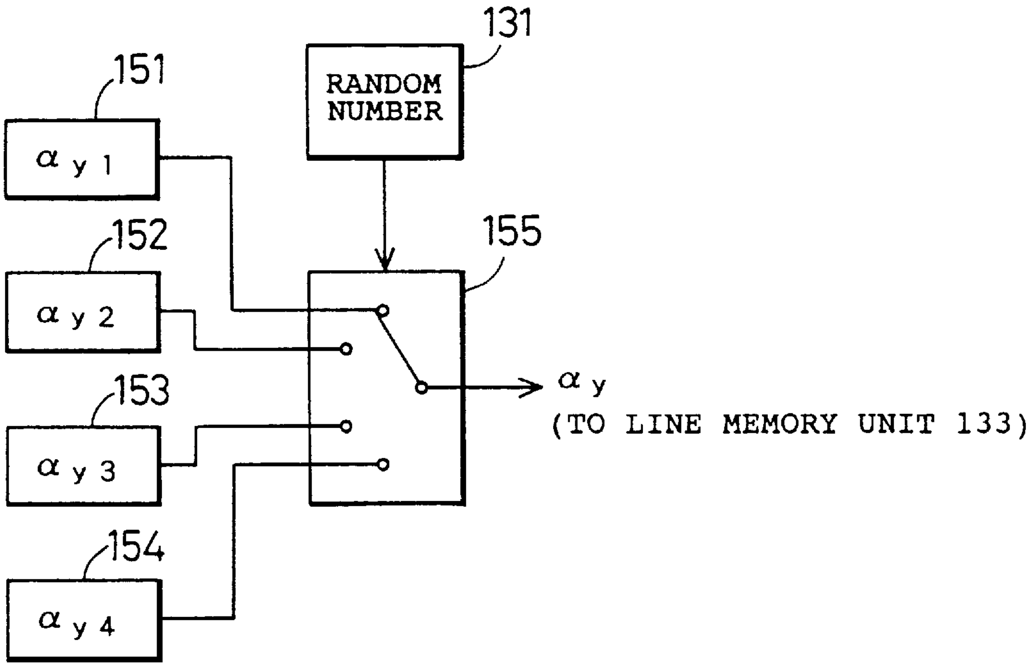
FIG. 56 is a block diagram showing a circuit for selecting an initial address at random among a plurality of initial values previously prepared.

Although random numbers are used as the initial values and the terminal values of the addresses to the threshold matrix in the circuit of FIG. 55, the initial and terminal addresses may be selected at random from a plurality of initial values and terminal values previously prepared. FIG. 56 is a block diagram showing a circuit for selecting an initial address at random from a plurality of initial values previously prepared. The circuit of FIG. 56 may replace the random number generator 131 of FIG. 55. The circuit includes the random number generator 131, four initial value registers 151 through 154, and a selector 155. The four initial value registers 151 through 154 respectively store four different initial values, for example, those shown in FIGS. 50(A) through 50(D). The selector 155 selects one of the four initial values stored in the registers 151 through 154 according to the random number generated by the random number generator 131, and outputs the selected initial value to the line memory unit 133. The other random number generators 132, 141, and 142 of FIG. 55 may be replaced by circuits similar to that of FIG. 56.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating a halftone image by comparing multi-tone image data with threshold data read out of an acting threshold matrix, comprising the steps of:

(a) producing said acting threshold matrix by: dividing a matrix area of said acting threshold matrix into a plurality of sub-matrices of an equal size, each of said plurality of sub-matrices including a plurality of threshold data; setting a difference between said plurality of threshold data in said each sub-matrix to a predetermined value; and arranging said plurality of threshold data in said each sub-matrix so that relatively small threshold data are arranged diagonally while relatively large threshold data are also arranged diagonally wherein a maximum of said relatively small threshold data is less than or equal to a minimum of said relatively large threshold data;

(b) reading out threshold data from said acting threshold matrix;

(c) comparing said multi-tone image data with said threshold data read out of said acting threshold matrix, to thereby produce a binary image signal; and (d) producing said halftone image responsive to said binary image signal.

2. A method in accordance with claim 1, wherein said acting threshold matrix is an M1×M2 matrix, both M1 and M2 being even numbers, said each sub-matrix being a 2×2 matrix including four threshold data; and said step (a) further comprises the step of:

selecting an arrangement of said four threshold data in each 2×2 sub-matrix at random from eight diagonal arrangements in which two relatively small threshold data are arranged diagonally while two relatively large threshold data are also arranged diagonally.

3. A method in accordance with claim 2, wherein said step (a) further comprises the steps of:

producing a plurality of M1×M2 threshold matrices having different threshold arrangements from one another; and producing an L1×L2 threshold matrix as said acting threshold matrix by combining said plurality of M1×M2 threshold matrices, where L1 and L2 are integral multiples of M1 and M2, respectively.

4. A method in accordance with claim 1, wherein said acting threshold matrix is an M×M matrix, M being equal to $2^N$, N being an integer of at least 2, said each sub-matrix being a 2×2 matrix $T_{ij}$ including four threshold data; and said step (a) comprises the step of:

determining an arrangement of said four threshold data in said each 2×2 sub-matrix $T_{ij}$ by:

$$T_{ij} = 2^{2(N-1)}\begin{bmatrix} a_{ij} & c_{ij} \\ d_{ij} & b_{ij} \end{bmatrix} + k_{ij}\begin{bmatrix} 1 & 1 \\ 1 & 1 \end{bmatrix}$$

where i and j respectively represent coordinates of said 2×2 sub-matrix $T_{ij}$ in said M×M matrix, and i and j are integers between 1 and $$\frac{M}{2};$$

$k_{ij}$ is an integer between 0 and $$\left(\frac{M^2}{4} - 1\right),$$

which has a different value for a different combination of i and j, and which is so determined that a value of MOD($k_{ij}$, GN) is identical for four 2×2 sub-matrices $T_{ij}$ included in each 4×4 sub-matrix;

MOD(x,y) gives a remainder of x divided by y;

GN is a number of 4×4 sub-matrices included in said M×M matrix, and is equal to $$\frac{M^2}{4\times 4};$$

and elements $a_{ij}$, $b_{ij}$, $c_{ij}$, and $d_{ij}$ are different integers between 0 and 3, allocation of said elements $a_{ij}$, $b_{ij}$, $c_{ij}$, and $d_{ij}$ to 0 through 3 is determined independently for each 2×2 sub-matrix $T_{ij}$ at random.

5. A method in accordance with claim 4, wherein said step (a) further comprises the step of:

selecting said allocation of said elements $a_{ij}$, $b_{ij}$, $c_{ij}$, and $d_{ij}$ for each 2×2 sub-matrix $T_{ij}$ at random from eight diagonal patterns in which 0 and 1 are arranged diagonally while 2 and 3 are also arranged diagonally.

6. A method in accordance with claim 4, wherein said step (a) further comprises the steps of:

(1) producing a plurality of M×M threshold matrices having different threshold arrangements from one another; and (2) producing an L1×L2 threshold matrix as said acting threshold matrix by combining said plurality of M×M threshold matrices, where L1 and L2 are integral multiples of M.

7. A method in accordance with claim 6, wherein threshold data in each of said plurality of M×M threshold matrix ranges from 0 through ($M^2$−2).

8. A method in accordance with claim 7, wherein said step (1) further comprises the steps of:

producing said plurality of M×M threshold matrices each having threshold data ranging from 0 through ($M^2$−1); and substituting the maximum value ($M^2$−1) in each M×M threshold matrix by a value selected at random from a range of 0 through ($M^2$−2).

9. A method in accordance with claim 6, wherein threshold data in each of said plurality of M×M threshold matrix ranges from 1 through ($M^2$−1).

10. A method in accordance with claim 9, wherein said step (1) further comprises the steps of:

producing said plurality of M×M threshold matrices each having threshold data ranging from 0 through ($M^2$−1); and substituting the minimum value 0 in each M×M threshold matrix by a value selected at random from a range of 1 through ($M^2$−1).

11. A method in accordance with claim 4, wherein said multi-tone image data includes a plurality of color components;

said step (a) further comprises the step of:

producing a plurality of acting threshold matrices for said plurality of color components, said plurality of acting threshold matrices being different from one another; and said step (b) comprises the steps of:

selecting one of said plurality of acting threshold matrices according to a color component-under-processing; and reading out said threshold data from said selected acting threshold matrix.

12. A method in accordance with claim 4, wherein said multi-tone image data includes a plurality of color components; and said step (a) further comprises the step of:

allocating a plurality of offset addresses to said plurality of color components, said plurality of offset addresses being used in applying said acting threshold matrix on an image plane;

said step (b) comprises the step of:

(1) selecting one of said plurality of offset addresses according to a color component-under-processing, and reading out said threshold data from said acting threshold matrix according to said selected offset address.

13. A method in accordance with claim 12, wherein said step (a) further comprises the step of:

providing a memory for storing said plurality of different offset addresses; and said step (1) comprises the step of:

reading out one of said plurality of offset addresses from said memory according to said color component-under-processing, and reading out said threshold data from said acting threshold matrix according to said offset address read out from said memory.

14. A method in accordance with claim 12, wherein said step (a) further comprises the step of:

producing a plurality of acting threshold matrices for said plurality of color components by shifting a distribution of threshold data according to said plurality of offset addresses, respectively; and said step (1) further comprises the step of:

reading out said threshold data from one of said plurality of threshold matrices according to said color component-under-processing.

15. A method in accordance with claims 12, wherein said plurality of offset addresses for said plurality of color components are different from one another at least on the same scanning line.

16. A method in accordance with claim 4, wherein said step (b) comprises the steps of:

(1) allocating a plurality of offset addresses to a plurality of positions on an image plane, said plurality of offset addresses being used in applying said acting threshold matrix on said image plane; and (2) selecting one of said plurality of offset addresses according to a position-under-processing on said image plane, and reading out threshold data from said acting threshold matrix according to said selected offset address.

17. A method in accordance with claim 16, wherein said step (1) further comprises the step of:

executing said selection at every predetermined cycle in a secondary scanning direction.

18. A method in accordance with claim 4, wherein said step (b) comprises the steps of:

(1) allocating a plurality of operation factors to a plurality of positions on an image plane; and (2) selecting one of said plurality of operation factors according to a position-under-processing on said image plane, and executing a predetermined operation between said threshold data read out from said acting threshold matrix and said selected operation factor, to thereby correct said threshold data.

19. A method in accordance with claim 18, wherein said predetermined operation includes at least one of addition and subtraction.

20. A method in accordance with claim 18, wherein said acting threshold matrix includes threshold data ranging from 0 through ($M^2$−2); and said step (2) comprises the steps of:

(3) adding said selected operation factor to said threshold data read out from said acting threshold matrix; and (4) subtracting one from said threshold data obtained at said step (3) except for that threshold data, expressed by a 2N-bit binary data, to which said addition has caused a carry.

21. A method in accordance with claim 18, wherein said predetermined operation includes a logical operation between said threshold data and said operation factor with respect to each bit, to thereby invert at least one bit of said threshold data according to said operation factor.

22. A method in accordance with claim 1, wherein said acting threshold matrix is an M×M matrix $TM_{M\times M}$, M being equal to $2^N$, N being an integer of at least 2; and said step (a) comprises the step of:

determining said M×M threshold matrix $TM_{M\times M}$ according to the following recursion formulae:

$$TM_{M\times M} = S^N_{(1,1)} = \begin{bmatrix} S^{(N-1)}_{(1,1)} & S^{(N-1)}_{(2,1)} \\ S^{(N-1)}_{(1,2)} & S^{(N-1)}_{(2,2)} \end{bmatrix} + 2^0 \begin{bmatrix} E(a)^{(N-1)} & E(c)^{(N-1)} \\ E(d)^{(N-1)} & E(b)^{(N-1)} \end{bmatrix}_{(1,1)}$$

$$S^{(N-1)}_{(u,v)} = \begin{bmatrix} S^{(N-2)}_{(1,1)} & S^{(N-2)}_{(2,1)} \\ S^{(N-2)}_{(1,2)} & S^{(N-2)}_{(2,2)} \end{bmatrix} + 2^2 \begin{bmatrix} E(a)^{(N-2)} & E(c)^{(N-2)} \\ E(d)^{(N-2)} & E(b)^{(N-2)} \end{bmatrix}_{(u,v)}$$

. . .

$$S^2_{(u,v)} = \begin{bmatrix} S^1_{(1,1)} & S^1_{(2,1)} \\ S^1_{(1,2)} & S^1_{(2,2)} \end{bmatrix} + 2^{2(N-2)} \begin{bmatrix} E(a)^1 & E(c)^1 \\ E(d)^1 & E(b)^1 \end{bmatrix}_{(u,v)}$$

$$S^1_{(u,v)} = \begin{bmatrix} S^0_{(1,1)} & S^0_{(2,1)} \\ S^0_{(1,2)} & S^0_{(2,2)} \end{bmatrix} + 2^{2(N-1)} \begin{bmatrix} E(a)^0 & E(c)^0 \\ E(d)^0 & E(b)^0 \end{bmatrix}_{(u,v)}$$

$$S^O_{(u,v)} = 0$$

where $S^n_{(u,v)}$ is a square matrix of a dimension of $2^n$, given by $$S^n_{(u,v)} = \begin{bmatrix} S^{(n-1)}_{(1,1)} & S^{(n-1)}_{(2,1)} \\ S^{(n-1)}_{(1,2)} & S^{(n-1)}_{(2,2)} \end{bmatrix} + 2^{2(N-n)} \begin{bmatrix} E(a)^{(n-1)} & E(c)^{(n-1)} \\ E(d)^{(n-1)} & E(b)^{(n-1)} \end{bmatrix}_{(u,v)}$$

and where n is an integer between 1 and N; $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively; said components a, b, c, and d are different integers between 0 and 3, and allocation of said components a, b, c, and d to 0 through 3 is independently determined for each coefficient matrix $$\begin{bmatrix} E(a)^{(n-1)} & E(c)^{(n-1)} \\ E(d)^{(n-1)} & E(b)^{(n-1)} \end{bmatrix}_{(u,v)}$$

at coordinates (u,v) while determining said allocation of said components a, b, c, and d to 0 through 3 at random for each 2x2 sub-matrix $S^1_{(u,v)}$.

23. A method in accordance with claim 22, wherein said step (a) further comprises the step of:

selecting said allocation of said components a, b, c, and d to 0 through 3 at random from eight diagonal patterns in which 0 and 1 are arranged diagonally while 2 and 3 are also arranged diagonally.

24. A method in accordance with claim 22, wherein said step (a) further comprises the steps of:

(1) producing a plurality of M×M threshold matrices having different threshold arrangements from one another; and (2) producing an L1xL2 threshold matrix as said acting threshold matrix by combining said plurality of M×M threshold matrices, where L1 and L2 are integral multiples of M.

25. A method in accordance with claim 24, wherein threshold data in each of said plurality of M×M threshold matrix ranges from 0 through $(M^2-2)$.

26. A method in accordance with claim 25, wherein said step (1) further comprises the steps of:

producing said plurality of M×M threshold matrices each having threshold data ranging from 0 through $(M^2-1)$; and substituting the maximum value $(M^2-1)$ in each M×M threshold matrix by a value selected at random from a range of 0 through $(M^2-2)$.

27. A method in accordance with claim 24, wherein threshold data in each of said plurality of M×M threshold matrix ranges from 1 through $(M^2-1)$.

28. A method in accordance with claim 27, wherein said step (1) further comprises the steps of:

producing said plurality of M×M threshold matrices each having threshold data ranging from 0 through $(M^2-1)$; and substituting the minimum value 0 in each M×M threshold matrix by a value selected at random from a range of 1 through $(M^2-1)$.

29. A method in accordance with claim 22, wherein said multi-tone image data includes a plurality of color components;

said step (a) further comprises the step of:

producing a plurality of acting threshold matrices for said plurality of color components, said plurality of acting threshold matrices being different from one another; and said step (b) comprises the steps of:

selecting one of said plurality of acting threshold matrices according to a color component-under-processing; and reading out said threshold data from said selected acting threshold matrix.

30. A method in accordance with claim 22, wherein said multi-tone image data includes a plurality of color components; and said step (a) further comprises the step of:

allocating a plurality of offset addresses to said plurality of color components, said plurality of offset addresses being used in applying said acting threshold matrix on an image plane;

said step (b) comprises the step of:

(1) selecting one of said plurality of offset addresses according to a color component-under-processing, and reading out said threshold data from said acting threshold matrix according to said selected offset address.

31. A method in accordance with claim 30, wherein said step (a) further comprises the step of:

providing a memory for storing said plurality of different offset addresses; and said step (1) comprises the step of:

reading out one of said plurality of offset addresses from said memory according to said color component-under-processing, and reading out said threshold data from said acting threshold matrix according to said offset address read out from said memory.

32. A method in accordance with claim 30, wherein said step (a) further comprises the step of:

producing a plurality of acting threshold matrices for said plurality of color components by shifting a distribution of threshold data according to said plurality of offset addresses, respectively; and said step (1) further comprises the step of:

reading out said threshold data from one of said plurality of threshold matrices according to said color component-under-processing.

33. A method in accordance with claim 30, wherein said plurality of offset addresses for said plurality of color components are different from one another at least on the same scanning line.

34. A method in accordance with claim 22, wherein said step (b) comprises the steps of:

(1) allocating a plurality of offset addresses to a plurality of positions on an image plane, said plurality of offset addresses being used in applying said acting threshold matrix on said image plane; and (2) selecting one of said plurality of offset addresses according to a position-under-processing on said image plane, and reading out threshold data from said acting threshold matrix according to said selected offset address.

35. A method in accordance with claim 34, wherein said step (1) further comprises the step of:

executing said selection at every predetermined cycle in a secondary scanning direction.

36. A method in accordance with claim 22, wherein said step (b) comprises the steps of:

(1) allocating a plurality of operation factors to a plurality of positions on an image plane; and (2) selecting one of said plurality of operation factors according to a position-under-processing on said image plane, and executing a predetermined operation between said threshold data read out from said acting threshold matrix and said selected operation factor, to thereby correct said threshold data.

37. A method in accordance with claim 36, wherein said predetermined operation includes at least one of addition and subtraction.

38. A method in accordance with claim 36, wherein said acting threshold matrix includes threshold data ranging from 0 through $(M^2-2)$; and said step (2) comprises the steps of:

(3) adding said selected operation factor to said threshold data read out from said acting threshold matrix; and (4) subtracting one from said threshold data obtained at said step (3) except for that threshold data, expressed by a 2N-bit binary data, to which said addition has caused a carry.

39. A method in accordance with claim 36, wherein said predetermined operation includes a logical operation between said threshold data and said operation factor with respect to each bit, to thereby invert at least one bit of said threshold data according to said operation factor.

40. An apparatus for generating a halftone image by comparing multi-tone image data with threshold data read out of an acting threshold matrix, comprising:

a first memory for storing said acting threshold matrix produced by: dividing a matrix area of said acting threshold matrix into a plurality of sub-matrices of an equal size, each of said plurality of sub-matrices including a plurality of threshold data; setting a difference between said plurality of threshold data in said each sub-matrix to a predetermined value; and arranging said plurality of threshold data in said each sub-matrix so that relatively small threshold data are arranged diagonally while relatively large threshold data are also arranged diagonally wherein a maximum of said relatively small threshold data is less than or equal to a minimum of said relatively large threshold data;

reading means for reading out threshold data of said acting threshold matrix from said first memory;

a comparator for comparing said multi-tone image data with said threshold data read out from said first memory, to thereby produce a binary image signal; and output means for producing said halftone image responsive to said binary image signal.

41. An apparatus in accordance with claim 40, wherein said multi-tone image data includes a plurality of color components;

said first memory stores a plurality of acting threshold matrices for said plurality of color components, said plurality of acting threshold matrices being different from one another; and said reading means comprises:

means for selecting one of said plurality of acting threshold matrices according to a color component-under-processing; and means for reading out said threshold data from said selected acting threshold matrix.

42. An apparatus in accordance with claim 40, wherein said multi-tone image data includes a plurality of color components; and said apparatus further comprises:

a second memory for storing a plurality of offset addresses for said plurality of color components, said plurality of offset addresses being used in applying said acting threshold matrix on an image plane; and wherein said reading means comprises:

first means for reading out one of said plurality of offset addresses according to a color component-under-processing; and second means for reading out said threshold data from said first memory according to said offset address read out from said second memory.

43. An apparatus in accordance with claim 42, wherein said plurality of offset addresses for said plurality of color components are different from one another at least on the same scanning line.

44. An apparatus in accordance with claim 40, wherein said multi-tone image data includes a plurality of color components;

said first memory stores a plurality of acting threshold matrices for said plurality of color components, said plurality of acting threshold matrices being produced by shifting a distribution of threshold data according to a plurality of offset addresses for said plurality of color components, respectively; and said reading means comprises:

means for reading out said threshold data from said first memory according to a color component-under-processing.

45. An apparatus in accordance with claim 40, wherein said reading means comprises:

offset address allocation means for allocating a plurality of offset addresses to a plurality of positions on an image plane, said plurality of offset addresses being used in applying said acting threshold matrix on said image plane; and means for selecting one of said plurality of offset addresses according to a position-under-processing on said image plane, and reading out threshold data from said acting threshold matrix according to said selected offset address.

46. An apparatus in accordance with claim 45, wherein said offset address allocation means comprises:

means for executing said selection at every predetermined cycle in a secondary scanning direction.

47. An apparatus in accordance with claim 40, wherein said reading means comprises:

factor allocation means for allocating a plurality of operation factors to a plurality of positions on an image plane;

selection means for selecting one of said plurality of operation factors according to a position-under-processing on said image plane; and operation means for executing a predetermined operation between said threshold data read out from said acting threshold matrix and said selected operation factor, to thereby correct said threshold data.

48. An apparatus in accordance with claim 47, wherein said operation means comprises:

arithmetic operation means for executing at least one of addition and subtraction as said predetermined operation.

49. An apparatus in accordance with claim 47, wherein said threshold matrix includes threshold data ranging from 0 through ($M^2$−2), M being an integer equal to $2^N$, and N being an integer of at least 2; and said operation means comprises:

adding means for adding said selected operation factor to said threshold data read out from said acting threshold matrix; and means for subtracting one from said threshold data obtained by said adding means except for said threshold data, expressed by a 2N-bit binary data, to which said addition has caused a carry.

50. An apparatus in accordance with claim 47, wherein said operation means comprises:

logical operation means for executing a logical operation between said threshold data and said operation factor with respect to each bit, to thereby invert at least one bit of said threshold data according to said operation factor.

51. A method of generating a halftone image for each of a plurality of color components of multi-tone image data by comparing said multi-tone image data with threshold data read out of an acting threshold matrix, comprising the steps of:

(a) preparing an M×M threshold matrix $TM_{M\times M}$, where M is equal to $2^N$ and N is an integer of at least 2, according to the following recursion formulae:

$$TM_{M\times M} = S^N_{(1,1)} = \begin{bmatrix} S^{(N-1)}_{(1,1)} & S^{(N-1)}_{(2,1)} \\ S^{(N-1)}_{(1,2)} & S^{(N-1)}_{(2,2)} \end{bmatrix} + 2^0 \begin{bmatrix} E(a)^{(N-1)} & E(c)^{(N-1)} \\ E(d)^{(N-1)} & E(b)^{(N-1)} \end{bmatrix}_{(1,1)}$$

$$S^{(N-1)}_{(u,v)} = \begin{bmatrix} S^{(N-2)}_{(1,1)} & S^{(N-2)}_{(2,1)} \\ S^{(N-2)}_{(1,2)} & S^{(N-2)}_{(2,2)} \end{bmatrix} + 2^2 \begin{bmatrix} E(a)^{(N-2)} & E(c)^{(N-2)} \\ E(d)^{(N-2)} & E(b)^{(N-2)} \end{bmatrix}_{(u,v)}$$

$$\ldots$$

$$S^2_{(u,v)} = \begin{bmatrix} S^1_{(1,1)} & S^1_{(2,1)} \\ S^1_{(2,2)} & S^1_{(2,2)} \end{bmatrix} + 2^{2(N-2)} \begin{bmatrix} E(a)^1 & E(c)^1 \\ E(d)^1 & E(b)^1 \end{bmatrix}_{(u,v)}$$

$$S^1_{(u,v)} = \begin{bmatrix} S^0_{(1,1)} & S^0_{(2,1)} \\ S^0_{(1,2)} & S^0_{(2,2)} \end{bmatrix} + 2^{2(N-1)} \begin{bmatrix} E(a)^0 & E(c)^0 \\ E(d)^0 & E(b)^0 \end{bmatrix}_{(u,v)}$$

where $S^n_{(u,v)}$ is a square matrix of a dimension of $2^n$, given by $$S^n_{(u,v)} = \begin{bmatrix} S^{(n-1)}_{(1,1)} & S^{(n-1)}_{(2,1)} \\ S^{(n-1)}_{(1,2)} & S^{(n-1)}_{(2,2)} \end{bmatrix} + 2^{2(N-n)} \begin{bmatrix} E(a)^{(n-1)} & E(c)^{(n-1)} \\ E(d)^{(n-1)} & E(b)^{(n-1)} \end{bmatrix}_{(u,v)}$$

and where n is an integer between 1 and N; $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively; said components a, b, c, and d are different integers between 0 and 3, and allocation of said components a, b, c, and d to 0 through 3 is independently determined for each coefficient matrix $$\begin{bmatrix} E(a)^{n-1} & E(c)^{n-1} \\ E(d)^{n-1} & E(b)^{n-1} \end{bmatrix}_{(u,v)}$$

at coordinates (u,v) while determining said allocation of said components a, b, c, and d to 0 through 3 at random for each 2×2 sub-matrix $S^1_{(u,v)}$;

(b) arranging $E(0)^{m-1}$ in each sub-matrix $S^m_{(u,v)}$ at different positions for said plurality of color components, where m corresponds to at least one integer between 1 through N, to thereby prepare a plurality of acting threshold matrices for said plurality of color components;

(c) selecting one of said plurality of acting threshold matrices according to a color component-under-processing, and reading out threshold data from said selected acting threshold matrix;

(d) comparing said multi-tone image data with said threshold data read out of said selected acting threshold matrix, to thereby produce a binary image signal for each color component; and (e) producing said binary halftone image responsive to said binary image signal for each color component.

52. A method in accordance with claim 51, wherein said step (b) comprises the step of:

arranging $E(0)^0$ in each sub-matrix $S^1_{(u,v)}$ at different positions for said plurality of color components.

53. A method in accordance with claim 51, wherein said step (b) comprises the step of:

arranging $E(0)^{N-1}$ in each sub-matrix $S^N_{(u,v)}$ at different positions for said plurality of color components.

54. A method in accordance with claim 51, wherein said step (b) comprises the step of:

arranging $E(0)^0$ in each sub-matrix $S^1_{(u,v)}$ at different positions for said plurality of color components, and arranging $E(0)^{N-1}$ in each sub-matrix $S^N_{(u,v)}$ at different positions for said plurality of color components.

55. A method in accordance with claim 54, wherein said step (b) further comprises the step of:

arranging $E(0)^{m-1}$ in each sub-matrix $S^m_{(u,v)}$, where m corresponds to each of the integers from 1 to N, at different positions for said plurality of color components.

56. A method in accordance with claim 51, wherein said step (b) comprises the step of:

arranging $E(0)^{m-1}$ in each sub-matrix $S^m_{(u,v)}$, where m corresponds to each of the integers from 2 to N, at different positions for said plurality of color components.

57. A method in accordance with claim 51, wherein said step (b) comprises the step of:

arranging $E(0)^{m-1}$, $E(1)^{m-1}$, $E(2)^{m-1}$, and $E(3)^{m-1}$ in each sub-matrix $S^m_{(u,v)}$ at different positions respectively for said plurality of color components.

58. A method in accordance with claim 57, wherein said step (b) further comprises the step of:

selecting an arrangement of $E(0)^{m-1}$, $E(1)^{m-1}$, $E(2)^{m-1}$, and $E(3)^{m-1}$ in each sub-matrix $S^m_{(u,v)}$ from eight diagonal arrangements in which $E(0)^{m-1}$ and $E(1)^{m-1}$ are arranged diagonally and $E(2)^{m-1}$ and $E(3)^{m-1}$ are also arranged diagonally.

59. A method of generating a halftone image for each of a plurality of color components of multi-tone image data by comparing said multi-tone image data with threshold data read out of an acting threshold matrix, comprising the steps of:

(a) producing an M×M threshold matrix $TM_{M\times M}$ as said acting threshold matrix, where M is equal to $2^N$ and N is an integer of at least 2, according to the following recursion formulae:

$$TM_{M\times M}=S^N_{(1,1)}=\begin{bmatrix} S^{(N-1)}_{(1,1)} & S^{(N-1)}_{(2,1)} \\ S^{(N-1)}_{(1,2)} & S^{(N-1)}_{(2,2)} \end{bmatrix}+2^0\begin{bmatrix} E(a)^{(N-1)} & E(c)^{(N-1)} \\ E(d)^{(N-1)} & E(b)^{(N-1)} \end{bmatrix}_{(1,1)}$$

$$S^{(N-1)}_{(u,v)}=\begin{bmatrix} S^{(N-2)}_{(1,1)} & S^{(N-2)}_{(2,1)} \\ S^{(N-2)}_{(1,2)} & S^{(N-2)}_{(2,2)} \end{bmatrix}+2^2\begin{bmatrix} E(a)^{(N-2)} & E(c)^{(N-2)} \\ E(d)^{(N-2)} & E(b)^{(N-2)} \end{bmatrix}_{(u,v)}$$

$$\cdots$$

$$S^2_{(u,v)}=\begin{bmatrix} S^1_{(1,1)} & S^1_{(2,1)} \\ S^1_{(2,2)} & S^1_{(2,2)} \end{bmatrix}+2^{2(N-2)}\begin{bmatrix} E(a)^1 & E(c)^1 \\ E(d)^1 & E(b)^1 \end{bmatrix}_{(u,v)}$$

$$S^1_{(u,v)}=\begin{bmatrix} S^0_{(1,1)} & S^0_{(2,1)} \\ S^0_{(1,2)} & S^0_{(2,2)} \end{bmatrix}+2^{2(N-1)}\begin{bmatrix} E(a)^0 & E(c)^0 \\ E(d)^0 & E(b)^0 \end{bmatrix}_{(u,v)}$$

where $S^n_{(u,v)}$ is a square matrix of a dimension of $2^n$, given by $$S^n_{(u,v)}=\begin{bmatrix} S^{(n-1)}_{(1,1)} & S^{(n-1)}_{(2,1)} \\ S^{(n-1)}_{(1,2)} & S^{(n-1)}_{(2,2)} \end{bmatrix}+2^{2(N-n)}\begin{bmatrix} E(a)^{(n-1)} & E(c)^{(n-1)} \\ E(d)^{(n-1)} & E(b)^{(n-1)} \end{bmatrix}_{(u,v)}$$

and where n is an integer between 1 and N; $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively; said components a, b, c, and d are different integers between 0 and 3, and allocation of said components a, b, c, and d to 0 through 3 is independently determined for each coefficient matrix $$\begin{bmatrix} E(a)^{n-1} & E(c)^{n-1} \\ E(d)^{n-1} & E(b)^{n-1} \end{bmatrix}_{(u,v)}$$

at coordinates (u,v) while determining said allocation of said components a, b, c, and d to 0 through 3 at random for each 2×2 sub-matrix $S^1_{(u,v)}$;

(b) allocating a plurality of operation factors to said plurality of color components;

(c) selecting one of said plurality of acting matrices according to a color component-under-processing, and reading out threshold data from said selected acting threshold matrix;

(d) selecting one of said plurality of operation factors according to said color component-under-processing;

(e) executing a predetermined operation between said threshold data read out of said acting threshold matrix and said selected operation factor, to thereby modify said threshold data;

(f) comparing said multi-tone image data with said modified threshold data, to thereby produce a binary image signal for each color component; and (g) producing said binary halftone image responsive to said binary image signal for each color component.

60. A method in accordance with claim 59, wherein said M×M threshold matrix includes threshold data ranging from 0 through $(M^2-2)$; and said step (e) comprises the steps of:

(1) adding said selected operation factor to said threshold data read out from said M×M threshold matrix; and (2) subtracting one from said threshold data obtained at said step (1) except for that threshold data, expressed by a 2N-bit binary data, to which said addition has caused a carry.

61. A method in accordance with claim 59, wherein said predetermined operation includes a logical operation between said threshold data and said operation factor with respect to each bit, to thereby invert at least one bit of said threshold data according to said operation factor.

62. A method in accordance with claim 59, wherein said predetermined operation includes at least one of addition and subtraction.

63. A method in accordance with claim 62, wherein said step (e) comprises the step of:

neglecting a carry and a borrow in a predetermined pair of bits of said threshold data obtained by said predetermined operation, to thereby obtain said modified threshold data.

64. An apparatus for generating a halftone image signal by comparing multi-tone image data with threshold data read out of a threshold matrix, comprising:

matrix selection means for repeatedly executing to substantially select one of a plurality of threshold matrices at random and apply said selected threshold matrix on an image plane, wherein said matrix selection means comprises a plurality of matrix memories for storing said plurality of threshold matrices whose arrangement of data are inverted with respect to one another, and means for selecting one of said plurality of threshold matrices at random;

means for reading out threshold data from said selected threshold matrix; and a comparator for comparing said multi-tone image data with said threshold data read out of said selected threshold matrix, to thereby produce said halftone image signal.

65. An apparatus in accordance with claim 64, wherein said matrix selection means comprises:

a matrix memory for storing a threshold matrix;

address conversion means for inverting an address to be given to said matrix memory, to thereby generate a plurality of addresses applicable to said matrix memory; and address selection means for selecting one of said plurality of addresses at random and supplying said selected address to said matrix memory, to thereby substantially select one of said plurality of threshold matrices.

66. An apparatus in accordance with claim 64, wherein said matrix selection means comprises:

a matrix memory for storing a threshold matrix;

an address memory for a plurality of initial addresses and terminal addresses applicable to said matrix memory; and means for selecting one initial address and one terminal address from said plurality of initial and terminal addresses at random, respectively, and supplying an address ranging from said selected initial address through said selected terminal address to said matrix memory.

67. An apparatus in accordance with claim 64, wherein said matrix selection means comprises:

a matrix memory for storing a threshold matrix;

means for generating at random an initial address and a terminal address to be applied to said matrix memory; and address generation means for supplying an address ranging from said initial address through said terminal address to said matrix memory.

* * * * *